(12) United States Patent
Si et al.

(10) Patent No.: US 11,689,955 B2
(45) Date of Patent: *Jun. 27, 2023

(54) METHOD AND APPARATUS FOR RRM MEASUREMENT ENHANCEMENT FOR NR UNLICENSED

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,014

(22) Filed: Jul. 19, 2021

(65) Prior Publication Data

US 2021/0345154 A1 Nov. 4, 2021

Related U.S. Application Data

(63) Continuation of application No. 16/513,528, filed on Jul. 16, 2019, now Pat. No. 11,071,000.

(Continued)

(51) Int. Cl.
*H04W 24/10* (2009.01)
*H04W 56/00* (2009.01)
(Continued)

(52) U.S. Cl.
CPC .......... *H04W 24/10* (2013.01); *H04B 17/318* (2015.01); *H04L 1/1614* (2013.01);
(Continued)

(58) Field of Classification Search
None
See application file for complete search history.

(56) References Cited

U.S. PATENT DOCUMENTS

2017/0215097 A1 7/2017 Park et al.
2019/0141696 A1 5/2019 Kim et al.
(Continued)

FOREIGN PATENT DOCUMENTS

EP 3471318 A1 4/2019
EP 3897049 A1 10/2021
(Continued)

OTHER PUBLICATIONS

Nokia et al., "Remaining details on mobility measurements", 3GPP TSG-RAN WG1 NR AH #18-01, Jan. 22-26, 2018, R1-1800807, 10 pages.

(Continued)

*Primary Examiner* — Saumit Shah

(57) ABSTRACT

A method of a user equipment (UE) in a wireless communication system is provided. The method comprises: receiving, from a base station (BS), a set of radio resource control (RRC) parameters comprising at least one measurement object (MO); identifying, based on the at least one MO, at least one modulo value for synchronization signals and physical broadcast channel (SS/PBCH) blocks, and at least one bitmap indicating indices of the SS/PBCH blocks; identifying a set of SS/PBCH block locations based on the at least one modulo value and the at least one bitmap; performing radio resource management (RRM) measurement based on the identified set of SS/PBCH block locations; and transmitting, to the BS via an uplink channel, a measurement report message including a result of the RRM measurement.

16 Claims, 24 Drawing Sheets

Related U.S. Application Data

(60) Provisional application No. 62/857,494, filed on Jun. 5, 2019, provisional application No. 62/853,897, filed on May 29, 2019, provisional application No. 62/819,900, filed on Mar. 18, 2019, provisional application No. 62/817,699, filed on Mar. 13, 2019, provisional application No. 62/785,166, filed on Dec. 26, 2018, provisional application No. 62/700,437, filed on Jul. 19, 2018.

(51) Int. Cl.
| | | |
|---|---|---|
| *H04L 1/1607* | (2023.01) | |
| *H04L 5/00* | (2006.01) | |
| *H04W 76/27* | (2018.01) | |
| *H04L 5/10* | (2006.01) | |
| *H04B 17/318* | (2015.01) | |

(52) U.S. Cl.
CPC .............. *H04L 5/0051* (2013.01); *H04L 5/10* (2013.01); *H04W 56/001* (2013.01); *H04W 76/27* (2018.02)

(56) References Cited

U.S. PATENT DOCUMENTS

| | | | |
|---|---|---|---|
| 2019/0379431 A1 | 12/2019 | Park et al. | |
| 2019/0393972 A1* | 12/2019 | Pan | H04J 11/0073 |
| 2020/0195358 A1 | 6/2020 | Yokomakura et al. | |

FOREIGN PATENT DOCUMENTS

| | | |
|---|---|---|
| WO | 2018/128410 A1 | 7/2018 |
| WO | 2020/030675 A1 | 2/2020 |
| WO | 2020/145751 A1 | 7/2020 |
| WO | 2020/166902 A1 | 8/2020 |
| WO | 2020/204597 A1 | 10/2020 |

OTHER PUBLICATIONS

Ericsson, "E402 Identification of measurement object corresponding to th serving carrier", 3GPP TSG-RAN WG2 NR 1101, R2-1803449, 9 pages.

Nokia et al., "Mobility and RRM for NR-based access to Unlicensed Spectrum", 3GPP TSG-RAN WG2 Meeting #102, May 21-25, 2018, R2-1807147, 5 pages.

Intel Corporation, "Configuration on measurement object for NR", 3GPP TSG RAN WG2 Meeting #102, May 21-25, 2018, R2-1807337, 2 pages.

Notification of Transmittal of the International Search Report and the Written Opinion of the International Searching Authority, or the Declaration dated Oct. 29, 2019 in connection with International Patent Application No. PCT/KR2019/008956, 9 pages.

"3rd Generation Partnership Project; Technical Specification Group Radio Access Network; NR; Physical channels and modulation (Release 15)", 3GPP TS 38.211 V15.4.0, Dec. 2018, 96 pages.

"3rd Generation Partnership Project; Technical Specification Group Radio Access Network; NR; Multiplexing and channel coding (Release 15)", 3GPP TS 38.212 V15.4.0, Dec. 2018, 100 pages.

"3rd Generation Partnership Project; Technical Specification Group Radio Access Network; NR; Physical layer procedures for control (Release 15)", 3GPP TS 38.213 V15.4.0, Dec. 2018, 104 pages.

"3rd Generation Partnership Project; Technical Specification Group Radio Access Network; NR; Physical layer procedures for data (Release 15)", 3GPP TS 38.214 V15.4.0, Dec. 2018, 102 pages.

"3rd Generation Partnership Project; Technical Specification Group Radio Access Network; NR; Physical layer measurements (Release 15)", 3GPP TS 38.215 V15.4.0, Dec. 2018, 15 pages.

"3rd Generation Partnership Project; Technical Specification Group Radio Access Network; NR; Medium Access control (MAC) protocol specification (Release 15)", 3GPP TS 38.321 V15.4.0, Dec. 2018, 77 pages.

"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.

ZTE Corporation et al., "Clarification on SSB-ToMeasue bitmap in SMTC configuration", 3GPP TSG-RAN WG2 Meeting #101, Feb. 26-Mar. 2, 2018, R2-1802023, 5 pages.

Qualcomm Incorporated, "Initial access and mobility procedures for NR unlicensed", 3GPP TSG RAN WG1 Meeting #96bis, Apr. 8-12, 2019, R1-1905000, 15 pages.

Ericsson, "Enhancements to initial access procedure", 3GPP TSG-RAN WG1 Meeting #97, May 13-17, 2019, R1-1907455, 14 pages.

Supplementary European Search Report dated Aug. 20, 2021 in connection with European Patent Application No. 19 83 7601, 22 pages.

* cited by examiner

METHOD AND APPARATUS FOR RRM MEASUREMENT ENHANCEMENT FOR NR UNLICENSED

CROSS-REFERENCE TO RELATED APPLICATIONS AND CLAIM OF PRIORITY

This application is a continuation of U.S. patent application Ser. No. 16/513,528, filed on Jul. 16, 2019, which claims priority to: U.S. Provisional Patent Application No. 62/700,437, filed on Jul. 19, 2018; U.S. Provisional Patent Application No. 62/785,166 filed on Dec. 26, 2018; U.S. Provisional Patent Application No. 62/817,699 filed on Mar. 13, 2019; U.S. Provisional Patent Application No. 62/819,900 filed on Mar. 18, 2019; U.S. Provisional Patent Application No. 62/853,897 filed on May 29, 2019; and U.S. Provisional Patent Application No. 62/857,494 filed on Jun. 5, 2019. The content of the above-identified patent documents is incorporated herein by reference.

TECHNICAL FIELD

The present disclosure relates generally to RRM measurement in NR unlicensed.

BACKGROUND

A new radio (NR) supports radio resource management (RRM) measurement for L3 mobility, including synchronization signals (SS) based RRM measurement and channel state information reference signal (CSI-RS) based RRM measurement. In SS based RRM measurement, SS reference signal received power (SS-RSRP) and SS reference signal received quality (SS-RSRQ) are measured by the UE and reported to the gNB. SS-RSRP is measured based on the resource elements that carry secondary synchronization signals (SSS), and potentially based on the resource elements that carry the demodulation reference signals (DMRS) for physical broadcast channel (PBCH) in addition, up to UE's implementation.

SUMMARY

Embodiments of the present disclosure provide methods and apparatuses for RRM measurement enhancement in NR unlicensed.

In one embodiment, a user equipment (UE) in a wireless communication system is provided. The UE comprises a transceiver configured to receive, from a base station (BS), a set of radio resource control (RRC) parameters comprising at least one measurement object (MO). The UE further comprises at least one processor configured to: identify, based on the at least one MO, at least one modulo value for synchronization signals and physical broadcast channel (SS/PBCH) blocks, and at least one bitmap indicating indices of the SS/PBCH blocks; identify a set of SS/PBCH block locations based on the at least one modulo value and the at least one bitmap; and perform radio resource management (RRM) measurement based on the identified set of SS/PBCH block locations. The transceiver is further configured to transmit, to the BS via an uplink channel, a measurement report message including a result of the RRM measurement.

In another embodiment, a base station (BS) in a wireless communication system is provided. The BS comprises a transceiver configured to: transmit, to a user equipment (UE), a set of radio resource control (RRC) parameters comprising at least one measurement object (MO); and receive, from the UE via an uplink channel, a measurement report message including a result of RRM measurement. The BS further comprises at least one processor operably connected to the transceiver, the at least on processor configured to identify the result of RRM measurement that is performed based on a set of SS/PBCH block locations, and configure at least one modulo value for synchronization signals and physical broadcast channel (SS/PBCH) blocks, and at least one bitmap indicating indices of the SS/PBCH blocks, in the at least one MO, and wherein the set of SS/PBCH block locations are based on the at least one modulo value and the at least one bitmap.

In yet another embodiment, a method of a user equipment (UE) in a wireless communication system is provided. The method comprises: receiving, from a base station (BS), a set of radio resource control (RRC) parameters comprising at least one measurement object (MO); identifying, based on the at least one MO, at least one modulo value for synchronization signals and physical broadcast channel (SS/PBCH) blocks, and at least one bitmap indicating indices of the SS/PBCH blocks; identifying a set of SS/PBCH block locations based on the at least one modulo value and the at least one bitmap; performing radio resource management (RRM) measurement based on the identified set of SS/PBCH block locations; and transmitting, to the BS via an uplink channel, a measurement report message including a result of the RRM measurement.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
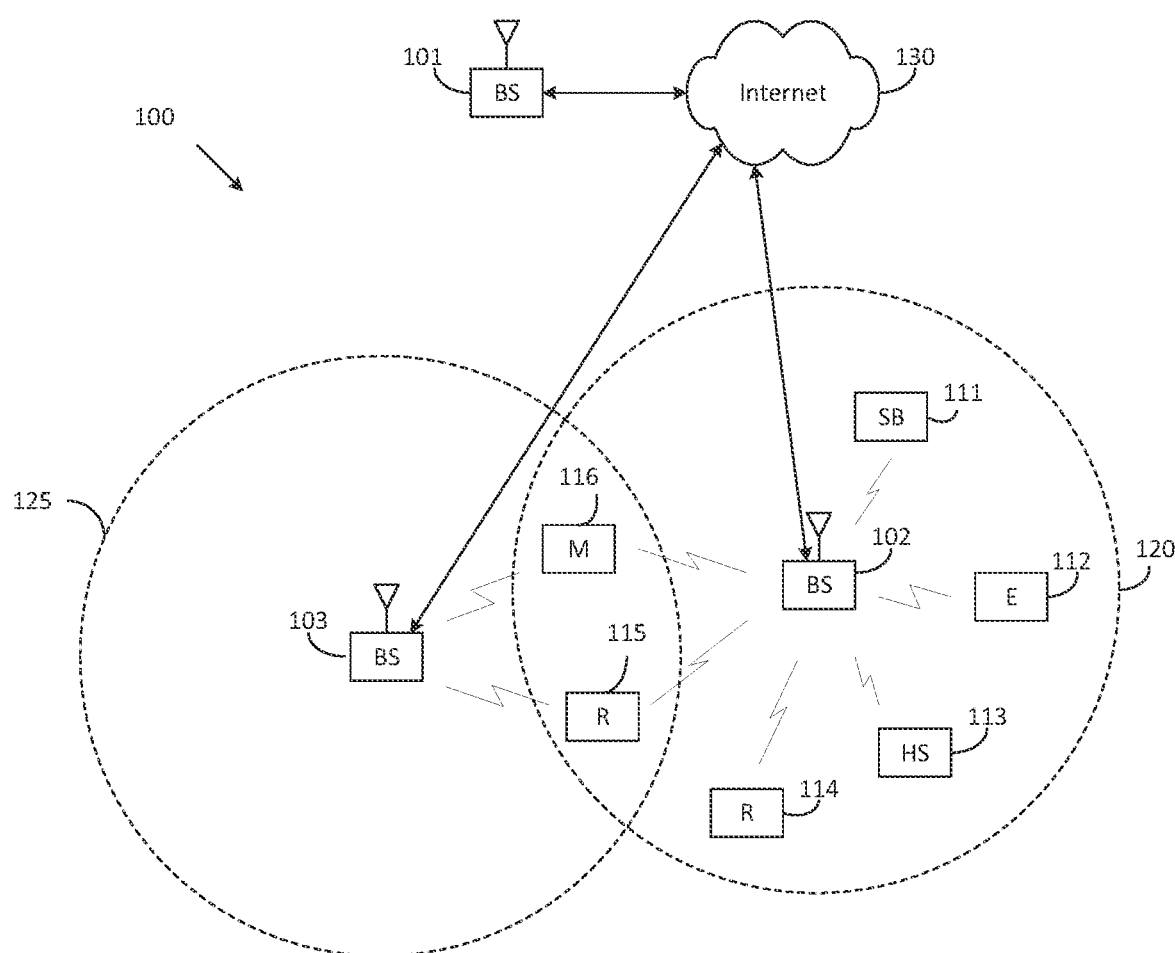
FIG. 1 illustrates an example wireless network according to embodiments of the present disclosure.

FIG. 1 through FIG. 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 38.211 v15.4.0, "NR; Physical channels and modulation;" 3GPP TS 38.212 v15.4.0, "NR; Multiplexing and channel coding;" 3GPP TS 38.213 v15.4.0, "NR; Physical layer procedures for control;" 3GPP TS 38.214 v15.4.0, "NR; Physical layer procedures for data;" 3GPP TS 38.215 v15.4.0, "NR; Physical layer measurements;" 3GPP TS 38.331 v15.4.0, "NR; Radio Resource Control (RRC) protocol specification;" and 3GPP TS 38.321 v15.2.0, "NR; Medium Access Control (MAC) protocol specification."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
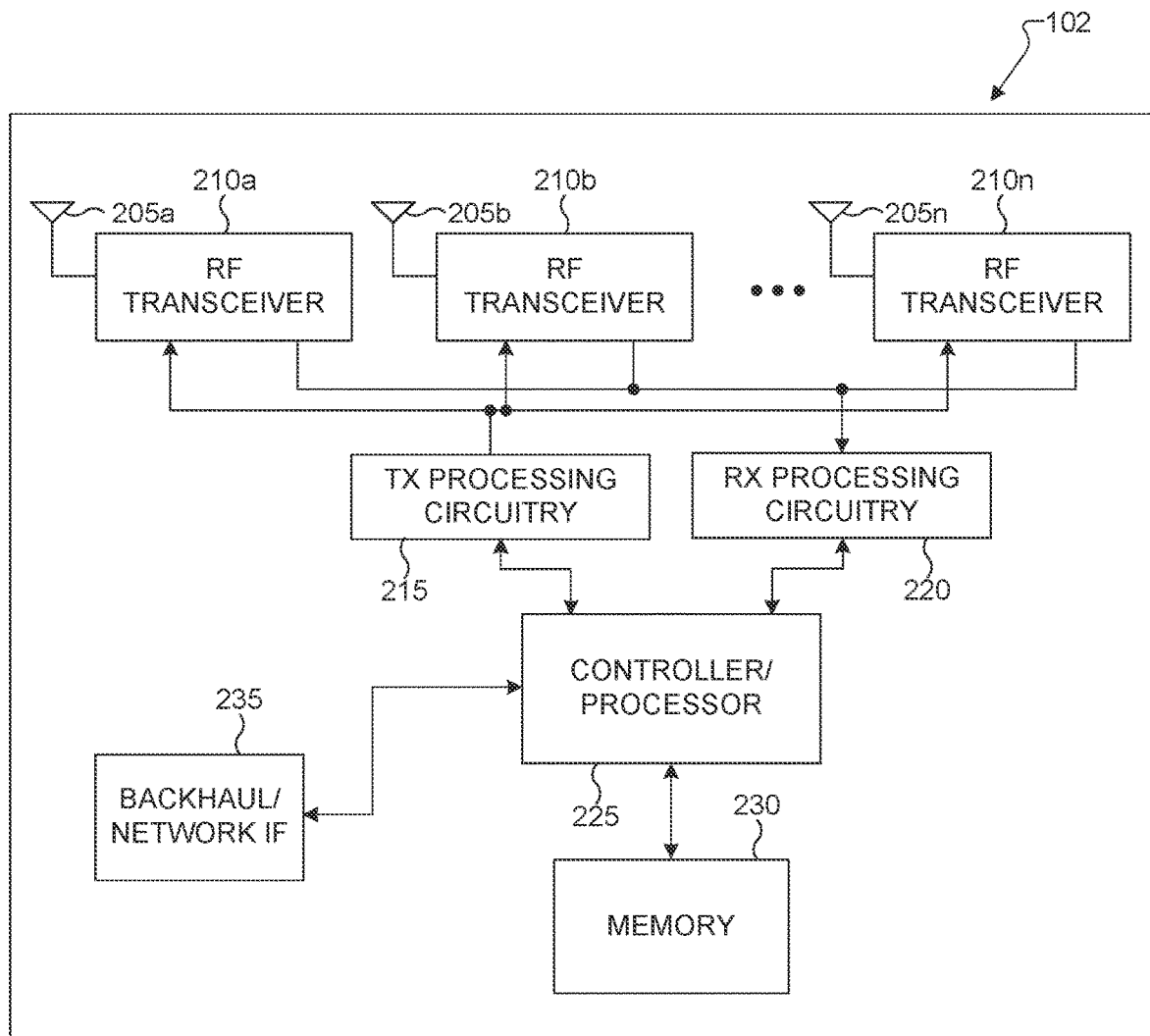
FIG. 2 illustrates an example gNB according to embodiments of the present disclosure.
Figure 3:
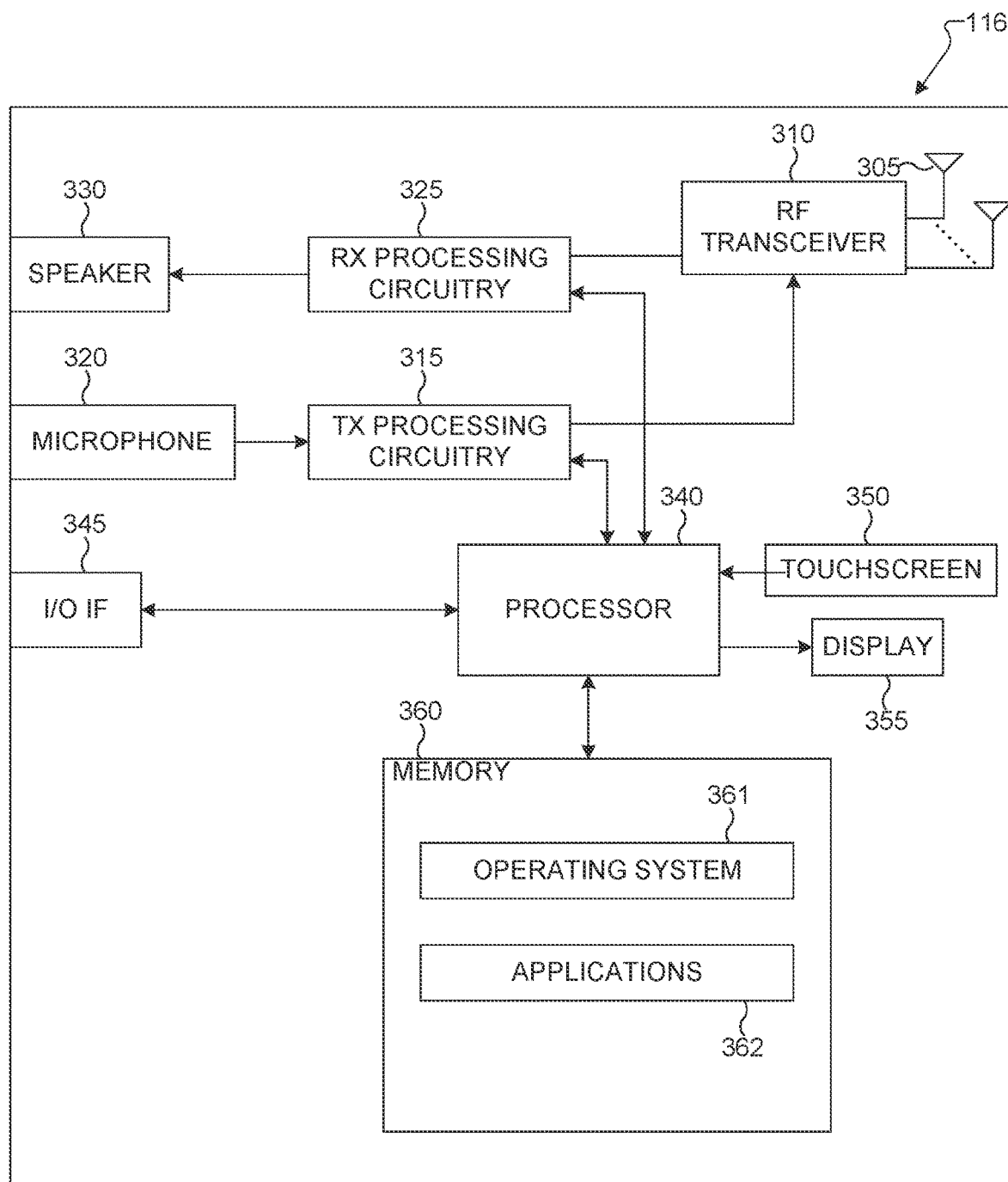
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient RRM measurement in NR unlicensed. In certain embodiments, and one or more of the gNBs 101-103 includes circuitry, programming, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
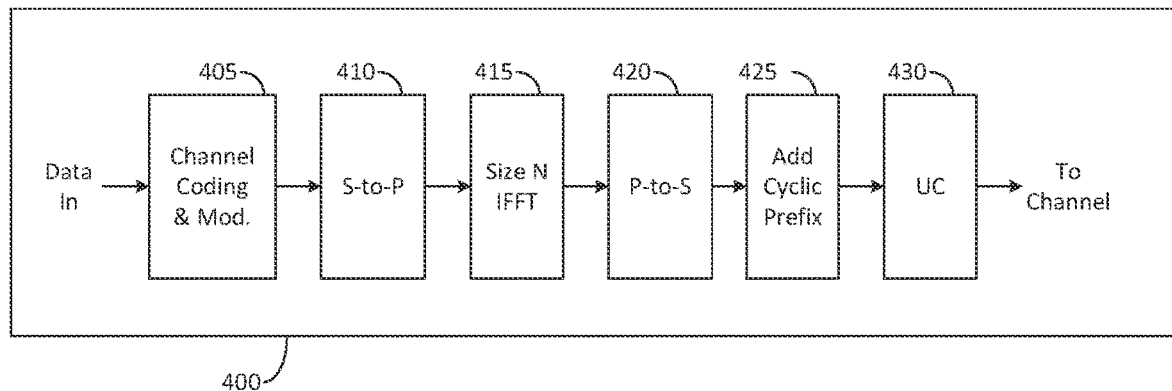
FIG. 4A illustrates a high-level diagram of an orthogonal frequency division multiple access transmit path according to embodiments of the present disclosure.
Figure 4B:
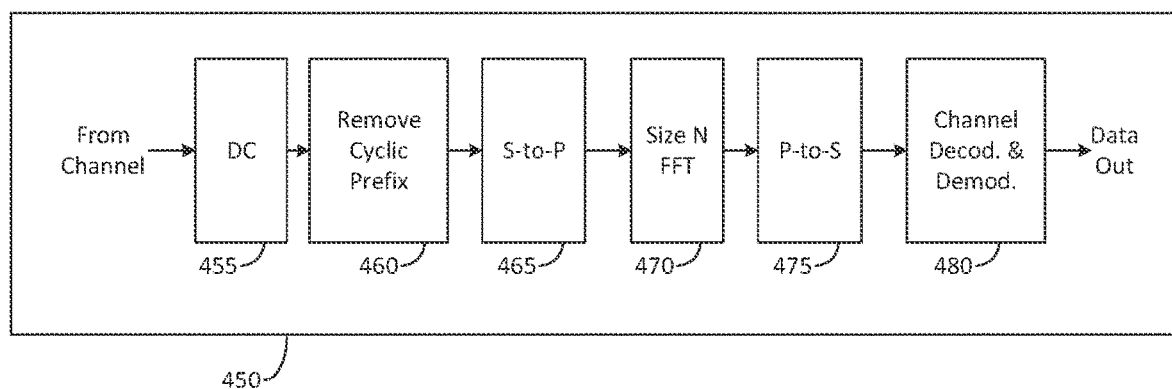
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
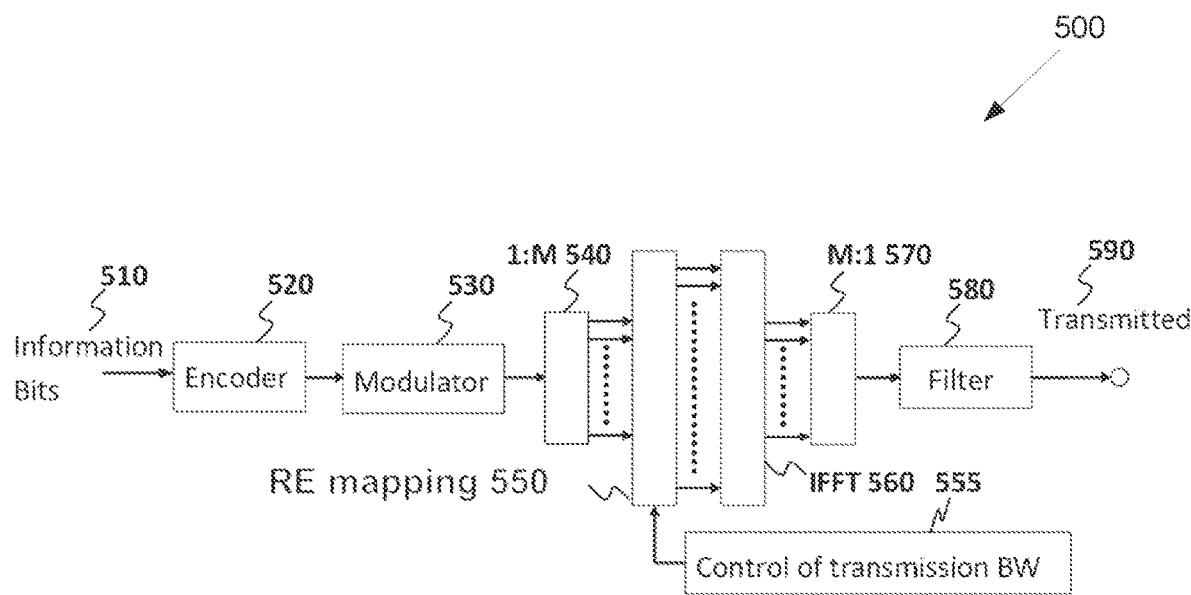
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of the present disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
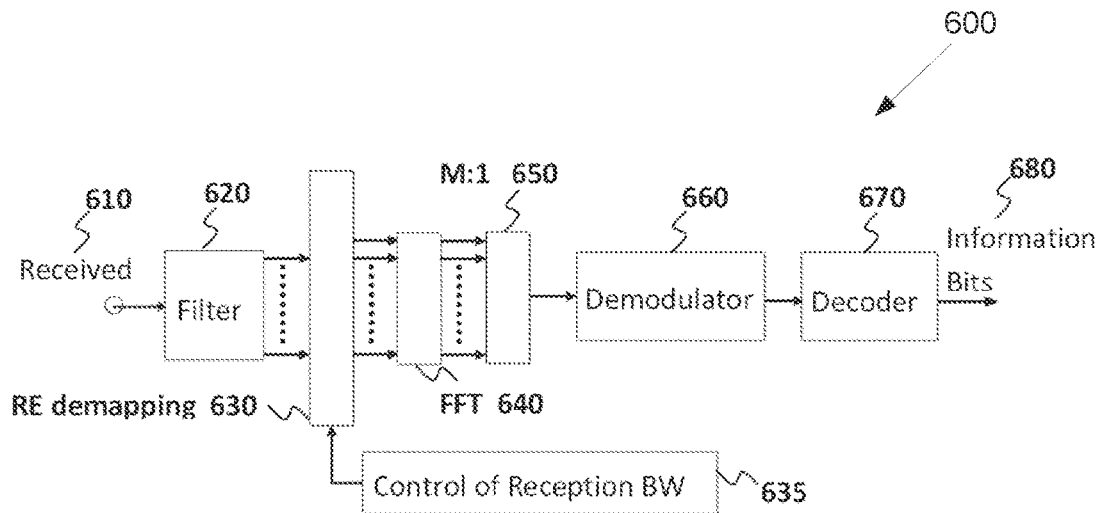
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of the present disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
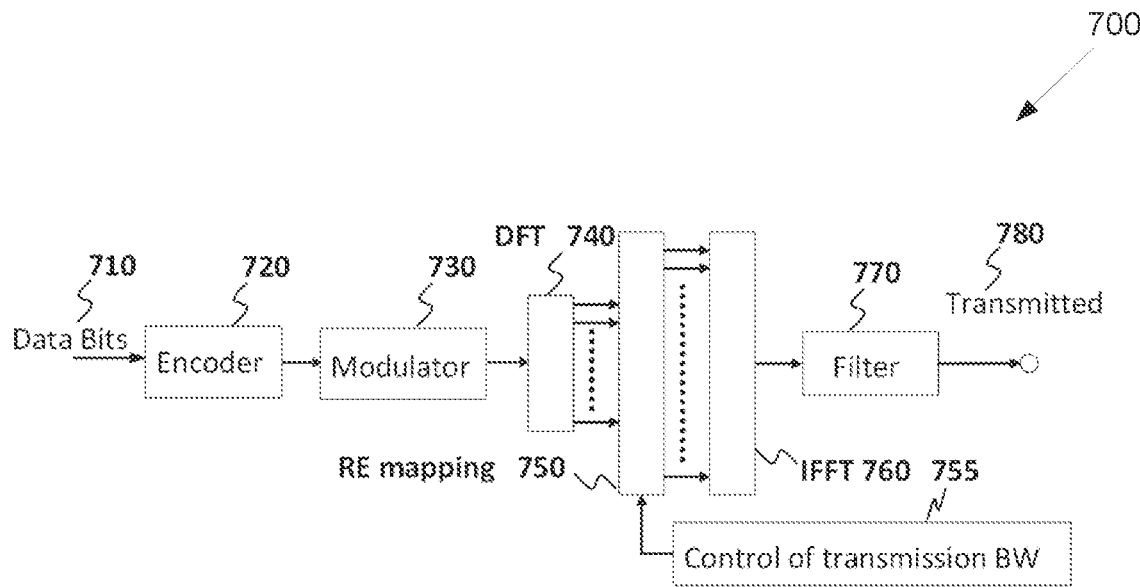
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of the present disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
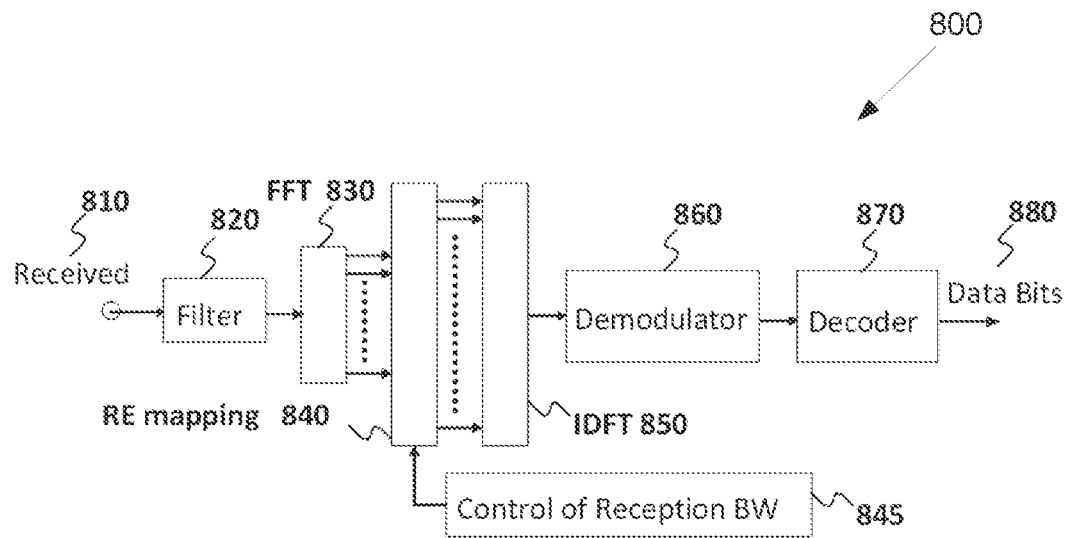
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of the present disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

A new radio (NR) supports radio resource management (RRM) measurement for L3 mobility, including synchronization signals (SS) based RRM measurement and channel state information reference signal (CSI-RS) based RRM measurement.

In SS based RRM measurement, SS reference signal received power (SS-RSRP) and SS reference signal received quality (SS-RSRQ) are measured by the UE and reported to the gNB. SS-RSRP is measured based on the resource elements that carry secondary synchronization signals (SSS), and potentially based on the resource elements that carry the demodulation reference signals (DMRS) for physical broadcast channel (PBCH) in addition, up to UE's implementation.

The measurement time resources for SS-RSRP are confined within the SS/PBCH-block measurement time configuration (SMTC), and the UE is not expected to perform SS-RSRP outside the SMTC, wherein the SMTC is configured to the UE by other system information (OSI) for RRC_IDLE and RRC_INACTIVE mode and by radio resource control (RRC) for RRC_CONNECTED, and each SMTC configuration contains a window periodicity, a window duration, and a window offset. SS-RSRQ is defined as the ratio of N times SS-RSRP and NR carrier received signal strength indicator (RSSI), where N is the number of resource blocks in the NR carrier RSSI measurement bandwidth. For NR carrier RSSI, the measurement bandwidth is the same as SS-RSRP, and the measurement time resource is configured by OSI for RRC_IDLE and RRC_INACTIVE mode and by RRC for RRC_CONNECTED.

The measurement time resource configuration contains a slot-level indication within the SMTC, where the indication is using a bitmap, and a symbol-level indication within the configured slot(s), where the indication is using a starting symbol index as 0 and configurable ending symbol index from the set of {1, 5, 7, 11}.

In CSI-RS based RRM measurement, CSI reference signal received power (CSI-RSRP) and CSI reference signal received quality (CSI-RSRQ) are measured by the UE and reported to the gNB, wherein the CSI-RS for RRM measurement is assumed to be transmitted periodically in NR specification.

CSI-RSRP is measured based on the resource elements that carry CSI-RS configured by RRC for RRM measurement purpose. CSI-RSRQ is defined as the ratio of N times CSI-RSRP and CSI-RSSI, where N is the number of resource blocks in the CSI-RSSI measurement bandwidth. For CSI-RSSI, the measurement bandwidth is the same as the configured CSI-RS, and the measurement time resource corresponds to the symbols containing the configured CSI-RS occasions.

NR-based access to unlicensed spectrum (e.g., NR unlicensed or NR-U) targets for next generation wireless systems operating on both sub6 and above6 unlicensed bands. Due to potential required channel sensing before the transmission of signals and channels in both downlink and uplink, e.g., listen-before-talk (LBT), the actual transmission of periodic signals for RRM measurement may not take place subject to the channel sensing results. This uncertainty of channel access can lead to degraded performance of RRM measurement, and enhancements to NR RRM measurement may be introduced for NR-U.

Moreover, there can be new signals introduced for NR-U for addressing exclusive feature of unlicensed band operation, and some of the signals may also be beneficial to be served as reference signals for RRM measurement. Based on these motivations, enhancement to NR RRM measurement is targeted in this disclosure, at least including the RRM measurement configuration enhancement to address the LBT, new reference signals for RRM measurement in NR-U, and new UE measurement capabilities for NR-U. Note that the embodiments in this disclosure are motivated by addressing exclusive features in NR-U, but can also be utilized in general for other purpose as well.

The present disclosure provide an enhancement to NR RRM measurement for NR unlicensed spectrum, at least including the RRM measurement configuration enhancement to address the LBT, new reference signals for RRM measurement in NR-U, and new UE measurement capabilities for NR-U.

The present disclosure provides the following embodiments: RRM Measurement based on Enhanced SS/PBCH block; SMTC Enhancement for NRU; ZP-CSI-RS based RRM measurement; CSI-RS configuration enhancement for NRU; WUS/GTSS based RRM measurement; and RSSI measurement and reporting The present disclosure provides several embodiments which can be used in conjunction or in combination with one another, or can operate as standalone schemes. The embodiments, aspects, and examples in this disclosure may not be limited to the application of NR unlicensed spectrum (NR-U) only.

In one embodiment, the embodiments, embodiments, aspects, and examples this disclosure can be utilized for SINR calculation for NR-U DRS based radio link monitoring as well.

Figure 9:
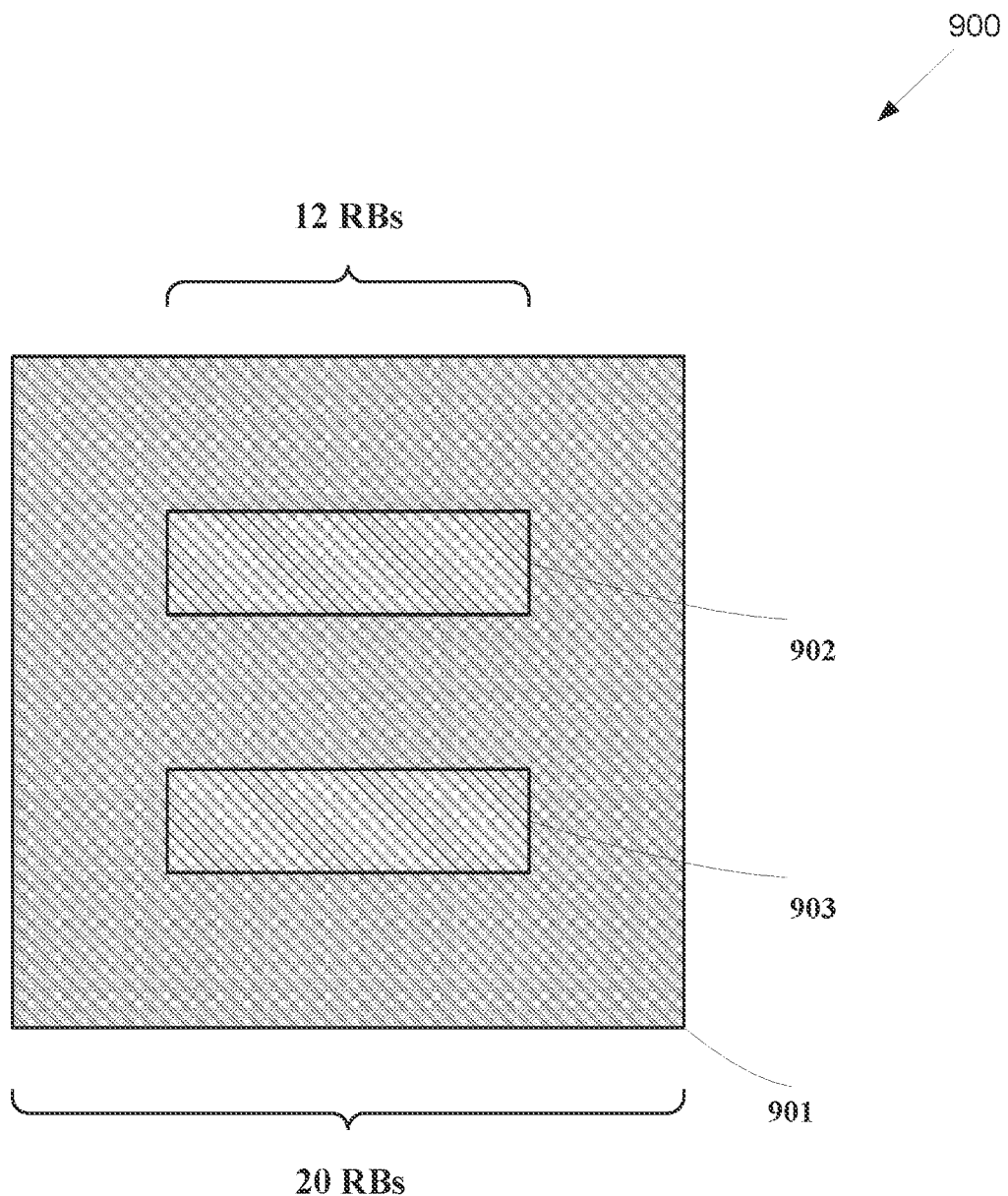
FIG. 9 illustrates an example enhanced SS/PBCH block containing enhanced SSS according to embodiments of the present disclosure.
Figure 10:
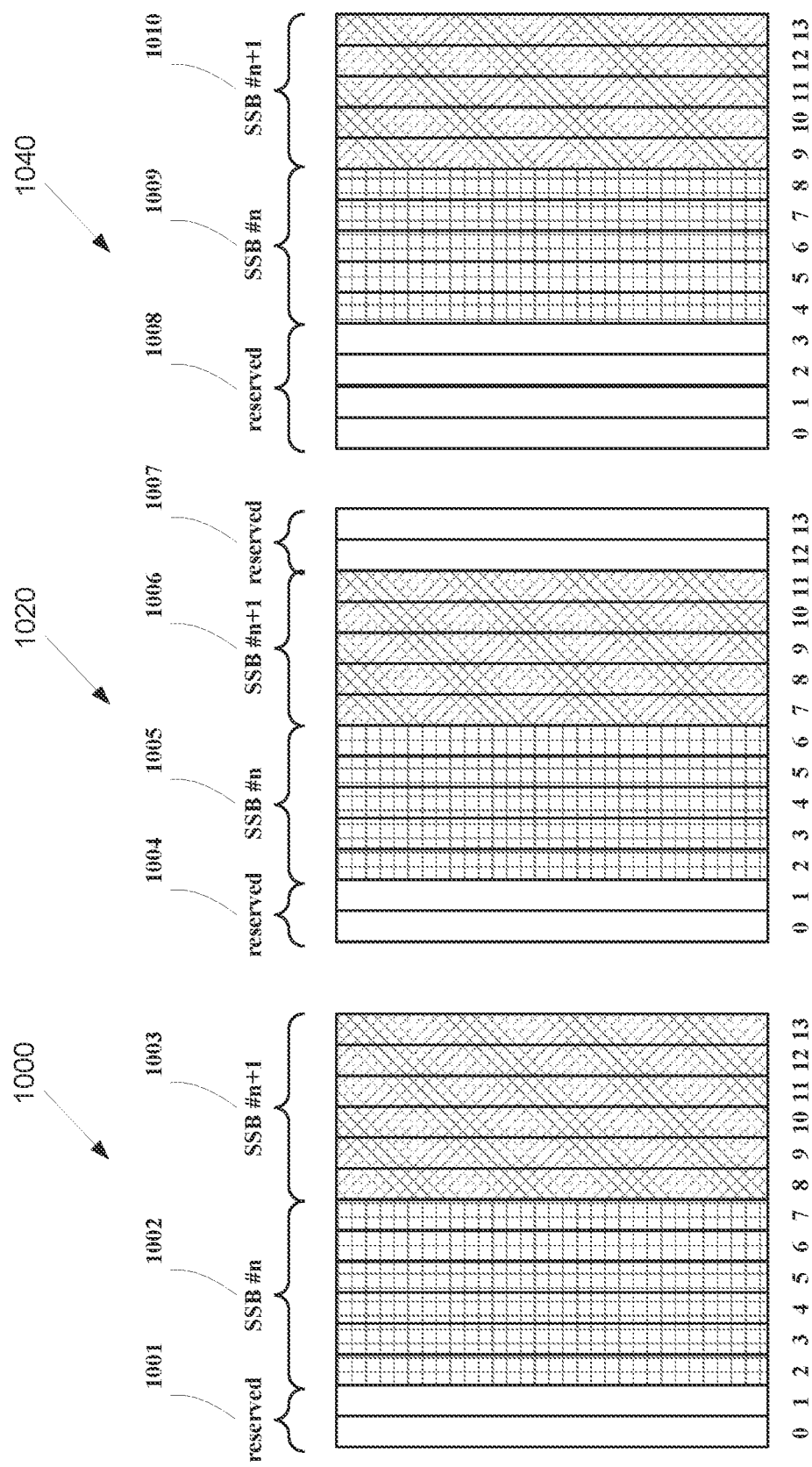
FIG. 10A illustrates an example mapping of enhanced SS/PBCH blocks in a slot according to embodiments of the present disclosure.
FIG. 10B illustrates another example mapping of enhanced SS/PBCH blocks in a slot according to embodiments of the present disclosure.
FIG. 10C illustrates yet another example mapping of enhanced SS/PBCH blocks in a slot according to embodiments of the present disclosure.
Figure 11:
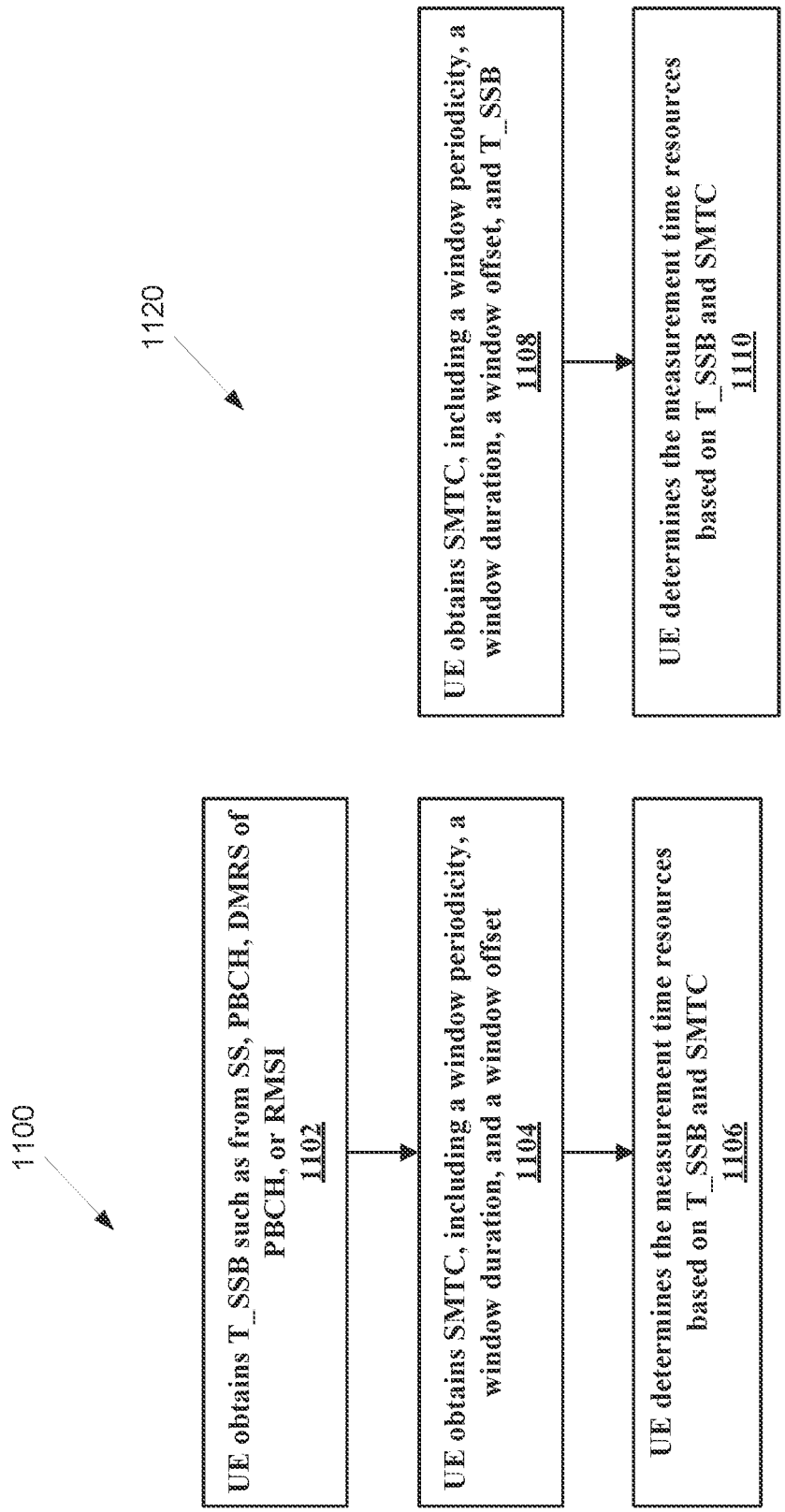
FIG. 11A illustrates an example UE procedure in obtaining T_SSB and determining measurement time resources according to embodiments of the present disclosure.
FIG. 11B illustrates an example UE procedure in obtaining T_SSB and determining measurement time resources according to embodiments of the present disclosure.

FIG. 9 illustrates an example enhanced SS/PBCH block containing enhanced SSS 900 according to embodiments of the present disclosure. The embodiment of the enhanced SS/PBCH block containing enhanced SSS 900 illustrated in FIG. 9 is for illustration only. FIG. 9 does not limit the scope of the present disclosure to any particular implementation.

For a NR unlicensed spectrum, an NR SS/PBCH block can be enhanced to contain larger number of symbols in order to improve the one-shot detection performance and to address the issue of channel access uncertainty due to LBT. One possible enhancement design is to introduce extra symbols for enhanced PSS or enhanced SSS or enhanced PBCH (including DMRS).

For example, as shown in FIG. 9, one enhanced SS/PBCH block (901 in FIG. 9) may comprise more than one symbols partially mapped for SSS or enhanced SSS (e.g., 102 and 103 in FIG. 9).

In one embodiment, RRM measurement is provided based on an enhanced SS/PBCH block, wherein the enhanced SS/PBCH block comprises at least enhanced SSS. The application of this embodiment include at least NR unlicensed spectrum.

For example, if an enhanced SSS in an enhanced SS/PBCH block is supported in a NR-U band, wherein the enhanced SSS is essentially a cell-specific signal, the enhanced SSS can be served as reference signal for RRM measurement as well, since the enhanced SSS is TDMed with SSS and provides wider range of symbols for RRM measurement in the time domain.

In one embodiment, SS-RSRP can be defined as the linear average over the power contributions of the resource elements that carry SSS or enhanced SSS. The measurement time resources for SS-RSRP are still confined within the SMTC window duration, wherein there may be enhancement to the SMTC for NR-U. Also, DMRS of PBCH in the enhanced SS/PBCH block can also be utilized for defining the SS-RSRP up to implementation, wherein the DMRS of PBCH in the enhanced SS/PBCH block may contain more resource elements comparing to the NR SS/PBCH block if more RBs are used to carry PBCH in the enhanced SS/PBCH block for NR-U.

In one example, the enhanced SSS is supported for cell-defining SS/PBCH block only, and it is not supported for non-cell-defining SS/PBCH block. In this case, the SS-RSRP can be defined as the linear average over the power contributions of the resource elements that carry SSS for non-cell-defining SS/PBCH block, and can be defined as the linear average over the power contributions of the resource elements that carry SSS or enhanced SSS for cell-defining SS/PBCH block.

In one embodiment, SS-RSRQ can also be measured based on eSSS, if eSSS is supported, wherein the SS-RSRQ is defined based on the NR carrier RSSI, and the measurement time resources for NR carrier RSSI are confined within the configured SMTC window duration. The slots and OFDM symbols within the slots to perform NR carrier RSSI measurement can be configured by the higher layers, and the configurations of the OFDM symbols within a configured slot may try to cover all possible symbols for DL transmission including symbol(s) for eSSS (may also include ePSS and ePBCH as well if supported in the enhanced SS/PBCH block). Hence, the configuration of ending symbol indexes in SS-RSSI-MeasurementSymbolConfig may be changed to address the enhanced DL symbols within the enhanced SS/PBCH block.

FIG. 10A illustrates an example mapping of enhanced SS/PBCH blocks in a slot 1000 according to embodiments of the present disclosure. The embodiment of the mapping of enhanced SS/PBCH blocks in a slot 1000 illustrated in FIG. 10A is for illustration only. FIG. 10A does not limit the scope of the present disclosure to any particular implementation.

FIG. 10B illustrates another example mapping of enhanced SS/PBCH blocks in a slot 1020 according to embodiments of the present disclosure. The embodiment of the mapping of enhanced SS/PBCH blocks in a slot 1020 illustrated in FIG. 10B is for illustration only. FIG. 10B does not limit the scope of the present disclosure to any particular implementation.

FIG. 10C illustrates yet another example mapping of enhanced SS/PBCH blocks in a slot 1040 according to embodiments of the present disclosure. The embodiment of the mapping of enhanced SS/PBCH blocks in a slot 1040 illustrated in FIG. 10C is for illustration only. FIG. 10C does not limit the scope of the present disclosure to any particular implementation.

In one example, the configured ending symbol indexes in SS-RSSI-MeasurementSymbolConfig can be from the set $\{1, 7, 13, \text{reserved}\}$, with starting symbol index fixed as 0. This example can apply to the mapping pattern of SS/PBCH blocks as in FIGS. 10A, 10B, and 10C.

As illustrated in FIG. 10A, wherein within a slot, symbols #0 and #1 are reserved such as for control resource set (CORESET) or LBT, symbol #2 to #7 are mapped for a first SS/PBCH block within the slot, and symbol #8 to #13 are mapped for a second SS/PBCH block within the slot. For this mapping pattern, the contiguous symbols with {starting symbol index, ending symbol index} as $\{0, 1\}$, or $\{0, 7\}$, or $\{0, 13\}$ are all for potential downlink transmissions.

For a second example of this embodiment, the configured starting and ending symbol indexes pair in SS-RSSI-MeasurementSymbolConfig can be from the set $\{\{0, 1\}, \{0, 7\}, \{0, 13\}, \{2, 13\}\}$. This example can apply to the mapping pattern of SS/PBCH blocks as in FIG. 10A, wherein within a slot, symbols #0 and #1 are reserved such as for control resource set (CORESET) or LBT, symbol #2 to #7 are mapped for a first SS/PBCH block within the slot, and symbol #8 to #13 are mapped for a second SS/PBCH block within the slot. For this mapping pattern, the contiguous symbols with {starting symbol index, ending symbol index} as $\{0, 1\}$, or $\{0, 7\}$, or $\{0, 13\}$ or $\{2, 13\}$ are all for potential downlink transmissions.

In one example, the configured ending symbol indexes in SS-RSSI-MeasurementSymbolConfig can be from the set $\{1, 6, 11, \text{reserved}\}$, with starting symbol index fixed as 0. This example can apply to the mapping pattern of SS/PBCH blocks as in FIG. 10B, wherein within a slot, symbols #0 and #1 are reserved such as for control resource set (CORESET) or LBT, symbol #2 to #6 are mapped for a first SS/PBCH block within the slot, symbol #7 to #11 are mapped for a second SS/PBCH block within the slot, and symbol #12 and #13 are reserved such as for gap or UL control. For this mapping pattern, the contiguous symbols with {starting symbol index, ending symbol index} as $\{0, 1\}$, or $\{0, 6\}$, or $\{0, 11\}$ are all for potential downlink transmissions.

In one example, the configured starting and ending symbol indexes pair in SS-RSSI-MeasurementSymbolConfig can be from the set $\{\{0, 1\}, \{0, 6\}, \{0, 11\}, \{2, 11\}\}$. This example can apply to the mapping pattern of SS/PBCH blocks as in FIG. 10B, wherein within a slot, symbols #0 and #1 are reserved such as for control resource set (CORESET) or LBT, symbol #2 to #6 are mapped for a first SS/PBCH block within the slot, symbol #7 to #11 are mapped for a second SS/PBCH block within the slot, and symbol #12 and #13 are reserved such as for gap or UL control. For this mapping pattern, the contiguous symbols with {starting symbol index, ending symbol index} as $\{0, 1\}$, or $\{0, 6\}$, or $\{0, 11\}$, or $\{2, 11\}$ are all for potential downlink transmissions.

In one example, the configured ending symbol indexes in SS-RSSI-MeasurementSymbolConfig can be from the set $\{3, 8, 13, \text{reserved}\}$, with starting symbol index fixed as 0. This example can apply to the mapping pattern of SS/PBCH blocks as in FIG. 10C, wherein within a slot, symbols #0 and #3 are reserved such as for control resource set (CORESET) or LBT, symbol #4 to #8 are mapped for a first SS/PBCH block within the slot, and symbol #9 to #13 are mapped for a second SS/PBCH block within the slot. For this mapping pattern, the contiguous symbols with {starting symbol index, ending symbol index} as $\{0, 3\}$, or $\{0, 8\}$, or $\{0, 13\}$ are all for potential downlink transmissions.

For a sixth example of this embodiment, the configured starting and ending symbol indexes pair in SS-RSSI-MeasurementSymbolConfig can be from the set $\{\{0, 3\}, \{0, 8\}, \{0, 13\}, \{4, 13\}\}$. This example can apply to the mapping pattern of SS/PBCH blocks as in FIG. 10C, wherein within a slot, symbols #0 and #3 are reserved such as for control resource set (CORESET) or LBT, symbol #4 to #8 are mapped for a first SS/PBCH block within the slot, and symbol #9 to #13 are mapped for a second SS/PBCH block within the slot. For this mapping pattern, the contiguous symbols with {starting symbol index, ending symbol index} as $\{0, 3\}$, or $\{0, 8\}$, or $\{0, 13\}$, or $\{4, 13\}$ are all for potential downlink transmissions.

In one example, the configured ending symbol indexes in SS-RSSI-MeasurementSymbolConfig can be from the set $\{1, 3, 6, 11\}$, with starting symbol index fixed as 0. This example can apply to the mapping pattern of SS/PBCH blocks as in FIGS. 10B and 10C both supported, wherein for pattern (b), as illustrated in FIG. 10B, within a slot, symbols #0 and #1 are reserved such as for control resource set (CORESET) or LBT, symbol #2 to #6 are mapped for a first SS/PBCH block within the slot, symbol #7 to #11 are mapped for a second SS/PBCH block within the slot, and symbol #12 and #13 are reserved such as for gap or UL control, and for pattern (c), as illustrated in FIG. 10C, within a slot, symbols #0 and #3 are reserved such as for control resource set (CORESET) or LBT, symbol #4 to #8 are mapped for a first SS/PBCH block within the slot, and symbol #9 to #13 are mapped for a second SS/PBCH block within the slot. For these two mapping patterns, the contiguous symbols with {starting symbol index, ending symbol index} as {0, 1}, or {0, 3}, or {0, 6}, or {0, 11} are all for potential downlink transmissions.

In one example, the configured ending symbol indexes in SS-RSSI-MeasurementSymbolConfig can be from the set {1, 3, 8, 13}, with starting symbol index fixed as 0. This example can apply to the mapping pattern of SS/PBCH blocks as in FIGS. 10B and 10C both supported, wherein for pattern (b), as illustrated in FIG. 10B, within a slot, symbols #0 and #1 are reserved such as for control resource set (CORESET) or LBT, symbol #2 to #6 are mapped for a first SS/PBCH block within the slot, symbol #7 to #11 are mapped for a second SS/PBCH block within the slot, and symbol #12 and #13 are reserved such as for gap or UL control, and for pattern (c), as illustrated in FIG. 10C, within a slot, symbols #0 and #3 are reserved such as for control resource set (CORESET) or LBT, symbol #4 to #8 are mapped for a first SS/PBCH block within the slot, and symbol #9 to #13 are mapped for a second SS/PBCH block within the slot. For these two mapping patterns, the contiguous symbols with {starting symbol index, ending symbol index} as {0, 1}, or {0, 3}, or {0, 8}, or {0, 13} are all for potential downlink transmissions.

In on embodiment, the aspects of SMTC enhancement due to LBT in the unlicensed spectrum is provided. In one example, if the SS/PBCH block is as part of NR-U discovery reference signal (DRS), the enhancement in this embodiment also applies to DRS measurement timing configuration (DMTC).

Due to LBT, the transmission of an SS/PBCH burst set may not always start from the starting boundary of the corresponding half frame. The timing offset between the starting of slots containing an SS/PBCH burst set and the starting boundary of a half frame wherein the SS/PBCH burst set is transmitted, denoted as T_SSB in this disclosure, can be known to the UE, e.g., by predefining some fixed time location(s) for the UE to detect or explicitly indicating to the UE.

For one example, the timing offset T_SSB can be cell-specific. For another example, the timing offset T_SSB can be carrier-specific. When multiple cells exist on the same carrier, the starting of slots containing SS/PBCH burst sets for different cells in the same carrier is the same. For example, the carrier can be configured to be with large bandwidth, such that there can be multiple cells configured on the same carrier, and the transmission of all SS/PBCH blocks within the carrier is using the same timing offset T_SSB, subject to the results of LBT.

For yet another example, the timing offset T_SSB can be band-specific. When multiple cells exist on the multiple carriers of the same band, the starting of slots containing SS/PBCH burst sets for different cells in the same band using carrier aggregation is the same. For example, the carriers can be configured to be using carrier aggregation, such that there can be multiple cells configured on the group of carriers, and the transmission of all SS/PBCH blocks within the group of carriers is using the same timing offset T_SSB, subject to the results of LBT.

FIG. 11A illustrates an example UE procedure 1100 in obtaining T_SSB and determining measurement time resources according to embodiments of the present disclosure. The embodiment of the UE procedure 1100 illustrated in FIG. 11A is for illustration only. FIG. 11A does not limit the scope of the present disclosure to any particular implementation.

In one example, if the timing offset T_SSB is indicated to the UE, the timing offset can be indicated separately from SMTC/DMTC. One illustration of this embodiment is illustrated in FIG. 11A.

As illustrated in FIG. 11A, the UE in step 1102 obtains T_SSB such as from SS, PBCH, DMRS of PBCH, or RMSI. In step 1104, the UE obtains SMTC, including a window periodicity, a window duration, and a window offset, and finally, the UE in step 1106 determines the measurement time resources based on T_SSB and SMTC.

For one example of this embodiment, the timing offset T_SSB can be indicated to the UE in a signal/channel prior to the measurement based on the configuration of SMTC/DMTC, wherein the signal/channel can be such as synchronization signals (SS), PBCH, or DMRS of PBCH, or RMSI, or their combination.

FIG. 11B illustrates an example UE procedure 1120 in obtaining T_SSB and determining measurement time resources according to embodiments of the present disclosure. The embodiment of the UE procedure 1120 illustrated in FIG. 11B is for illustration only. FIG. 11B does not limit the scope of the present disclosure to any particular implementation.

As illustrated in FIG. 11B, the UE in step 1108 obtains SMTC, including a window periodicity, a window duration, a window offset, and T_SSB. In step 1110, the UE determines the measurement time resources based on T_SSB and SMTC.

In one example, if the timing offset T_SSB is indicated to the UE, the timing offset can be part of the SMTC/DMTC. One illustration of this embodiment is illustrated in FIG. 11B.

For one example of this embodiment, the timing offset T_SSB can be a single field with value configurable from a predefined set of values for a SMTC/DMTC (e.g., a single configurable value for all configured cells in smtc1 or smtc2 within the MeasObjectNR).

For another example of this embodiment, the timing offset T_SSB can be a single field with value configurable from a predefined set of values for all SMTC/DMTC (e.g., a single configurable value for all configured cells in smtc1 and smtc2 within the MeasObjectNR).

For yet another example of this embodiment, the timing offset T_SSB can be multiple fields, wherein each field can be configured independently from a same predefined set of values a configured cell in the SMTC/DMTC (e.g., every configured cell has one associated T_SSB in smtc1 or smtc2 within the MeasObjectNR).

The timing offset T_SSB can be utilized by the UE to determine the measurement time resources, in addition to the SMTC/DMTC window periodicity, window offset, and window duration provided by the configured SMTC/DMTC.

In one example, the timing offset T_SSB can be different for different carriers due to the uncertainty of LBT result with respect to each carrier. The starting location in time domain for slots containing an SS/PBCH burst set can be predefined, and UE only expects to receive the starting of slots containing an SS/PBCH burst set at one of the predefined locations for a given carrier. The timing offset T_SSB can take values corresponding to the predefined locations for a given carrier. When a UE is configured to perform SS/PBCH block based RRM measurement based on the SMTC/DMTC, the UE can determine the measurement time resources for RRM measurement based on both the SMTC/DMTC, such as window offset (e.g., denoted as SMTC_Offset) and/or window duration (e.g., denoted as SMTC_Duration) configured in the SMTC/DMTC, and the timing offset T_SSB per carrier.

In one example, for a given carrier, the UE can determine the measurement time resources for SS/PBCH block based RRM measurement from max(SMTC_Offset, T_SSB) to max(SMTC_Offset, T_SSB)+SMTC_Duration.

For another example of this embodiment, for a given carrier, the UE can determine the measurement time resources for SS/PBCH block based RRM measurement from max(SMTC_Offset, T_SSB) to SMTC_Offset+ SMTC_Duration.

In one example, the timing offset T_SSB can be different for different cells due to the uncertainty of LBT result with respect to each cell. The starting location in time domain for slots containing an SS/PBCH burst set can be predefined, and UE only expects to receive the starting of slots containing an SS/PBCH burst set at one of the predefined locations for a given cell. The timing offset T_SSB can take values corresponding to the predefined locations for a given cell. When a UE is configured to perform SS/PBCH block based RRM measurement based on the SMTC/DMTC, the UE can determine the measurement time resources for RRM measurement based on both the SMTC/DMTC, such as window offset (e.g., denoted as SMTC_Offset) and/or window duration (e.g., denoted as SMTC_Duration) configured in the SMTC/DMTC, and the timing offset T_SSB per cell.

In one example, for a given cell, the UE can determine the measurement time resources for SS/PBCH block based RRM measurement from max(SMTC_Offset, T_SSB) to max(SMTC_Offset, T_SSB)+SMTC_Duration.

In one example, for a given cell, the UE can determine the measurement time resources for SS/PBCH block based RRM measurement from max(SMTC_Offset, T_SSB) to SMTC_Offset+SMTC_Duration.

In one example, there is no explicit indication of the timing offset T_SSB for measurement purpose (e.g., no indication in RRC parameter). When a UE is configured to perform SS/PBCH block based RRM measurement based on SMTC/DMTC, the UE can reinterpret the bitmap indicating the SS/PBCH block indices to be measured (e.g., SSB-ToMeasure) associated with the SMTC/DMTC to determine the corresponding time resources for SS/PBCH blocks to measure within the SMTC/DMTC window.

Figure 12:
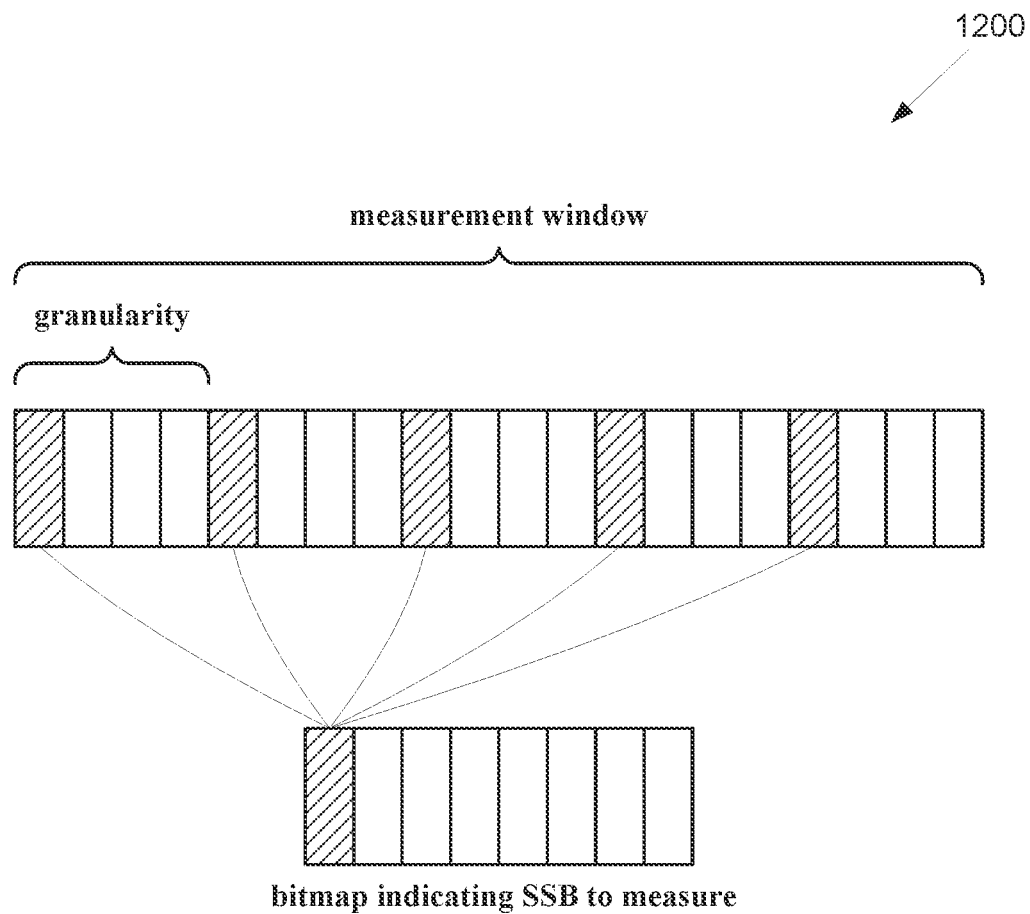
FIG. 12 illustrates an example multiple potential locations for SSB transmission according to embodiments of the present disclosure.

FIG. 12 illustrates an example multiple potential locations for SSB transmission 1200 according to embodiments of the present disclosure. The embodiment of the multiple potential locations for SSB transmission 1200 illustrated in FIG. 12 is for illustration only. FIG. 12 does not limit the scope of the present disclosure to any particular implementation.

In such examples, based on the utilized transmission pattern of SS/PBCH blocks subject to LBT, there can be multiple potential locations for transmitting the SS/PBCH block in the measurement window corresponding to the same bit in the bitmap for indicating the SS/PBCH block indices to be measured (e.g., SSB-ToMeasure) associated with the SMTC/DMTC. An illustration of the example is shown in FIG. 12, wherein a measurement window of SMTC/DMTC is configured to have 20 potential SS/PBCH block locations, and one bit in the bitmap indicating the SS/PBCH block indices to be measured (e.g., SSB-ToMeasure) associated with the SMTC/DMTC can correspond to multiple potential locations within the 20 (e.g., 5 locations in this figure). A UE may perform a detection of SS/PBCH block in the corresponding multiple potential locations, and if the UE is indicated to measure the associated bit by the bitmap, and performs measurement over RS detected on the corresponding multiple potential locations.

In one example, the granularity of potential locations to be measured within a SMTC/DMTC window (e.g., the size of interval between two neighboring potential locations indicated by the same bit in the bitmap to measure) could be indicated to the UE (e.g., denoting the granularity as MeasGranularitySSB).

In one example, the indication can be part of the measurement object containing the SMTC/DMTC (e.g., MeasObjectNR). In one example, the indication is per cell to be measured (e.g., for every cell to be measured, the indication is configured separately with a granularity of potential locations to be measured within the SMTC/DMTC window). In another example, the indication could be common for all cells to be measured (e.g., common granularity of potential locations to be measured within the SMTC/DMTC window for a measurement object).

In one example of the indication, the candidate values to be indicated for MeasGranularitySSB could be predefined. For one example, the candidate values could be {1, 2, 4, 8}. For another example, the candidate values could be {1, 2, 4, 8, 16}. For yet another example, the candidate values could be {2, 4, 8}. For yet another example, the candidate values could be {2, 4, 8, 16}. For yet another example, the candidate values could be {4, 8}. For yet another example, the candidate values could be {4, 8, 16}.

In one example, if the indication is not configured to the UE, the UE may assume a value for MeasGranularitySSB as the default value. In one example, the default value of the granularity of potential locations to be measured within a SMTC/DMTC window is one SS/PBCH block. In another example, the default value of the granularity of potential locations to be measured within a SMTC/DMTC window is the maximum number of SS/PBCH blocks transmitted within a burst for a given band (e.g., 8). In one instance of this aspect, the prefixed value could be possibly dependent on the subcarrier spacing associated with the measurement object.

In one example, the granularity of potential locations to be measured within a SMTC/DMTC window (e.g., the size of interval between two neighboring potential locations indicated by the same bit in the bitmap to measure) is prefixed by the UE. In one example, the prefixed value of the granularity of potential locations to be measured within a SMTC/DMTC window is one SS/PBCH block. In another example, the prefixed value of the granularity of potential locations to be measured within a SMTC/DMTC window is the maximum number of SS/PBCH blocks transmitted within a burst for a given band (e.g., 8). In one instance of this aspect, the prefixed value could be possibly dependent on the subcarrier spacing associated with the measurement object.

In one example, there is an indication of the unit for SS/PBCH block indices to be measured (e.g., SSB-ToMeasure) associated with the SMTC/DMTC. For one example, the indication is either a unit of a SS/PBCH block or a unit of a slot (e.g., two SS/PBCH blocks). In one instance, if there is the indication of the unit for SS/PBCH block indices to be measured, the unit can also be applicable to the granularity of potential locations to be measured within a SMTC/DMTC window (e.g., the indicated value of the granularity of potential locations to be measured within a SMTC/DMTC window (e.g., MeasGranularitySSB) is associated with the indicated unit).

In one example, a UE may not expect any bits with index higher than the granularity of potential locations to be measured within a SMTC/DMTC window (e.g., MeasGranularitySSB) taking the value of 1 in the bitmap indicating SS/PBCH blocks to be measured (e.g., SSB-ToMeasure). For example, the UE only expects the i-th bit in SSB-ToMeasure taking value of 1, wherein i is smaller or equal to the value indicated by MeasGranularitySSB.

In one example, a UE could expect bit with index higher than the granularity of potential locations to be measured within a SMTC/DMTC window (e.g., MeasGranularitySSB) taking the value of 1 in the bitmap indicating SS/PBCH blocks to be measured (e.g., SSB-ToMeasure). In one example for this aspect, the UE could double the value of MeasGranularitySSB until no bit with index higher than MeasGranularitySSB taking the value of 1 in SSB-ToMeasure, and perform measurement based the updated value of MeasGranularitySSB. In another example for this aspect, the UE could assume the bits with index higher than MeasGranularitySSB taking the value of 1 in SSB-ToMeasure does not need to be measured. In yet another example for this aspect, the UE could assume this as an error case, and perform the default measurement (e.g., measure every location within the measurement window).

In one example, a UE may only expect to detect one SS/PBCH block within the group of SS/PBCH block potential locations with interval as MeasGranularitySSB. If the UE detects one SS/PBCH block within the group of SS/PBCH block, the UE can perform measurement based on the RS in the detected SS/PBCH block and stops detecting SS/PBCH blocks from other potential locations. For example, a UE can perform the detection of SS/PBCH blocks in the order of smaller slot index to higher slot index within the measurement window, and if the UE detects one SS/PBCH block within the group of SS/PBCH block, the UE can perform measurement based on the RS in the detected SS/PBCH block and stops detecting SS/PBCH blocks from later slots in the measurement window.

In one example, a UE may assume the SS/PBCH blocks within the group of SS/PBCH block potential locations with interval as MeasGranularitySSB are QCLed.

In one example, the first bit in the bitmap indicating the SS/PBCH block indices to be measured (e.g., SSB-ToMeasure) associated with the SMTC/DMTC corresponds to the first SS/PBCH block within a half frame, regardless of the starting location of the measurement window configured. For example, the measurement window can be configured not to be starting from the start of a half frame, then the first bit in the bitmap indicating SS/PBCH blocks to be measured does not correspond to the first SS/PBCH block location within the measurement window, but corresponds to the first potential SS/PBCH block location within the half frame and all the ones with an interval given by MeasGranularitySSB in the measurement window.

In one example, the duration of measurement window associated with SMTC/DMTC could be enlarged. For example, the maximum duration of the measurement window could be configurable as 10 ms, in order to accommodate the uncertainty of transmission location for SS/PBCH blocks due to LBT.

In one example, the interval of the configurable values for the duration of measurement window associated with SMTC/DMTC could be aligned with the interval of the possible starting locations for SS/PBCH block transmissions.

For NR-U, one design target for measurement is to estimate the interference situation on a carrier. This embodiment comprises the aspects for zero-power channel state information reference signal (ZP-CSI-RS) based RRM measurement, in order to address the interference measurement issue on the unlicensed spectrum.

In one example, the configuration of ZP-CSI-RS for RRM measurement is the same as the configuration of non-zero-power CSI-RS (NZP-CSI-RS) for RRM measurement supported in NR, with respect to the measurement time resources, measurement frequency resources, antenna port, RE density, RE mapping, whether a SS/PBCH block is associated with the CSI-RS resource, and the quasi co-location (QCL) assumption with the SS/PBCH block if associated. In this embodiment, the ZP-CSI-RS can be periodic. The type of CSI-RS resource such as ZP or NZP can be known to the UE, and in one example, for each CRI-RS resource (e.g., CSI-RS-Resource-Mobility) in the MeasObjectNR, a new field is added to indicate CSI-RS resource is NZP-CSI-RS or ZP-CSI-RS.

In one example, the configuration of ZP-CSI-RS for RRM measurement can be differently configured from the configuration of non-zero-power CSI-RS (NZP-CSI-RS) for RRM measurement supported in NR. For example, one use case of ZP-CSI-RS for RRM measurement is to monitor the interference situation of the carrier wherein the gNB failed LBT and didn't transmit on the carrier. In this use case, the gNB can configure the UE to measure the interference from other cells on this carrier (e.g., from those cells with successful LBTs on this carrier) by measuring the resource elements for ZP-CSI-RS, wherein the resource elements for ZP-CSI-RS can be only confined within the time domain resources (e.g., COT associated to the failed LBT) and frequency domain resources (e.g., BW where the failed LBT is performed) where the gNB cannot transmit due to the failed LBT.

In this use case, the configuration of ZP-CSI-RS can be aperiodic. One particular instance of this use case is the configuration of ZP-CSI-RS resources comprises configuration on measurement time resources (e.g., slot index, symbol index), measurement frequency resources (e.g., BWP, bandwidth, frequency location), antenna port, RE density, RE mapping, whether a SS/PBCH block is associated with the CSI-RS resource. In one example of this use case, for a RRC_CONNECTED mode UE, if the UE is not able to detect any DL signal or channel (e.g., detect synchronization signals or decode a PDCCH in the monitoring CORESET), the UE can use the configuration of ZP-CSI-RS to perform RRM measurement. An illustration of this example is shown in FIG. 13.

Figure 13:
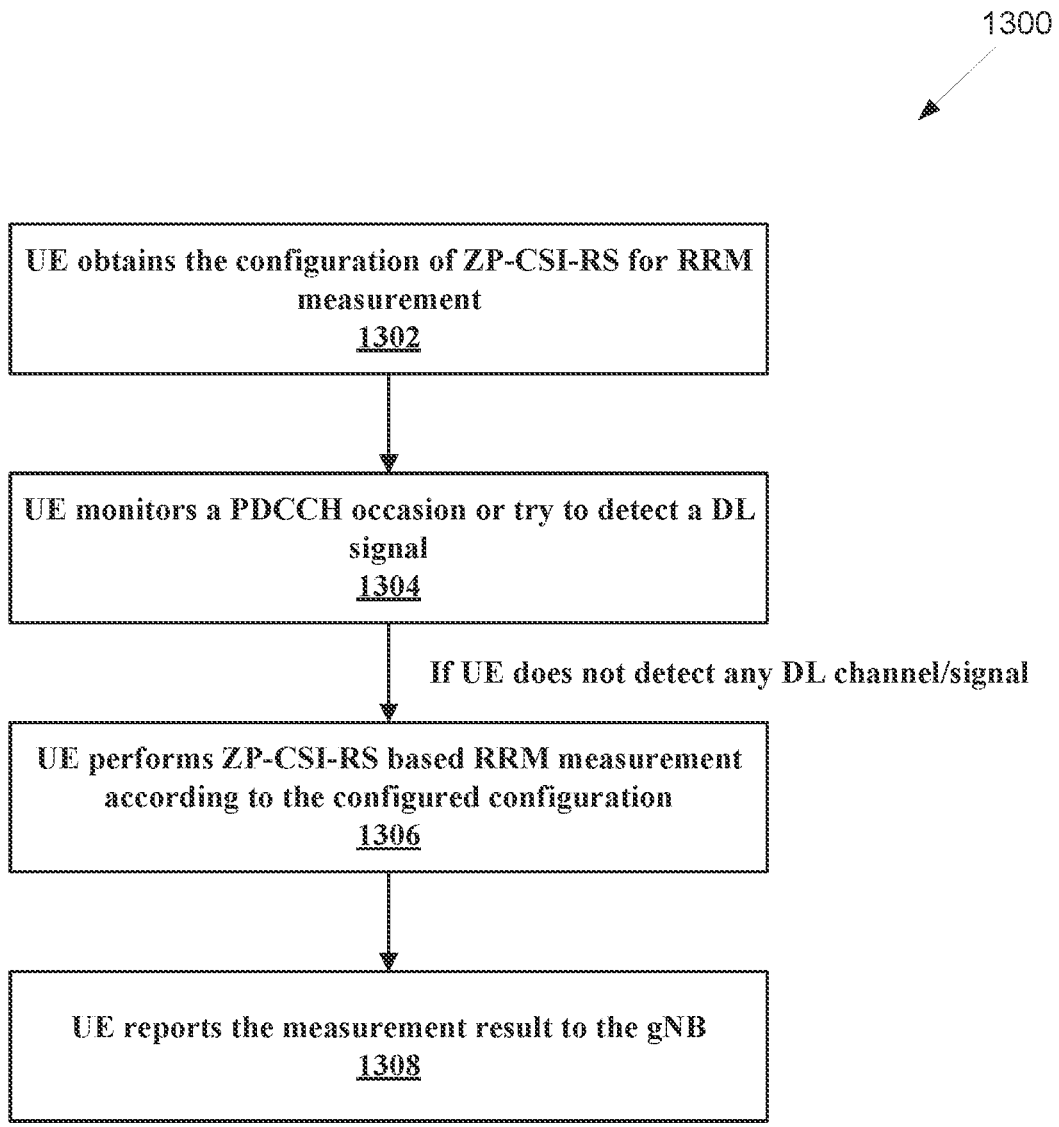
FIG. 13 illustrates an example UE procedures of ZP-CSI-RS based RRM measurement according to embodiments of the present disclosure.

FIG. 13 illustrates an example UE procedures of ZP-CSI-RS based RRM measurement 1300 according to embodiments of the present disclosure. The embodiment of the UE procedures of ZP-CSI-RS based RRM measurement 1300 illustrated in FIG. 13 is for illustration only. FIG. 13 does not limit the scope of the present disclosure to any particular implementation.

As illustrated in FIG. 13, the UE in step 1302 obtains the configuration of ZP-CSI-RS for RRM measurement. Next, in step 1304, the UE monitors a PDCCH occasion or try to detect a DL signal. Subsequently, the UE in step 1306 performs ZP-CSI-RS based RRM measurement according to the configured configuration. Finally, the UE in step 1308 UE reports the measurement result to the gNB.

This embodiment comprises the aspects for CSI-RS configuration enhancement, also aiming for addressing the interference measurement issue on the unlicensed spectrum.

In one embodiment, CSI-RS based RRM measurement can be triggered by detection or non-detection of a DL signal/channel.

Figures 14A, 14B:
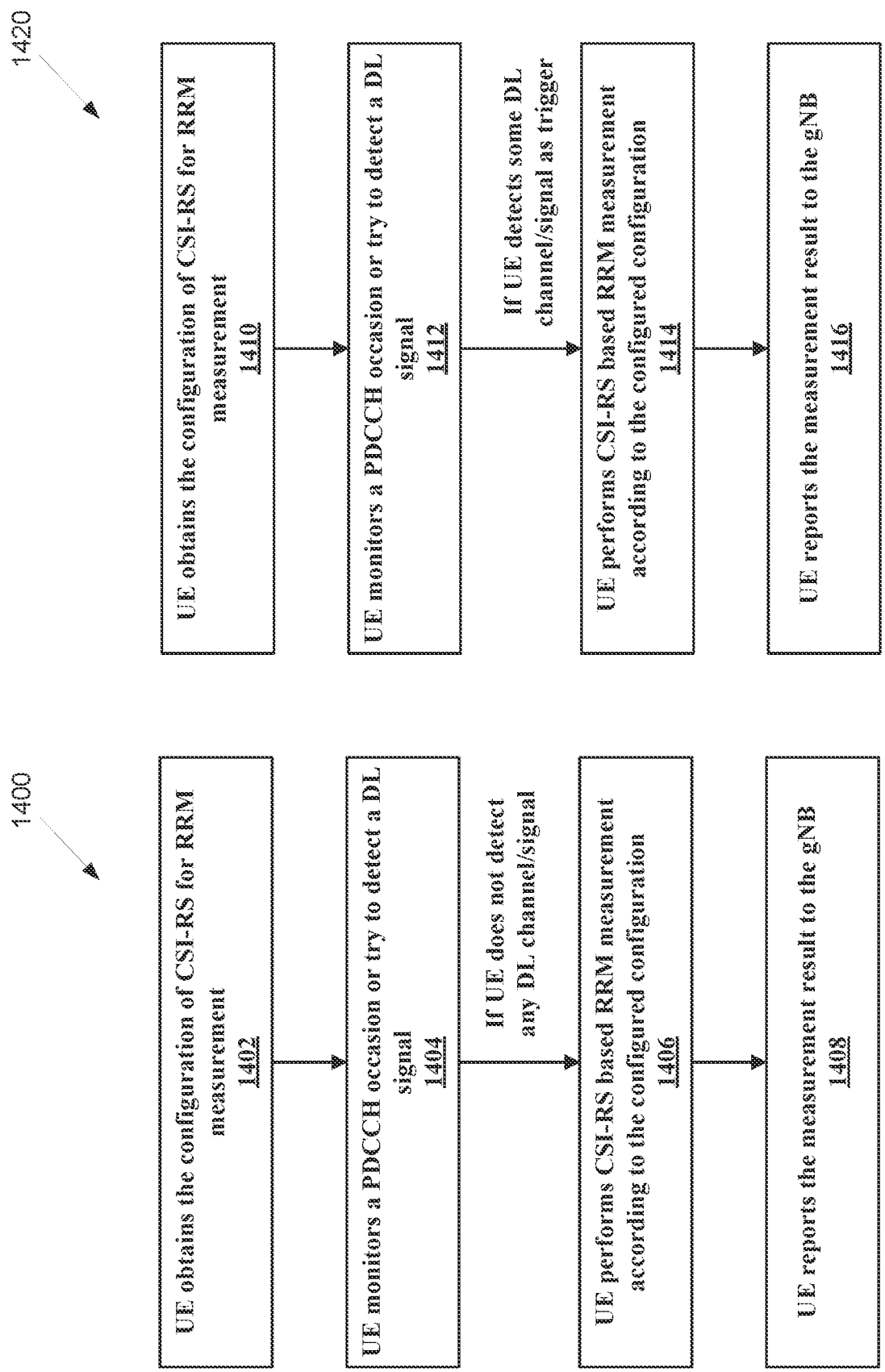
FIG. 14A illustrates an example UE procedure of aperiodic CSI-RS based RRM measurement according to embodiments of the present disclosure.
FIG. 14B illustrates another example UE procedure of aperiodic CSI-RS based RRM measurement according to embodiments of the present disclosure.

In one example, in order to monitor the interference situation of the carrier wherein the gNB failed LBT and didn't transmit on the carrier, the gNB can configure the UE to measure the interference from other cells on this carrier (e.g., from those cells with successful LBTs on this carrier) by measuring the resource elements for CSI-RS, wherein the resource elements for CSI-RS can be only confined within the time domain resources (e.g., COT associated to the failed LBT) and frequency domain resources (e.g., BW where the failed LBT is performed) where the gNB cannot transmit due to the failed LBT. The CSI-RS based RRM measurement can be triggered by the UE being not able to detect any DL signal or channel (e.g., detect synchronization signals or decode a PDCCH in the monitoring CORESET), and the UE can assume the corresponding CSI-RS resource is not actually transmitted and use the configuration of CSI-RS to perform RRM measurement. An illustration of this example is shown in FIG. 14A. In one example, this example can be only used for neighboring cell measurement.

FIG. 14A illustrates an example UE procedure of aperiodic CSI-RS based RRM measurement 1400 according to embodiments of the present disclosure. The embodiment of the UE procedure of aperiodic CSI-RS based RRM measurement 1400 illustrated in FIG. 14A is for illustration only. FIG. 14A does not limit the scope of the present disclosure to any particular implementation.

As illustrated in FIG. 14A, the UE in step 1402 obtains the configuration of CSI-RS for RRM measurement. Next, in step 1404, the UE monitors a PDCCH occasion or try to detect a DL signal. Subsequently, in step 1406, the UE performs CSI-RS based RRM measurement according to the configured configuration. Finally, in step 1408, the UE reports the measurement result to the gNB.

In one example, the CSI-RS based RRM measurement can be triggered by the UE being not able to detect any DL signal or channel (e.g., detect synchronization signals or decode a PDCCH in the monitoring CORESET), and the UE can assume the corresponding CSI-RS resource is actually transmitted based on allowance from regulation on the unlicensed band, and use the configuration of CSI-RS to perform RRM measurement. An illustration of this example is shown in FIG. 14A.

FIG. 14B illustrates another example UE procedure of aperiodic CSI-RS based RRM measurement 1420 according to embodiments of the present disclosure. The embodiment of the UE procedure of aperiodic CSI-RS based RRM measurement 1420 illustrated in FIG. 14B is for illustration only. FIG. 14B does not limit the scope of the present disclosure to any particular implementation.

As illustrated in FIG. 14B, the UE in step 1410 obtains the configuration of CSI-RS for RRM measurement. Next, in step 1412 the, UE monitors a PDCCH occasion or try to detect a DL signal. Subsequently, in step 1414, the UE performs CSI-RS based RRM measurement according to the configured configuration. Finally, in step 1416, the UE reports the measurement result to the gNB.

In yet another example, the CSI-RS based RRM measurement can be triggered by the UE being able to detect some DL signal or channel (e.g., detect synchronization signals or decode a PDCCH in the monitoring CORESET), and the UE can assume the corresponding CSI-RS resource is actually transmitted, and use the configuration of CSI-RS to perform RRM measurement. An illustration of this example is shown in FIG. 14B. In one instance for this example, the trigger that UE being able to detect some DL signal or channel may contain time domain (e.g., COT and/or SFI) and frequency domain (e.g., BWP and/or LBT subband) resource information for the corresponding transmission burst, and CSI-RS based RRM may be restricted to the time and frequency domain resource indicated by the trigger. In another instance, this example can be only used for serving cell measurement.

In one aspect of this embodiment, aperiodic CSI-RS is supported for NR-U. The transmission bandwidth, transmission duration and the time-domain overhead of the aperiodic CSI-RS for RRM measurement purpose may satisfy the regulation of the unlicensed spectrum. One particular instance is the configuration of aperiodic CSI-RS resources comprises configuration on measurement time resources (e.g., slot index, symbol index), measurement frequency resources (e.g., BWP, bandwidth, frequency location), antenna port, RE density, RE mapping, whether a SS/PBCH block is associated with the CSI-RS resource, and the QCL assumption with the SS/PBCH block if associated. In one example, the aperiodic CSI-RS can be configured outside DRS transmission window. In another example, the aperiodic CSI-RS can be configured not as part of DRS burst.

In one example, if the transmission bandwidth, transmission duration and the time-domain overhead of the CSI-RS for RRM measurement purpose satisfy the regulation of a given unlicensed spectrum for LBT exemption, wherein the transmission of CSI-RS can be multiplexed with any other DL signals or channels, or the transmission of CSI-RS can be not multiplexed with other signals or channels but still satisfying the regulation for LBT exemption, there can be no LBT required before the CSI-RS transmission. For instance, even if the LBT for the associated COT fails, the aperiodic CSI-RS can still be transmitted without a LBT in the associated COT wherein the LBT for the COT fails.

In one example, if the transmission bandwidth, transmission duration and the time-domain overhead of the CSI-RS for RRM measurement purpose satisfy the regulation of a given unlicensed spectrum for a one-shot LBT, wherein the transmission of CSI-RS can be not multiplexed with any other DL signals or channels, or the transmission of CSI-RS can be multiplexed with other signals or channels but still satisfying the regulation for one-shot LBT, the CSI-RS can be transmitted after a one-shot LBT succeeds. For instance, even if the LBT for the associated COT fails, the aperiodic CSI-RS can still be transmitted after a successful one-shot LBT in the associated COT wherein the LBT for the COT fails.

In one example, transmission duration and the time-domain overhead of the CSI-RS for RRM measurement purpose satisfy the regulation of a given unlicensed spectrum for a one-shot LBT, wherein the transmission of CSI-RS can be not multiplexed with any other DL signals or channels, or the transmission of CSI-RS can be multiplexed with other signals or channels but still satisfying the regulation for one-shot LBT, the CSI-RS can be transmitted after a one-shot LBT succeeds or any slot of the LBT for the associated COT succeeds. For instance, even if the LBT for the associated COT fails, the aperiodic CSI-RS can still be transmitted after a successful one-shot LBT in the associated COT wherein the LBT for the COT fails, or the CSI-RS can still be transmitted within the associated COT if any of the slot in the LBT for the COT succeeds.

Wake-up signal (WUS) and/or go-to-sleep signal (GTSS) mechanism can be supported to facilitate power saving for NR unlicensed spectrum. For example, a WUS can be used for the UE to identify the starting of a transmission burst (e.g., COT), and/or a GTSS can be used for the UE to identify the ending of a transmission burst (e.g., COT). In another example, the WUS and GTSS can be the same one, e.g., one signal indicating both the starting and ending of a transmission burst.

If WUS (or GTSS) is supported for a NR-U spectrum, WUS (or GTSS) can be utilized as reference signals for RRM measurement. This embodiment compromises the aspects for using WUS (or GTSS) as reference signals for RRM measurement, and at least one of the following embodiments or their combinations can be supported.

Figure 15A:
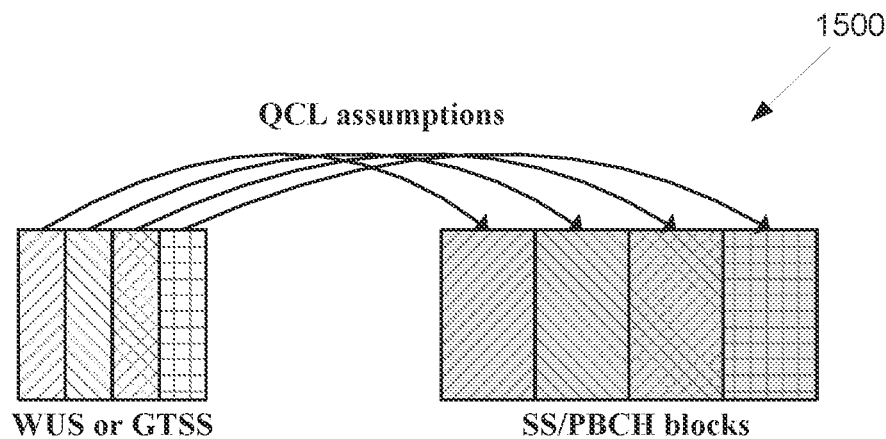
FIGS. 15A-15C illustrate an example multiplexing between WUS/GTSS and QCLed SS/PBCH block according to embodiments of the present disclosure.
Figure 15B:
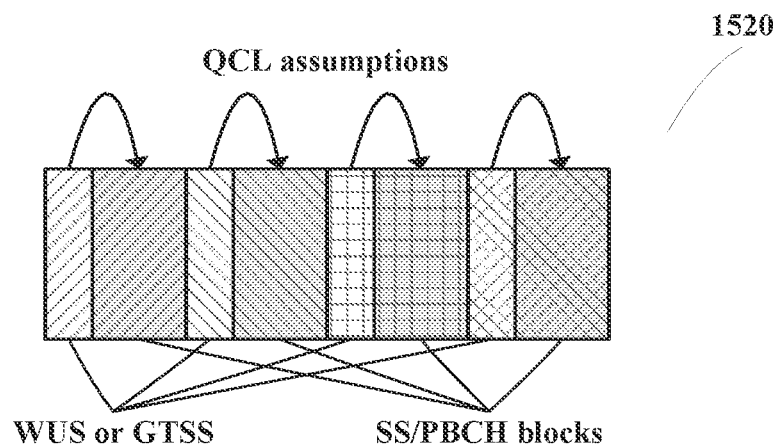
Figure 15C:
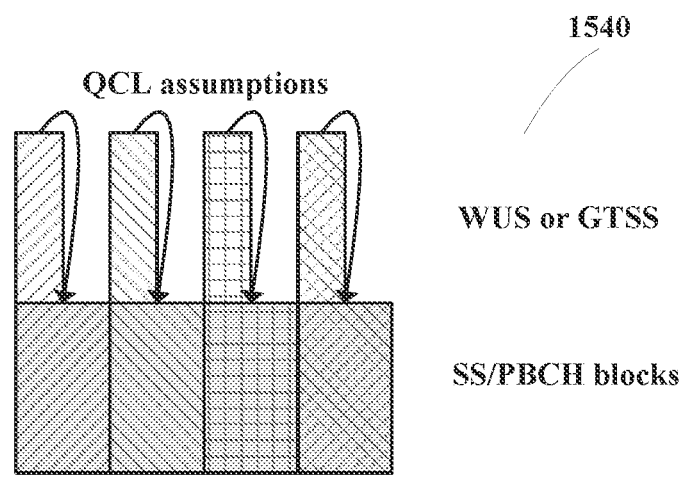

FIGS. 15A-15C illustrates an example multiplexing between WUS/GTSS and QCLed SS/PBCH block 1500 according to embodiments of the present disclosure. The embodiment of the multiplexing between WUS/GTSS and QCLed SS/PBCH block 1500 illustrated in FIGS. 15A-15C are for illustration only. FIGS. 15A-15C do not limit the scope of the present disclosure to any particular implementation.

In one example, a WUS (or GTSS) can be a cell-specific signal, and the WUS (or GTSS) is QCLed with an SS/PBCH block with the same index within the burst. In one particular example of this embodiment, WUS (or GTSS) can be transmitted using the same antenna port as the QCLed SS/PBCH block. Examples showing the multiplexing patterns of WUS (or GTSS) and SS/PBCH block with QCL assumption are illustrated in FIGS. 15A-15C, wherein the burst of WUS (or GTSS) can be separately transmitted from SS/PBCH blocks (e.g., TDMed with SS/PBCH blocks and the time difference is large such as larger than a slot) as in 1501, or the WUS (or GTSS) can be TDMed and multiplexed within the burst of transmission for SS/PBCH blocks as in 1502, or the WUS (or GTSS) can be FDMed and multiplexed within the burst of transmission for SS/PBCH blocks as in 1503.

In one example, the definition of SS-RSRP can include the resource elements for WUS (or GTSS), wherein the inclusion can be either predefined in the spec or up to UE's implementation. For instance, the SS-RSRP can be defined as the linear average over the power contributions of the resource elements that carry SSS or WUS (or GTSS). One particular use case of this instance is when the multiplexing pattern of WUS (or GTSS) and SS/PBCH block with QCL assumption is as in 1502 or 1503 (e.g., the WUS (or GTSS) and the QCLed SS/PBCH block are within the same slot such that the joint measurement is efficient).

In one example, if configured by the higher layers, the measurement time resources and/or the measurement frequency resources for calculating NR carrier RSSI can be configured to contain the resource elements that carry WUS (or GTSS) as well, in order to obtain a better estimation of the interference situation of the downlink transmission. For one instance, if the multiplexing pattern is as in 1502, configured starting symbol and ending symbol indexes in SS-RSSI-MeasurementSymbolConfig to calculate RSSI can contain the symbol(s) for transmitting WUS (or GTSS) in addition to the currently supported symbols as in NR. For another instance, if the multiplexing pattern is as in 1503, the measurement frequency resources for calculating RSSI can include the bandwidth of both SS/PBCH block and WUS (or GTSS), as well as the potential gap bandwidth between SS/PBCH block and WUS (or GTSS) if supported. In one instance, the defined NR carrier RSSI can be combined with the SS-RSRP defined in the first example of this embodiment to define the SS-RSRQ, wherein the RSRQ also takes into account the contribution from resource elements that carry WUS (or GTSS).

In one example, a separate definition of WUS (or GTSS) based RSRP is supported for NRU, wherein the WUS based RSRP (WUS-RSRP) can be defined as the linear average over the power contributions of the resource elements that carry WUS, and GTSS based RSRP (GTSS-RSRP) can be defined as the linear average over the power contributions of the resource elements that carry GTSS. For instance, the WUS-RSRP can be defined to perform measurement based on the resource elements for WUS if the multiplexing pattern is as in 1501, 1502, or 1503. For another instance, the GTSS-RSRP can be defined to perform measurement based on the resource elements for GTSS if the multiplexing pattern is as in 1501, 1502, or 1503.

In one example, a separate definition of WUS (or GTSS) based RSSI is supported for NRU, wherein the measurement time resources for WUS-RSSI can correspond to the symbols containing the WUS and the measurement frequency resources for WUS-RSSI can be the same as WUS-RSRP, and the measurement time resources for GTSS-RSSI can correspond to the symbols containing the GTSS and the measurement frequency resources for GTSS-RSSI can be the same as GTSS-RSRP. In one instance, the defined WUS-RSSI can be combined with the WUS-RSRP defined in the third example of this embodiment to define the WUS-RSRQ. In another instance, the defined GTSS-RSSI can be combined with the GTSS-RSRP defined in the third example of this embodiment to define the GTSS-RSRQ.

Figure 16:
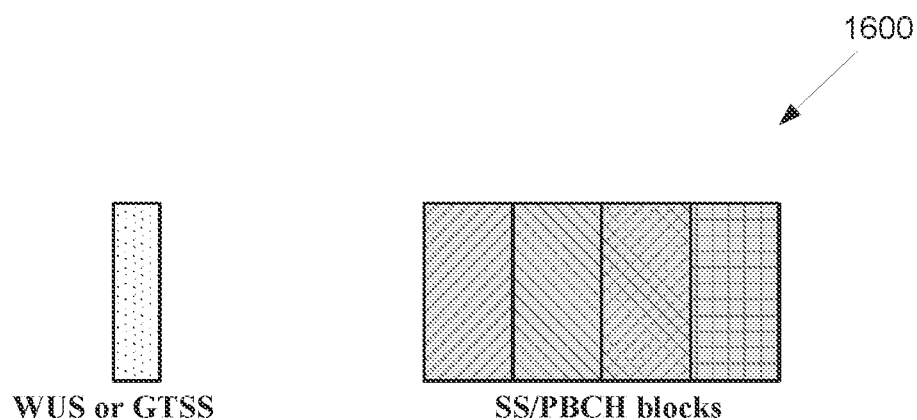
FIG. 16 illustrates an example WUS/GTSS and SS/PBCH blocks without QCL assumption according to embodiments of the present disclosure.

FIG. 16 illustrates an example WUS/GTSS and SS/PBCH blocks without QCL assumption 1600 according to embodiments of the present disclosure. The embodiment of the WUS/GTSS and SS/PBCH blocks without QCL assumption 1600 illustrated in FIG. 16 is for illustration only. FIG. 16 does not limit the scope of the present disclosure to any particular implementation.

In one example, a WUS (or GTSS) can be a cell-specific signal, and the WUS (or GTSS) has no QCL assumption with SS/PBCH blocks, such as the WUS (or GTSS) is transmitted in a single-beam operation or in a different beam-sweeping pattern from SS/PBCH blocks (as illustrated in FIG. 16).

In one example, a separate definition of WUS (or GTSS) based RSRP is supported for NRU, wherein the WUS based RSRP (WUS-RSRP) can be defined as the linear average over the power contributions of the resource elements that carry WUS, and GTSS based RSRP (GTSS-RSRP) can be defined as the linear average over the power contributions of the resource elements that carry GTSS.

In one example, a separate definition of WUS (or GTSS) based RSSI is supported for NRU, wherein the measurement time resources for WUS-RSSI can correspond to the symbols containing the WUS and the measurement frequency resources for WUS-RSSI can be the same as WUS-RSRP, and the measurement time resources for GTSS-RSSI can correspond to the symbols containing the GTSS and the measurement frequency resources for GTSS-RSSI can be the same as GTSS-RSRP. In one instance, the defined WUS-RSSI can be combined with the WUS-RSRP defined in the first example of this embodiment to define the WUS-RSRQ. In one instance, the defined GTSS-RSSI can be combined with the GTSS-RSRP defined in the first example of this embodiment to define the GTSS-RSRQ.

Figure 17:
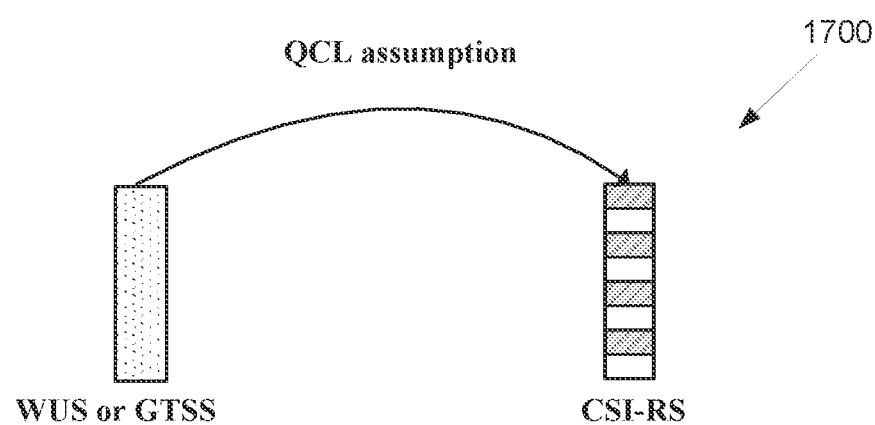
FIG. 17 illustrates an example WUS/GTSS and QCLed CSI-RS for RRM measurement according to embodiments of the present disclosure.

FIG. 17 illustrates an example WUS/GTSS and QCLed CSI-RS for RRM measurement 1700 according to embodiments of the present disclosure. The embodiment of the WUS/GTSS and QCLed CSI-RS for RRM measurement 1700 illustrated in FIG. 17 is for illustration only. FIG. 17 does not limit the scope of the present disclosure to any particular implementation.

In one example, a WUS (or GTSS) is a UE-specific signal, and WUS (or GTSS) is QCLed with a configured CSI-RS for RRM measurement (as illustrated in FIG. 17).

In one example, the definition of CSI-RSRP can include the resource elements for the WUS (or GTSS), wherein the inclusion can be either predefined in the spec or up to UE's implementation. For instance, the CSI-RSRP can be defined as the linear average over the power contributions of the resource elements that carry the configured CSI-RS or the WUS (or GTSS). The measurement time resources for CSI-RSSI can correspond to the symbols containing either the configured CSI-RS or the WUS (or GTSS). The defined CSI-RSSI can be combined with the CSI-RSRP defined in this example to define the CSI-RSRQ, In one example, a separate definition of WUS (or GTSS) based RSRP is supported for NRU, wherein the WUS based RSRP (WUS-RSRP) can be defined as the linear average over the power contributions of the resource elements that carry WUS, and GTSS based RSRP (GTSS-RSRP) can be defined as the linear average over the power contributions of the resource elements that carry GTSS.

In one example, a separate definition of WUS (or GTSS) based RSSI is supported for NRU, wherein the measurement time resources for WUS-RSSI can correspond to the symbols containing the WUS and the measurement frequency resources for WUS-RSSI can be the same as WUS-RSRP, and the measurement time resources for GTSS-RSSI can correspond to the symbols containing the GTSS and the measurement frequency resources for GTSS-RSSI can be the same as GTSS-RSRP. In one instance, the defined WUS-RSSI can be combined with the WUS-RSRP defined in the third example of this embodiment to define the WUS-RSRQ. In another instance, the defined GTSS-RSSI can be combined with the GTSS-RSRP defined in the second example of this embodiment to define the GTSS-RSRQ.

In one embodiment, a WUS (or GTSS) can be a UE-specific signal, and the WUS (or GTSS) has no QCL assumption with a configured CSI-RS for RRM measurement.

In one example, a separate definition of WUS (or GTSS) based RSRP is supported for NRU, wherein the WUS based RSRP (WUS-RSRP) can be defined as the linear average over the power contributions of the resource elements that carry WUS, and GTSS based RSRP (GTSS-RSRP) can be defined as the linear average over the power contributions of the resource elements that carry GTSS.

In one example, a separate definition of WUS (or GTSS) based RSSI is supported for NRU, wherein the measurement time resources for WUS-RSSI can correspond to the symbols containing the WUS and the measurement frequency resources for WUS-RSSI can be the same as WUS-RSRP, and the measurement time resources for GTSS-RSSI can correspond to the symbols containing the GTSS and the measurement frequency resources for GTSS-RSSI can be the same as GTSS-RSRP. In one instance, the defined WUS-RSSI can be combined with the WUS-RSRP defined in the third example of this embodiment to define the WUS-RSRQ. In another instance, the defined GTSS-RSSI can be combined with the GTSS-RSRP defined in the first example of this embodiment to define the GTSS-RSRQ.

Figure 18:
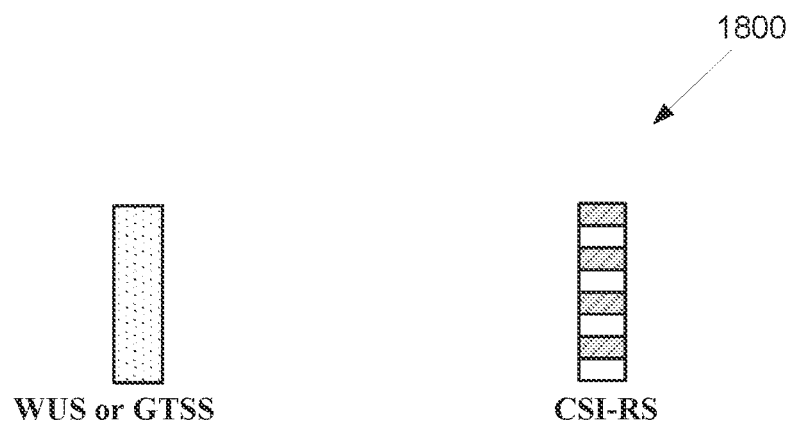
FIG. 18 illustrates an example WUS/GTSS and CSI-RS for RRM measurement without QCL assumption according to embodiments of the present disclosure.

FIG. 18 illustrates an example WUS/GTSS and CSI-RS for RRM measurement without QCL assumption 1800 according to embodiments of the present disclosure. The embodiment of the WUS/GTSS and CSI-RS for RRM measurement without QCL assumption 1800 illustrated in FIG. 18 is for illustration only. FIG. 18 does not limit the scope of the present disclosure to any particular implementation.

In one example, wherein the WUS-RSRP and/or WUS-RSSI is defined, a WUS measurement time configuration (WMTC) can be supported, wherein the WMTC can be configured separately from SMTC. One WMTC can comprise at least one of a window periodicity, a window offset, and a window duration. In one example of the WMTC, the window periodicity of WMTC can be same as the window periodicity of SMTC, such as when the WUS is QCLed with an SS/PBCH block (e.g., no need to explicitly configure a window periodicity in WMTC). In another example of the WMTC, the window offset of WMTC can be same as the window offset of SMTC, such as when the WUS is QCLed with an SS/PBCH block (e.g., no need to explicitly configure a window offset in WMTC).

In yet another example of the WMTC, the window duration of WMTC can be same as the window duration of SMTC, such as when the WUS is QCLed with an SS/PBCH block (e.g., no need to explicitly configure a window duration in WMTC). In yet another example of the WMTC, the window periodicity can be the same as the configured periodicity for a CSI-RS for RRM measurement purpose, such as when the WUS is QCLed with the CSI-RS for RRM measurement purpose.

For at least one of the example in this embodiment, wherein the GTSS-RSRP and/or GTSS-RSSI is defined, a GTSS measurement time configuration (GMTC) can be supported, wherein the GMTC can be configured separately from SMTC or WMTC. One GMTC can comprise at least one of a window periodicity, a window offset, and a window duration. In one example of the GMTC, the window periodicity of GMTC can be same as the window periodicity of SMTC, such as when the GTSS is QCLed with an SS/PBCH block (e.g., no need to explicitly configure a window periodicity in GMTC).

In another example of the GMTC, the window offset of GMTC can be same as the window offset of SMTC, such as when the GTSS is QCLed with an SS/PBCH block (e.g., no need to explicitly configure a window offset in GMTC). In yet another example of the GMTC, the window duration of GMTC can be same as the window duration of SMTC, such as when the GTSS is QCLed with an SS/PBCH block (e.g., no need to explicitly configure a window duration in GMTC). In yet another example of the GMTC, the window periodicity can be the same as the configured periodicity for a CSI-RS for RRM measurement purpose, such as when the GTSS is QCLed with the CSI-RS for RRM measurement purpose.

In LTE license assisted access (LAA), RSSI can be measured and reported separately from RSRP and RSRQ, because the reference signal for RSRP and RSRQ measurement may not always be transmitted such that a NodeB may not be able to infer RSSI from the reported RSRP and RSRQ. Meanwhile, a separate RSSI measurement and reporting mechanism over a flexibly configurable measurement time resources can provide a good interference estimation on a carrier and beneficial for detecting a hidden node at the NodeB.

Figure 19:
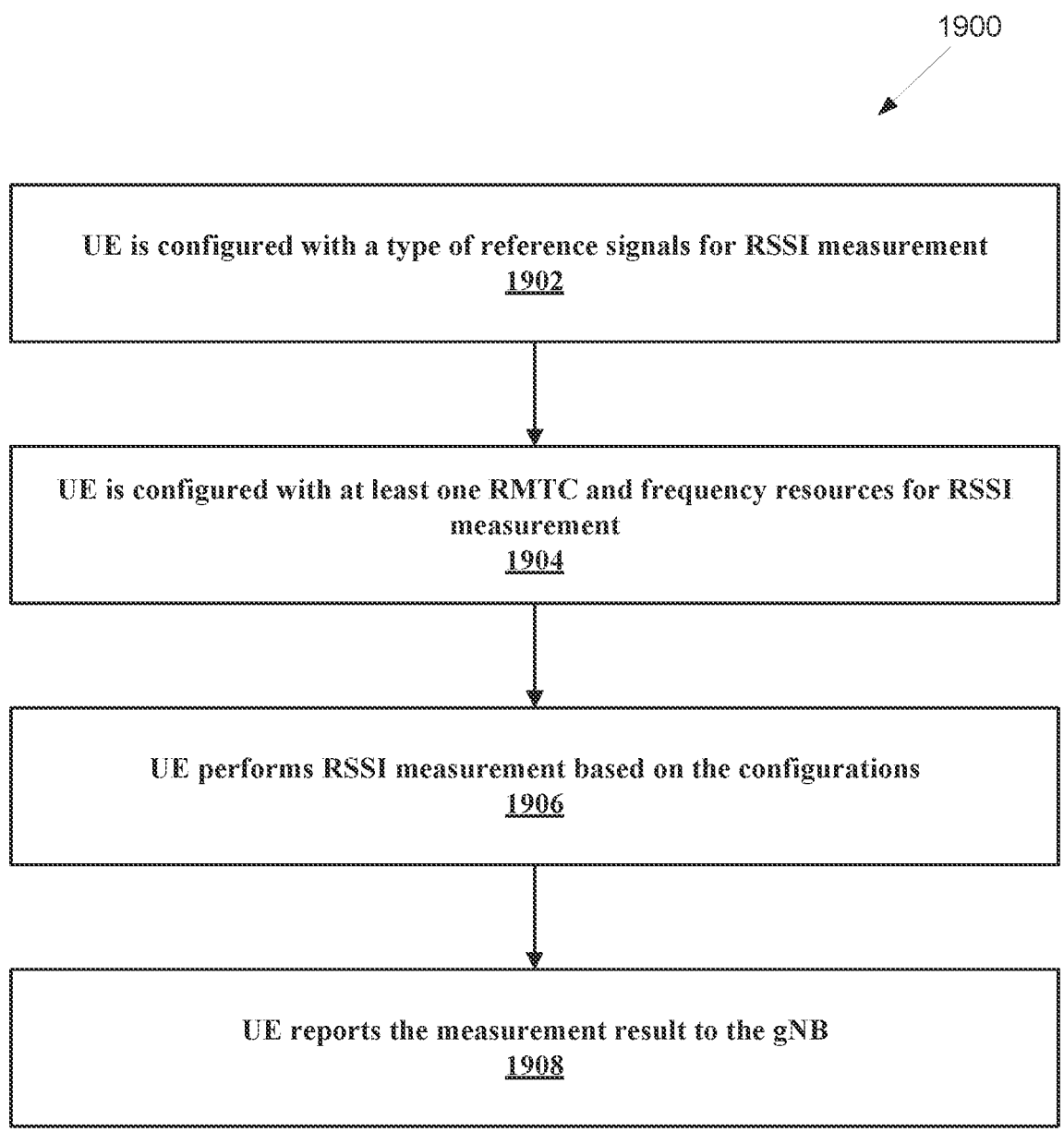
FIG. 19 illustrates an example UE procedures for RSSI measurement and reporting according to embodiments of the present disclosure.

FIG. 19 illustrates an example UE procedures for RSSI measurement and reporting 1900 according to embodiments of the present disclosure. The embodiment of the UE procedures for RSSI measurement and reporting 1900 illustrated in FIG. 19 is for illustration only. FIG. 19 does not limit the scope of the present disclosure to any particular implementation.

As illustrated in FIG. 19, the UE in step 1902 is configured with a type of reference signals for RSSI measurement. Next, in step 1904, the UE is configured with at least one RMTC and frequency resources for RSSI measurement. Subsequently, in step 1906, the UE performs RSSI measurement based on the configurations. Finally, in step 1908, the UE reports the measurement result to the gNB.

In one embodiment, the aspects for RSSI measurement and reporting for NR unlicensed spectrum are provided, and an illustration of UE procedures for RSSI measurement and reporting is shown in FIG. 19.

In one example, the type of reference signal for performing RSSI measurement can be configurable. In one instance, if a UE is not configured with the type of reference signal, the UE can assume using a default type of reference signal for performing RSSI measurement, such as SSS or enhanced SSS in a SS/PBCH block (with DMRS of PBCH in addition to SSS up to UE's implementation).

For example, at least one of examples from the previous embodiments in this disclosure can be configured as the reference signal for performing RSSI measurement, such as SSS or enhanced SSS in a SS/PBCH block (with DMRS of PBCH in addition to SSS up to UE's implementation), configured CSI-RS for RRM measurement purpose, WUS, or GTSS.

In one example, the measurement time resources can be configured by and confined within a configurable RSSI measurement time configuration (RMTC), wherein the RMTC can contain at least one of a window periodicity, a window offset, and a window duration.

In one example, extra information can be combined with RMTC for the UE to determine the measurement time resources for RSSI measurement. When the reference signal for performing RSSI measurement is SSS or enhanced SSS in a SS/PBCH block (with DMRS of PBCH in addition to SSS up to UE's implementation), extra information can be combined with RMTC for the UE to determine the measurement time resources for RSSI measurement, such as at least one of a bitmap of SS/PBCH blocks for RSSI measurement, or slot index, or slot bitmap within a RMTC window, or symbol indexes within a slot. When the reference signal for performing RSSI measurement is a configured CSI-RS, or WUS, or GTSS, extra information can be combined with RMTC for the UE to determine the measurement time resources for RSSI measurement, such as the slot index and symbol index within a slot wherein the reference signal is located.

In one example, the RMTC can be configured separately from at least one of examples from the previous embodiments in this disclosure, such as SMTC/DMTC, WMTC, or GMTC.

In one embodiment, the measurement frequency resources can be configurable, wherein the measurement frequency resources comprise at least one of the frequency location, BWP, and measurement bandwidth.

In one example, at least two measurement bandwidth for RSSI measurement are supported and configurable, wherein a first measurement bandwidth corresponds to the bandwidth of reference signal configured for RSSI measurement, and a second measurement bandwidth corresponds to the bandwidth of the carrier.

In one embodiment, a gNB can configure multiple SS/PBCH blocks in frequency domain within a BWP or carrier, wherein some of the SS/PBCH blocks can be utilized for measurement purpose.

In one example, a UE assumes the received SS/PBCH blocks with the same SS/PBCH block index on different frequency layers within the BWP or carrier have the same timing (e.g., the symbol index and symbol boundary are aligned).

In one example, a UE assumes the actually transmitted SS/PBCH blocks on different frequency layers within the BWP or carrier are with the same set of SS/PBCH block indices. An illustration of this embodiment is in FIG. 20.

Figure 20:
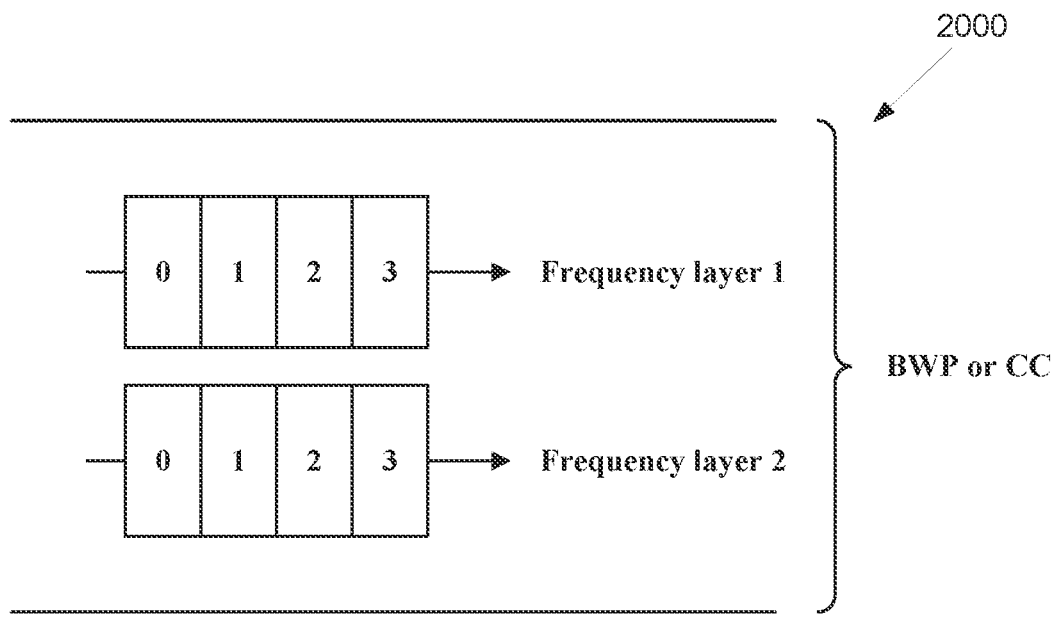
FIG. 20 illustrates an example multiple SS/PBCH blocks in frequency domain according to embodiments of the present disclosure.

FIG. 20 illustrates an example multiple SS/PBCH blocks in frequency domain 2000 according to embodiments of the present disclosure. The embodiment of the multiple SS/PBCH blocks in frequency domain 2000 illustrated in FIG. 20 is for illustration only. FIG. 20 does not limit the scope of the present disclosure to any particular implementation.

In yet another embodiment, a UE can perform SS/PBCH block based RRM measurement using RS from all the configured SS/PBCH blocks on different frequency layers within the BWP or carrier. In this embodiment, a gNB can configure the UE with a group of cell IDs and a common bitmap for measurement in the SMTC. The measurement quality, e.g., SS-RSRP and/or SS-RSRQ, can be calculated based on the RS from all the configured SS/PBCH blocks on different frequency layers within the BWP or carrier.

In yet another embodiment, the transmission of SS/PBCH block can be configured to be together with RMSI/OSI/paging/CSI-RS to construct a DRS, then the embodiments related to SS/PBCH block based RRM measurement in this embodiment can be applicable to DRS based RRM measurement as well.

In one embodiment, a UE expects the carriers operated on a same unlicensed spectrum are configured with same SCS when performing RRM measurement.

In another embodiment, a UE expects the consecutive carriers operated on a same unlicensed spectrum are configured with same SCS when performing RRM measurement.

In one embodiment, SS/PBCH block can be configured to be multiplexed with RMSI/OSI/paging/CSI-RS to construct a DRS, and RRM measurement can be performed based on at least one of RSs within the DRS, wherein the at least one of RSs is SSS within the SS/PBCH block.

Figure 21:
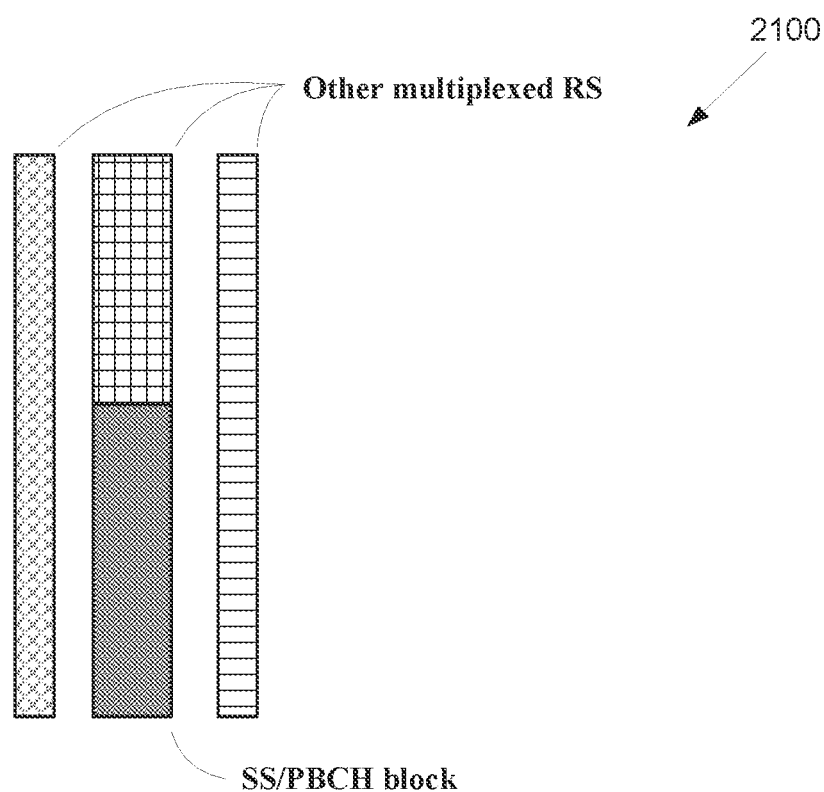
FIG. 21 illustrates an example DRS containing SS/PBCH block and other QCLed RS according to embodiments of the present disclosure.

FIG. 21 illustrates an example DRS containing SS/PBCH block and other QCLed RS 2100 according to embodiments of the present disclosure. The embodiment of the DRS containing SS/PBCH block and other QCLed RS 2100 illustrated in FIG. 21 is for illustration only. FIG. 21 does not limit the scope of the present disclosure to any particular implementation.

In one example, DRS based RRM measurement can be performed based on the QCLed RSs within the DRS. In one example, all the QCLed RS within the DRS can be used by the UE to perform DRS based RRM measurement, e.g., for bandwidth expansion purpose, and the calculation of DRS based RSRP/RSRQ may be based on all the RSs within the DRS. For instance, if SSS, DMRS of PBCH in the same SS/PBCH block, and DMRS of PDCCH/PDSCH for RMSI/OSI/paging associated to the same SS/PBCH block (e.g., QCLed with DMRS of PBCH) are configured in the DRS, can all be used for calculation of DRS based RSRP/RSRQ.

For another instance, if CSI-RS is configured in DRS and also configured to be QCLed with DMRS of PBCH in a SS/PBCH block, then the CSI-RS can also be utilized for calculation of DRS based RSRP/RSRQ. In another example, part of the RS can be predefined as the baseline RS for RRM measurement, and the remaining part of the RS can be up to UE's implementation for RRM measurement, e.g., for bandwidth expansion purpose. For instance, SSS in the DRS can be the baseline RS for RRM measurement, and DMRS of PBCH in the same SS/PBCH block, and DMRS of PDCCH/PDSCH for RMSI/OSI/paging associated to the same SS/PBCH block (e.g., QCLed with DMRS of PBCH) if they are configured in the DRS, can all be used for calculation of DRS based RSRP/RSRQ up to UE's implementation. For another instance, if CSI-RS is configured in DRS and also configured to be QCLed with DMRS of PBCH in a SS/PBCH block, then the CSI-RS can also be utilized for calculation of DRS based RSRP/RSRQ up to UE's implementation.

In such embodiments and examples, when performing DRS based RRM measurement, which can be performed based on the QCLed RS within the DRS, the time domain configuration of the measurement window may contain all the RS for DRS based RRM measurement, such that UE assumes all the RSs for DRS based RRM measurement are within the measurement window.

In such embodiments and examples, when performing DRS based RRM measurement, which can be performed based on the QCLed RS within the DRS, the time domain resources for determining DRS based RSRP/RSRQ may at least contain all the RS for DRS based RRM measurement.

In one embodiment, when calculating the NR carrier RSSI as part of calculating DRS based RSRQ, all the RBs within the BWP containing the DRS can be counted in, and there is a scaling of the BW to be aligned with the BW for calculating DRS based RSRP. For example, when determining the NR carrier RSSI as part of calculating DRS based RSRQ, even though SS/PBCH blocks may only occupy part of the bandwidth within the BWP, all the remaining RBs not overlapping with SS/PBCH block can also contribute to the frequency domain resources when calculating the NR carrier RSSI as part of calculating DRS based RSRQ. In one aspect for this embodiment, BW for calculating NR carrier RSSI as part of calculating DRS based RSRQ can be configurable between the BW of SS/PBCH block in the DRS and the BW of the whole BWP containing DRS.

In one embodiment, SS/PBCH blocks in DRS can be transmitted within a configurable DRS transmission window, and a UE can be configured separately with a DRS measurement window (e.g., as part of DMTC or SMTC). In one example, the DRS measurement window is configured to at least contain the DRS transmission window, e.g., at least for serving cell measurement. In another example, the DRS measurement window can be configured as the same as the DRS transmission window, e.g., at least for serving cell measurement. In yet another example, the minimum duration configurable for a DRS measurement window is the same as the DRS transmission window (e.g., 5 ms).

In one embodiment, there is a bitmap indicating SS/PBCH blocks to be measured within the DRS measurement window, associated to a configured DMTC, wherein the bitmap is with length same as the number of possible SS/PBCH block locations within the configured DRS measurement window. For example, if the DRS measurement window is configured with N_DRS slots, and each slot can contain 2 possible SS/PBCH locations, then the bitmap indicating SS/PBCH block to measure is with length 2*N_DRS (e.g., 20-bit bitmap if using 30 kHz SCS or 10-bit bitmap if using 15 kHz when DRS measurement window is configured as 5 ms).

In one embodiment, the measurement time resources for NR carrier RSSI are confined within the configured DMTC window, and the configurations of the OFDM symbols within a configured slot may try to cover all possible symbols for DL transmission.

Figure 22A:
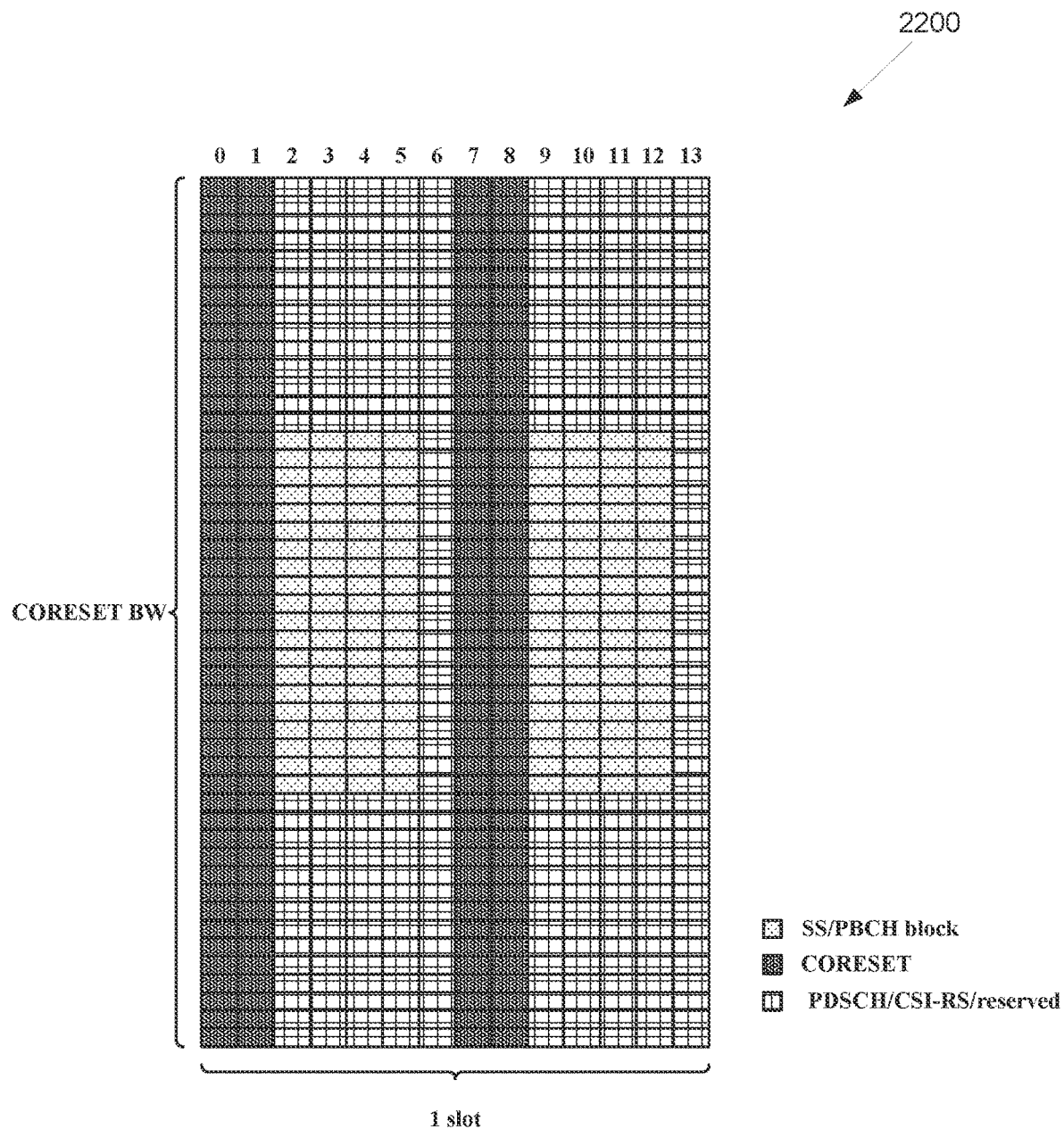
FIG. 22A illustrates an example NR-U DRS according to embodiments of the present disclosure.

FIG. 22A illustrates an example NR-U DRS 2200 according to embodiments of the present disclosure. The embodiment of the NR-U DRS 2200 illustrated in FIG. 22A is for illustration only. FIG. 22A does not limit the scope of the present disclosure to any particular implementation.

In one example, as illustrated in FIG. 22A, at most two SS/PBCH blocks can mapped to a slot, wherein the first SS/PBCH block is mapped from symbol #2 to #6, and second SS/PBCH block is mapped from symbol #9 to #12 in a slot. For DRS, symbol #0 and/or #1 can be potentially mapped for a first CORESET, and symbol #7 and/or #8 can be potentially mapped for a second CORESET. The remaining RBs within the slot can be mapped for PDSCH of RMSI, and/or CSI-RS, and/or empty for other purpose (e.g., directional LBT). In one example, the configurations of the OFDM symbols for NR carrier RSSI can be any symbol(s) within the slot, since every symbol could be for DL transmission. In another example, the configurations of the OFDM symbols for NR carrier RSSI are starting from symbol #0, and can end at any symbol within the slot (e.g., 14 configurations with ending symbol as one from #0 to #13).

In yet another example, the configurations of the OFDM symbols for NR carrier RSSI are starting from symbol #0, and can end in a subset of the symbols within the slot, e.g., one from {#1, #6, #8, #13}, or one from {#1, #5, #8, #12}. In yet another example, the configurations of the OFDM symbols for NR carrier RSSI can start either from symbol #0 or #7, e.g., the combination of (starting symbol, ending symbol) is configured as one from {(#0, #1), (#0, #6), (#7, #8), (#7, #13)}, or one from {(#0, #1), (#0, #5), (#7, #8), (#7, #12)}. In yet another example, the configurations of the OFDM symbols for NR carrier RSSI are starting from symbol #0, and can end in a subset of the symbols within the slot, wherein the ending symbols is a subset from NR and compatible with the SS/PBCH block design in this embodiment as well, e.g., ending symbol configured as one from {#1, #7} or {#1, #5, #7}.

In one instance, this embodiment at least is applicable to intra-frequency RRM measurement.

Figure 22B:
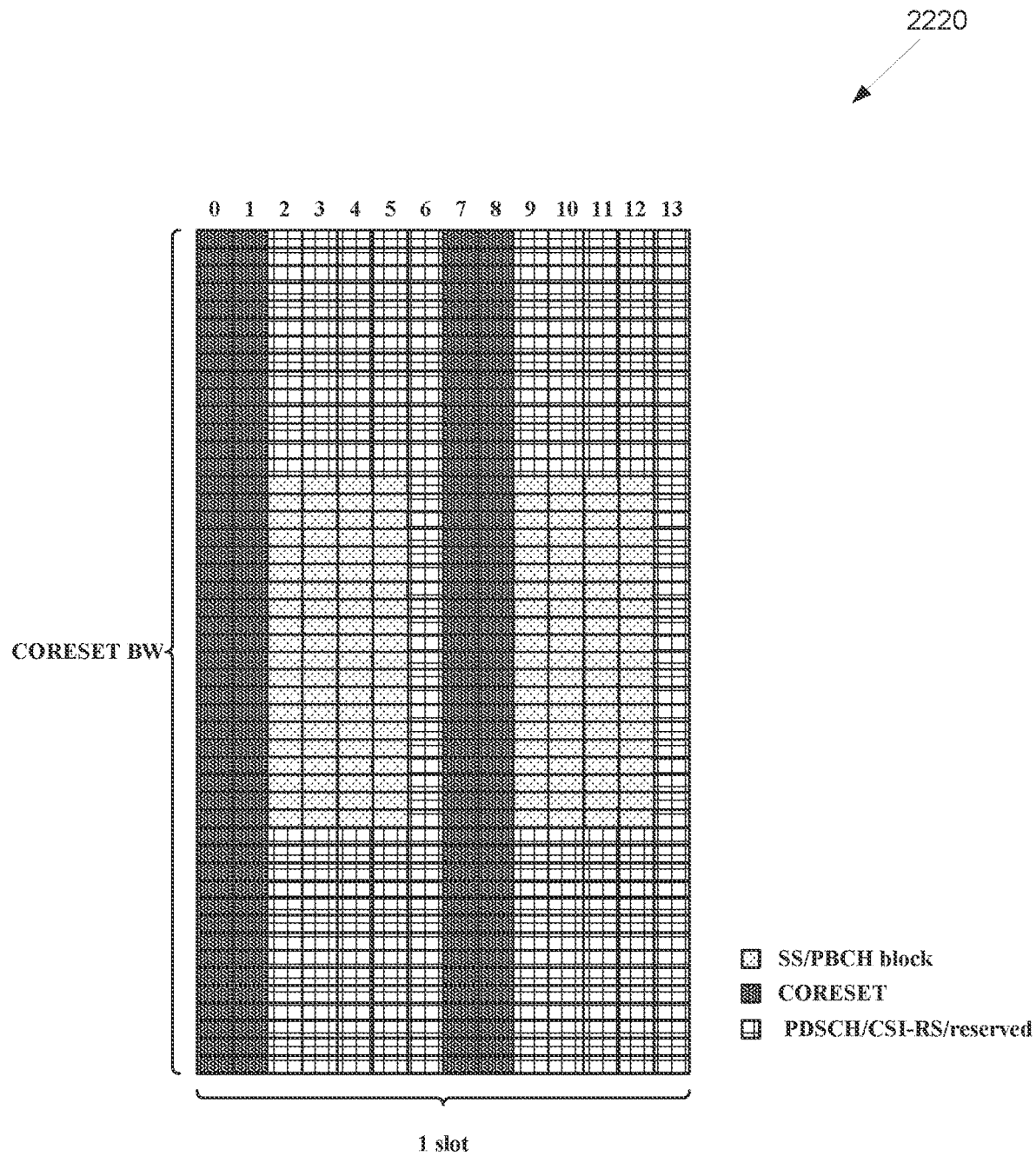
FIG. 22B illustrates another example NR-U DRS according to embodiments of the present disclosure.

FIG. 22B illustrates another example NR-U DRS 2220 according to embodiments of the present disclosure. The embodiment of the NR-U DRS 2220 illustrated in FIG. 22B is for illustration only. FIG. 22B does not limit the scope of the present disclosure to any particular implementation.

In one example, as illustrated in FIG. 22B, at most two SS/PBCH blocks can mapped to a slot, wherein the first SS/PBCH block is mapped from symbol #2 to #6, and second SS/PBCH block is mapped from symbol #8 to #11 in a slot. For DRS, symbol #0 and/or #1 can be potentially mapped for a first CORESET, and symbol #6 and/or #7 can be potentially mapped for a second CORESET. The remaining RBs within the slot can be mapped for PDSCH of RMSI, and/or CSI-RS, and/or empty for other purpose (e.g., directional LBT).

In one example, the configurations of the OFDM symbols for NR carrier RSSI can be any symbol(s) within the slot, since every symbol could be for DL transmission. In another example, the configurations of the OFDM symbols for NR carrier RSSI are starting from symbol #0, and can end at any symbol within the slot (e.g., 14 configurations with ending symbol as one from #0 to #13). In yet another example, the configurations of the OFDM symbols for NR carrier RSSI are starting from symbol #0, and can end in a subset of the symbols within the slot, e.g., one from {#1, #5, #7, #11}, or one from {#1, #5, #7, #13}. In yet another example, the configurations of the OFDM symbols for NR carrier RSSI can start either from symbol #0 or #6, e.g., the combination of (starting symbol, ending symbol) is configured as one from {(#0, #1), (#0, #5), (#6, #7), (#6, #11)}, or one from {(#0, #1), (#0, #5), (#6, #7), (#6, #13)}.

In one embodiment, at least, intra-frequency RRM measurement is provided.

Figure 22C:
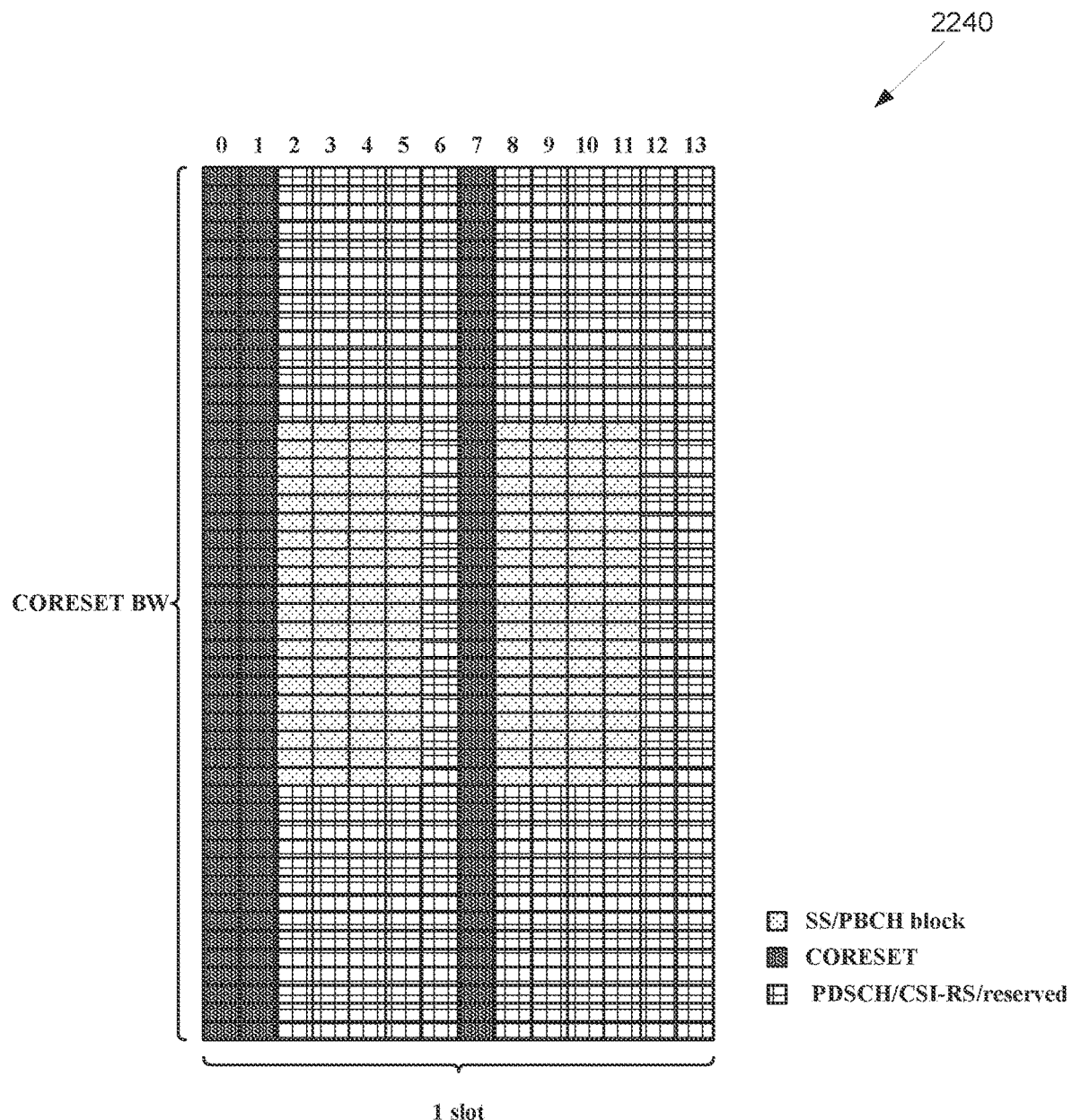
FIG. 22C illustrates yet another example NR-U DRS according to embodiments of the present disclosure.

FIG. 22C illustrates yet another example NR-U DRS 2240 according to embodiments of the present disclosure. The embodiment of the NR-U DRS 2240 illustrated in FIG. 22C is for illustration only. FIG. 22C does not limit the scope of the present disclosure to any particular implementation.

In one embodiment, as illustrated in FIG. 22C, at most two SS/PBCH blocks can mapped to a slot, wherein the first SS/PBCH block is mapped from symbol #2 to #6, and second SS/PBCH block is mapped from symbol #8 to #11 in a slot. For DRS, symbol #0 and/or #1 can be potentially mapped for a first CORESET, and symbol #7 can be potentially mapped for a second CORESET. The remaining RBs within the slot can be mapped for PDSCH of RMSI, and/or CSI-RS, and/or empty for other purpose (e.g., directional LBT).

In one example, the configurations of the OFDM symbols for NR carrier RSSI can be any symbol(s) within the slot, since every symbol could be for DL transmission. In another example, the configurations of the OFDM symbols for NR carrier RSSI are starting from symbol #0, and can end at any symbol within the slot (e.g., 14 configurations with ending symbol as one from #0 to #13). In yet another example, the configurations of the OFDM symbols for NR carrier RSSI are starting from symbol #0, and can end in a subset of the symbols within the slot, e.g., one from {#1, #5, #7, #11}, or one from {#1, #5, #7, #13}, or one from {#1, #6, #7, #11}, or one from {#1, #6, #7, #13}. In yet another example, the configurations of the OFDM symbols for NR carrier RSSI can start either from symbol #0 or #7, e.g., the combination of (starting symbol, ending symbol) is configured as one from {(#0, #1), (#0, #5), (#7, #7), (#7, #11)}, or one from {(#0, #1), (#0, #6), (#7, #7), (#7, #13)}.

In one embodiment, the aforementioned embodiments and example are applicable to intra-frequency RRM measurement.

Figure 23:
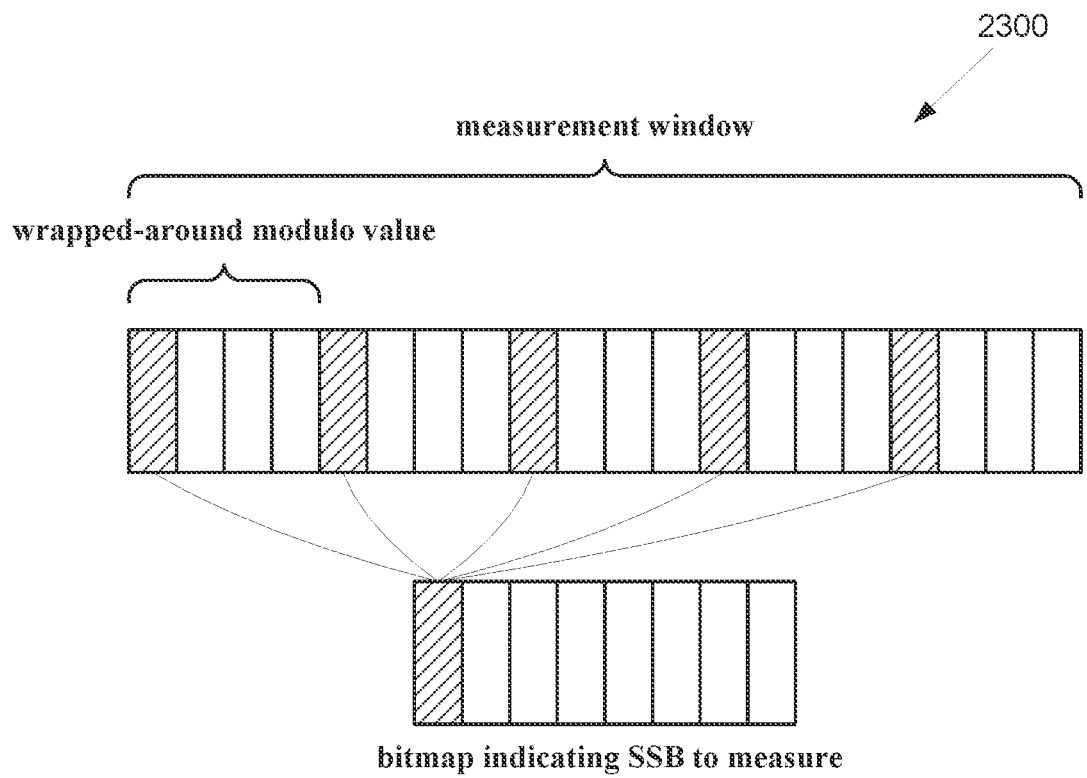
FIG. 23 illustrates an example RRM based on wrapped-around SS/PBCH blocks according to embodiments of the present disclosure.

FIG. 23 illustrates an example RRM based on wrapped-around SS/PBCH blocks 2300 according to embodiments of the present disclosure. The embodiment of the RRM based on wrapped-around SS/PBCH blocks 2300 illustrated in FIG. 23 is for illustration only. FIG. 23 does not limit the scope of the present disclosure to any particular implementation.

In one embodiment, when the transmission of SS/PBCH blocks is wrapped around within the transmission window, there can be at least one wrapped around modulo value for measurement purpose as well. Note that the wrapped around modulo value for measurement purpose may not be the same as the wrapped around modulo value for transmission purpose. Denote the wrapped around modulo value for measurement purpose as SSB-MeasModulo in this disclosure. An illustration of the wrapped around modulo value for measurement purpose is shown in FIG. 23.

In one embodiment, the wrapped around modulo value for measurement purpose (e.g., SSB-MeasModulo) could be indicated to the UE as part of the measurement object (e.g., MeasObjectNR).

In one embodiment, the indication of the wrapped around modulo value for measurement purpose (e.g., SSB-MeasModulo) can be per DMTC (or SMTC) within the measurement object (e.g., MeasObjectNR), such that every DMTC (or SMTC) configured is associated with a wrapped around modulo value for measurement purpose (e.g., SSB-MeasModulo). For one example, one wrapped around modulo value for measurement purpose is configured and associated with the first DMTC (or SMTC) (e.g., for serving cell RRM measurement), and another wrapped around modulo value for measurement purpose is configured and associated with the second DMTC (or SMTC) (e.g., for neighboring cell RRM measurement.

In one example, if the wrapped around modulo value for measurement purpose associated with the first DMTC (or SMTC) (e.g., for serving cell RRM measurement) is not configured, the UE can assume the default value is same as the wrapped around modulo value configured/determined for SSB transmission in the serving cell. For another example, only one wrapped around modulo value for measurement purpose is configured and associated with the one of the DMTCs (or SMTCs) (e.g., for neighboring cell RRM measurement), and the wrapped around modulo value for measurement purpose associated with the other DMTC (or SMTC) is assumed to be same as the wrapped around modulo value configured/determined for SSB transmission in the serving cell. In this example, when more than one wrapped around modulo value for measurement purpose are supported, each of the configured wrapped around modulo values for measurement purpose could independently follow the design aspects in this disclosure.

In another example, the indication of the wrapped around modulo value for measurement purpose (e.g., SSB-MeasModulo) can be per cell, such that every cell configured to be measured is associated with a wrapped around modulo value for measurement purpose (e.g., SSB-MeasModulo). For one example, the wrapped around modulo value for measurement purpose could be potentially different for cells, either serving cell or neighboring cell, and for every cell configured to be measured, it is configured separately with a wrapped around modulo value for measurement purpose. For another example, a common wrapped around modulo value for measurement purpose is configured for all serving cells, and a separate wrapped around modulo value for measurement purpose is configured for each neighboring cell.

In yet another example, the indication of the wrapped around modulo value for measurement purpose (e.g., SSB-MeasModulo) can be common for all cells and all DMTC (or SMTC) configured within the measurement object (e.g., MeasObjectNR).

In one example, the candidate values to be indicated for the wrapped around modulo value for measurement purpose (e.g., SSB-MeasModulo) could be selected from a predefined list. For one example, the candidate values could be {1, 2, 4, 8}. For another example, the candidate values could be {1, 2, 4, 8, 16}. For yet another example, the candidate values could be {2, 4, 8}. For yet another example, the candidate values could be {2, 4, 8, 16}. For yet another example, the candidate values could be {4, 8}. For yet another example, the candidate values could be {4, 8, 16}.

In one example, the set of candidate values for wrapped around modulo value for measurement purpose (e.g., SSB-MeasModulo) can be dependent on the SCS of SS/PBCH block configured for RRM measurement (e.g., associated with the MeasObjectNR). For example, if the configured SCS of SS/PBCH block in the measurement object is 15 kHz, the possible configured wrapped around modulo value for measurement purpose can be from {2, 4, 8}, and if the configured SCS of SS/PBCH block in the measurement object is 30 kHz, the possible configured wrapped around modulo value for measurement purpose can be from {4, 8}.

In another example, if the configured SCS of SS/PBCH block in the measurement object is 15 kHz, the possible configured wrapped around modulo value for measurement purpose can be from {1, 2, 4, 8}, and if the configured SCS of SS/PBCH block in the measurement object is 30 kHz, the possible configured wrapped around modulo value for measurement purpose can be from {2, 4, 8}. For yet another example, if the configured SCS of SS/PBCH block in the measurement object is 15 kHz, the possible configured wrapped around modulo value for measurement purpose can be from {1, 2, 4, 8}, and if the configured SCS of SS/PBCH block in the measurement object is 30 kHz, the possible configured wrapped around modulo value for measurement purpose can be from {2, 4, 8, 16}.

In yet another example, if the configured SCS of SS/PBCH block in the measurement object is 15 kHz, the possible configured wrapped around modulo value for measurement purpose can be from {1, 2, 4, 8}, and if the configured SCS of SS/PBCH block in the measurement object is 30 kHz, the possible configured wrapped around modulo value for measurement purpose can be from {1, 2, 4, 8, 16}.

In one embodiment, if there is no indication of the wrapped around modulo value for measurement purpose (e.g., SSB-MeasModulo) to a UE, the UE assumes one default value for RRM measurement. In one example, the default value is one SS/PBCH block. In another example, the default value equals to the maximum number of SS/PBCH blocks transmitted in a DRS transmission window (e.g., 8 for FR1). In yet another example, the default value equals to the minimum value within the set of candidate wrapped around modulo values for measurement purpose. If combining this example with the embodiment that the set of configured wrapped around modulo values depend on the configured SCS of SS/PBCH block, the default value could also depend on the configured SCS of SS/PBCH block, e.g., 2 if the configured SCS of SS/PBCH block is 15 kHz, and 4 if the configured SCS of SS/PBCH block is 30 kHz.

In another embodiment, the wrapped around modulo value for measurement purpose (e.g., SSB-MeasModulo) is fixed and known to the UE. In one example, the fixed value is one SS/PBCH block. In another example, the prefixed value is the maximum number of SS/PBCH blocks transmitted in a DRS transmission window (e.g., 8 for FR1). In one instance of this aspect, the prefixed value could be possibly dependent on the subcarrier spacing associated with the measurement object. For example, the wrapped around modulo value for measurement purpose is K if the configured SCS of SS/PBCH block in the measurement object is 15 kHz, and the wrapped around modulo value for measurement purpose is 2*K if the configured SCS of SS/PBCH block in the measurement object is 30 kHz, wherein K is predefined (e.g., K=1 or 2 or 4 or 8).

In one embodiment, there could be an indication of the unit for interpreting the SS/PBCH block indices to be measured (e.g., SSB-ToMeasure) associated with the DMTC (or SMTC) in the measurement object. For one example, the indication can be either a unit of a SS/PBCH block or a unit of a slot (e.g., two SS/PBCH blocks). In one example, if there is an indication of the unit for SS/PBCH block indices to be measured (e.g., SSB-ToMeasure), the unit can also be applicable to the wrapped around modulo value for measurement purpose (e.g., SSB-MeasModulo). For example, the wrapped around modulo value for measurement purpose (e.g., SSB-MeasModulo) is associated with the indicated unit (e.g., the unit of the wrapped around modulo value for measurement purpose is either a SS/PBCH block or a slot (i.e., two SS/PBCH blocks)).

In one embodiment, if a wrapped around modulo value for measurement purpose (e.g., SSB-MeasModulo) is supported, a UE can determine a group of potential SS/PBCH block locations within the measurement window, wherein all the potential locations correspond to the same bit in the bitmap for indicating the SS/PBCH block indices to be measured (e.g., SSB-ToMeasure) associated with the DMTC (or SMTC), and the potential locations within the same group are with uniform interval given by the wrapped around modulo value for measurement purpose (e.g., SSB-MeasModulo).

An illustration of the example is shown in FIG. 23, wherein a measurement window of DMTC (or SMTC) is configured with 20 potential SS/PBCH block locations, and one bit in the bitmap indicating the SS/PBCH block indices to be measured (e.g., SSB-ToMeasure) associated with the DMTC (or SMTC) can correspond to a group of multiple potential locations within the measurement window, wherein the multiple potential locations are uniformly distributed with an interval given by the wrapped around modulo value for measurement purpose (e.g., SSB-MeasModulo), and the index of a potential location after performing a modulo operation based on the wrapped around modulo value for measurement purpose is the same as one of SS/PBCH block indices indicated by the bitmap. In this embodiment, the wrapped around modulo value for measurement purpose (e.g., SSB-MeasModulo) is the same as the size of interval between two neighboring potential SS/PBCH block locations indicated by the same bit in the bitmap to measure SS/PBCH blocks (e.g., SSB-ToMeasure).

In one embodiment, a UE may perform a detection of SS/PBCH block in the corresponding at least one potential location within a group, if the UE is indicated to measure the associated bit by the bitmap, and performs measurement over at least one of the RS detected. For example, the UE may perform averaging over all the RS detected.

In another embodiment, a UE may perform measurement over at least one of the RS directly on the corresponding multiple potential locations (e.g., averaging over all the potential locations). In one embodiment, there could be relationship between the bitmap indicating SS/PBCH blocks to be measured (e.g., SSB-ToMeasure) and the wrapped around modulo value for measurement purpose (e.g., SSB-MeasModulo).

In one embodiment, a UE may not expect any bit taking the value of 1 in the bitmap indicating SS/PBCH blocks to be measured (e.g., SSB-ToMeasure), wherein the bit is with index higher than the wrapped around modulo value for measurement purpose (e.g., SSB-MeasModulo). For example, a UE may only expect the i-th bit in SSB-ToMeasure taking value of 1, wherein i is smaller or equal to the value given by the wrapped around modulo value for measurement purpose (e.g., SSB-MeasModulo).

In another embodiment, a UE could expect any bit taking the value of 1 in the bitmap indicating SS/PBCH blocks to be measured (e.g., SSB-ToMeasure), wherein the bit is with index higher than the wrapped around modulo value for measurement purpose (e.g., SSB-MeasModulo). In one example for this embodiment, the UE could double the value of SSB-MeasModulo until no bit with index higher than SSB-MeasModulo taking the value of 1 in SSB-ToMeasure, and perform measurement based the updated value of SSB-MeasModulo. In another example for this embodiment, the UE could assume the SS/PBCH blocks indicated by the bits with index higher than SSB-MeasModulo taking the value of 1 in SSB-ToMeasure do not need to be measured. In yet another example for this embodiment, the UE could assume this as an error case, and perform the default measurement (e.g., measure every location within the measurement window).

In one embodiment, a UE may only expect to detect at most one SS/PBCH block within the group of SS/PBCH block potential locations with the uniform interval given by the wrapped around modulo value for measurement purpose (e.g., SSB-MeasModulo) within the measurement window configured by DMRC (or SMTC). If the UE detects one SS/PBCH block within the group of SS/PBCH block, the UE can perform measurement based on the RS(s) in the detected SS/PBCH block and stops detecting SS/PBCH blocks from other potential locations.

In one example, a UE can perform the detection of SS/PBCH blocks in the order of smaller slot index to higher slot index within the measurement window (or smaller SS/PBCH block potential index to larger SS/PBCH block potential index), and if the UE detects one SS/PBCH block within the group of SS/PBCH block potential locations, the UE can perform measurement based on the RS(s) in the detected SS/PBCH block and stops detecting SS/PBCH blocks from later slots (or SS/PBCH block locations) in the measurement window.

In one embodiment, a UE may assume the SS/PBCH blocks within the group of SS/PBCH block potential locations with the uniform interval given by the wrapped around modulo value for measurement purpose (e.g., SSB-MeasModulo) are QCLed, wherein the group of SS/PBCH block potential locations could be within a same DMTC window and/or across two different DMTC windows.

In one example, SS/PBCH block potential location with index i and SS/PBCH block potential location with index j are QCLed, if mod (i-j, SSB-MeasModulo)=0, wherein SS/PBCH block potential location with index i and SS/PBCH block potential location with index j can be within a same DMTC window and/or across two different DMTC windows. Note that if the value of SSB-MeasModulo is chosen from {1, 2, 4, 8}, then mod (SS/PBCH block potential location index, SSB-MeasModulo) is the same as mod (DMRS sequence index, SSB-MeasModulo), so the above example is equivalent to SS/PBCH block with DMRS sequence index i and SS/PBCH block with DMRS sequence index j are QCLed, if mod (i-j, SSB-MeasModulo)=0, wherein SS/PBCH block with DMRS sequence index i and SS/PBCH block with DMRS sequence index j can be within a same DMTC window and/or across two different DMTC windows.

Figure 24:
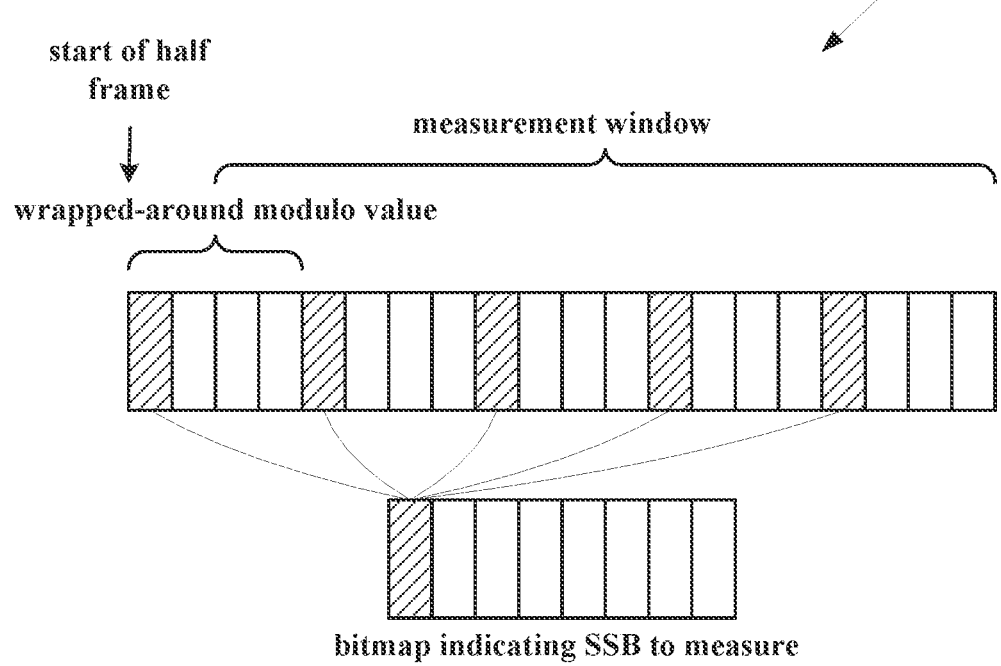
FIG. 24 illustrates an example multiple potential locations for SSB transmission according to embodiments of the present disclosure.

FIG. 24 illustrates an example multiple potential locations for SSB transmission 2400 according to embodiments of the present disclosure. The embodiment of the multiple potential locations for SSB transmission 2400 illustrated in FIG. 24 is for illustration only. FIG. 24 does not limit the scope of the present disclosure to any particular implementation.

In one embodiment, the first bit in the bitmap indicating the SS/PBCH block indices to be measured (e.g., SSB-ToMeasure) associated with the DMTC (or SMTC) corresponds to the first SS/PBCH block potential location within a half frame, regardless of the starting location where the DMTC (or SMTC) measurement window is configured with. For example, as illustrated in FIG. 24, the measurement window is not configured to be starting from the boundary of a half frame, then the first bit in the bitmap indicating SS/PBCH blocks to be measured does not correspond to the first SS/PBCH block location within the measurement window, but corresponds to the first SS/PBCH block potential location within the half frame, as well as other potential locations with a uniform interval given by the wrapped around modulo value for measurement purpose (e.g., SSB-MeasModulo) in the DMTC (or SMTC) measurement window.

In one embodiment, the duration of measurement window associated with a DMTC (or SMTC) could be enlarged. For example, the maximum duration of the measurement window could be configurable as 10 ms, in order to accommodate the uncertainty of transmission location for SS/PBCH blocks due to LBT.

In one embodiment, the interval of the candidate values for the configurable duration of measurement window associated with DMTC (or SMTC) could be aligned with the interval of the possible starting locations for SS/PBCH block transmissions. For example, 1 ms, which is 2 SS/PBCH blocks in SCS of 15 kHz or 4 SS/PBCH blocks in SCS of 30 kHz.

In one embodiment, a UE expects the carriers operated on a same unlicensed spectrum are configured with same SCS when performing DRS based RRM measurement. For example, the SS/PBCH blocks in the carriers configured to be measured are assumed to be with the same SCS.

In another embodiment, a UE expects the consecutive carriers operated on a same unlicensed spectrum are configured with same SCS when performing DRS based RRM measurement. For example, the SS/PBCH blocks in the consecutive carriers configured to be measured are assumed to be with the same SCS.

In the present disclosure, numerology refers to a set of signal parameters which can include subframe duration, sub-carrier spacing, cyclic prefix length, transmission bandwidth, or any combination of these signal parameters.

The federal communications commission defined unlicensed carriers to provide cost-free public access spectrum. Use of unlicensed carriers by a UE is allowed only under the provisions that the UE does not generate noticeable interference to communications in licensed carriers and that communications in unlicensed carriers are not protected from interference. For example, unlicensed carriers include the industrial, scientific and medical carriers and the Unlicensed National Information Infrastructure carriers that can be used by IEEE 802.11 devices. It may be possible to deploy LTE radio access technology (RAT) on an unlicensed frequency spectrum, which is also known as LTE-Unlicensed or LTE-U or licensed assisted access (LAA).

In LTE-LAA, receiving signal strength indicator (RSSI) and channel occupancy measurement and reporting are supported. On physical layer, a UE can be configured with a RSSI and channel occupancy measurement timing configuration (RMTC), which includes a periodicity of RSSI and channel occupancy measurement, wherein the periodicity is from {40, 80, 160, 320, 640} ms, and further includes an offset from the starting of the configured periodicity, wherein the offset can be any value within the configured periodicity.

Figure 25:
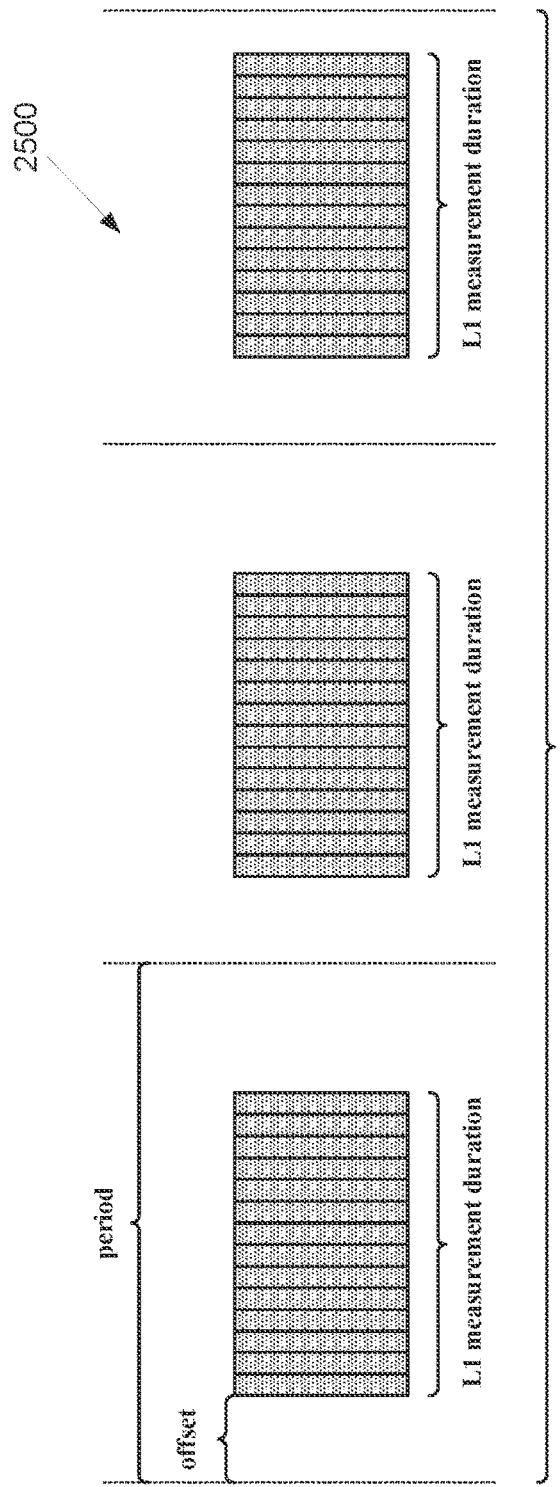
FIG. 25 illustrates an example RSSI and channel occupancy measurement in LTE-LAA according to embodiments of the present disclosure.

FIG. 25 illustrates an example RSSI and channel occupancy measurement 2500 in LTE-LAA according to embodiments of the present disclosure. The embodiment of the RSSI and channel occupancy measurement 2500 illustrated in FIG. 25 is for illustration only. FIG. 25 does not limit the scope of the present disclosure to any particular implementation.

The UE performs RSSI and channel occupancy measurement based on the configured periodicity and offset, and according to L1 measurement duration to perform averaging to calculate the RSSI, wherein the L1 measurement duration is configurable from {1, 14, 28, 42, 70} in the unit of PFDM symbols. The UE reports to higher layer a single RSSI sample value for every OFDM symbol in the L1 measurement duration. An illustration of this framework is shown in FIG. 25, wherein the exemplified L1 measurement duration is configured as 14, and there is a further L3 filtering window on top of physical layer procedure.

In NR, flexible numerology is supported, wherein a numerology includes a subcarrier spacing (SCS) and a cyclic prefix (CP) length. For example, for carrier frequency range 1, multiple numerologies are supported: 15 kHz SCS with normal CP, 30 kHz SCS with normal CP, 60 kHz SCS with normal CP, and 60 kHz SCS with extended CP. Hence, comparing to LTE-LAA, there is a need to enhance the configuration of RMTC to address the utilization scenario of flexible numerology for the RSSI samples.

In LTE-LAA, only downlink transmissions are supported on a LAA secondary cell (SCell). In NR unlicensed (NR-U), both downlink transmissions and uplink transmissions are supported, in both standalone and non-standalone operation scenarios. Hence, there is a need to enhance the configuration of RMTC to address the configured RSSI samples being for either downlink or uplink transmissions. Also, there is another need to enhance the configuration of RMTC to possibly distinguish the RSSI samples from serving cell channel occupancy time (COT). Moreover, there is yet another need to enhance the RMTC to possibly configure multiple RMTCs for different use cases.

The present disclosure focuses on the design of RMTC for RSSI and channel occupancy measurement, including design aspects for supporting flexible numerology, supporting multiple RMTCs for different use cases, and supporting multiple RSSI measurement results reporting. The designs of the present disclosure are at least applicable to NR unlicensed spectrums.

Figure 26:
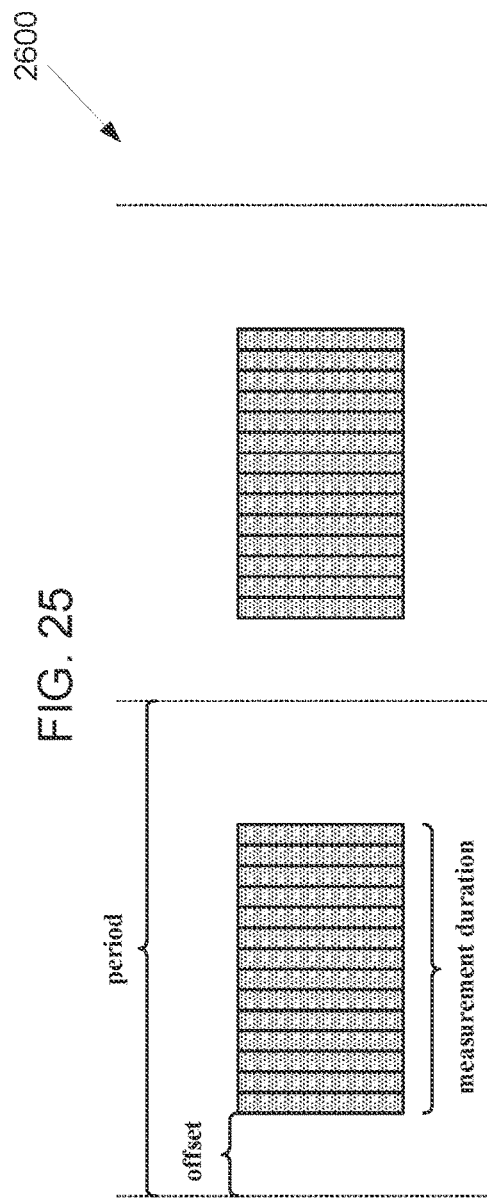
FIG. 26 illustrates an example RMTC according to embodiments of the present disclosure.

In one embodiment, a UE can be configured at least one RMTC at a time for a cell, wherein each configured RMTC may be utilized for different purpose. Each RMTC includes at least a period, an offset comparing to the start of the period, and a measurement duration (illustration is shown in FIG. 26). A UE only expects to perform RSSI measurement within the measurement duration determined based on RMTC.

FIG. 26 illustrates an example RMTC 2600 according to embodiments of the present disclosure. The embodiment of the RMTC 2600 illustrated in FIG. 26 is for illustration only. FIG. 26 does not limit the scope of the present disclosure to any particular implementation.

In one embodiment, each RMTC can also further include or be associated to at least one of a SCS for RSSI measurement, or a L1 averaging duration for RSSI measurement, wherein the details of this embodiment are as in other embodiments of the present disclosure.

In another embodiment, parameters in RMTCs or parameters associated to RMTCs can be common, when multiple RMTCs are configured to a UE.

In yet another embodiment, a UE can be configured multiple RMTCs for a cell, and the following examples and/or their combinations can be supported.

In one example, a UE can be configured at least two RMTCs for a cell, wherein a first RMTC is utilized for RSSI measurement of signals/channels from serving cell(s), and a second RMTC is utilized for RSSI measurement of signals/channels from neighboring cell(s). For instance, if a UE is capable to distinguish the received energy as from the UE's serving cell(s), the UE can be configured with at least two RMTCs for a cell, wherein a first RMTC is utilized for RSSI measurement of signals/channels from serving cell(s), and a second RMTC is utilized for RSSI measurement of signals/channels from neighboring cell(s).

In another example, a UE can be configured at least two RMTCs for a cell, wherein a first RMTC is utilized for RSSI measurement of DL signals/channels, and a second RMTC is utilized for RSSI measurement of UL signals/channels.

In yet another example, a UE can be configured at least two RMTCs for a cell, wherein a first RMTC is utilized for RSSI measurement of signals/channels from NR-U, and a second RMTC is utilized for RSSI measurement of signals/channels from co-existing RATs (e.g., Wi-Fi).

In yet another example, a UE can be configured one or multiple RMTCs for a cell, wherein each RMTC corresponds to one BWP configured to the UE (e.g., BWP-specific RMTC).

In yet another example, a UE can be configured one or multiple RMTCs for a cell, wherein each RMTC corresponds to a sub-band of 20 MHz (e.g., sub-band-specific RMTC).

In yet another example, a UE can be configured multiple RMTCs for a cell, wherein each RMTC is utilized for RSSI measurement of signals/channels for a given numerology.

In yet another example, a UE can be configured multiple RMTCs for a cell, wherein each RMTC is utilized for RSSI measurement of signals/channels for a given L1 averaging duration for RSSI measurement.

In one embodiment, a UE does not expect to perform RSSI measurement and channel occupancy measurement on an unlicensed spectrum using different numerology, wherein the numerology includes a SCS and a CP length. For one example, for a given carrier, the numerology for all signals and channels is the same, such that a UE does not expect to perform RSSI measurement or channel occupancy measurement on an unlicensed spectrum using different numerology. For another example, UE assumes that all the signals and channels within the RSSI measurement duration determined based on RMTC are using the same numerology.

In another embodiment, a UE may expect the signals and channels within the RSSI measurement duration determined based on RMTC may use different numerologies, wherein the numerology includes a SCS and a CP length, but the UE can still perform RSSI measurement and channel occupancy measurement on an unlicensed spectrum without knowing the numerology of the signals and channels within the RSSI measurement duration determined based on RMTC. For one example, by implementation, a UE may not need to know the numerology to perform the RSSI measurement within the RSSI measurement duration determined based on RMTC.

In yet another embodiment, a UE assumes the SCS for RSSI measurement is the same as the SCS configured for measurement in the associated measurement object (MO).

In yet another embodiment, a UE may expect the signals and channels within the RSSI measurement duration determined based on RMTC may use different numerologies, wherein the numerology includes a SCS and a CP length, and the UE is indicated a numerology that is associated to the configured RMTC for RSSI measurement and channel occupancy measurement. In one embodiment, if a UE knows the numerology of the signals or channels within the RSSI measurement duration determined based on RMTC is not aligned with the configured numerology associated to the configured RMTC, the UE can skip the RSSI measurement and channel occupancy measurement for using those signals or channels with inconsistent numerology as RSSI samples.

In another example, if a UE knows the numerology of the signals or channels within the RSSI measurement duration determined based on RMTC is not aligned with the configured numerology associated to the configured RMTC, the UE can perform the RSSI measurement and channel occupancy measurement based on the known numerology or up to UE's implementation, such that the RSSI measurement and channel occupancy measurement is still feasible within the RSSI measurement duration determined based on RMTC.

In one embodiment, there is a fixed L1 averaging duration associated to a configuration of RMTC, wherein this L1 averaging duration is defined as the time domain unit for performing RSSI measurement averaging, and the unit for RSSI measurement result reporting.

In one example, the fixed L1 averaging duration is one OFDM symbol with respect to a predefined numerology (e.g., the predefined numerology includes a SCS and a CP length). For one example, the fixed L1 averaging duration is one OFDM symbol with respect to 15 kHz SCS and normal CP length. For another example, the fixed L1 averaging duration is one OFDM symbol with respect to 30 kHz SCS and normal CP length. For yet another example, the fixed L1 averaging duration is one OFDM symbol with respect to 60 kHz SCS and normal CP length. For yet another example, the fixed L1 averaging duration is one OFDM symbol with respect to 60 kHz SCS and extended CP length.

In another example, the fixed L1 averaging duration is an absolute time duration smaller than an OFDM symbol with respect to the largest supported SCS and normal CP, e.g., in order to distinguish between NR-U transmission and Wi-Fi transmission, wherein a Wi-Fi transmission can be starting from any time instance, and NR-U transmission can be starting from any OFDM symbol. For one example, if 60 kHz is the largest supported SCS, then the fixed L1 averaging duration can be determined as one from 2 μs, or 4 μs, or 5 μs, or 10 μs. For another example, if 30 kHz is the largest supported SCS, then the fixed L1 averaging duration can be determined as one from 2 μs, or 4 μs, or 5 μs, or 10 μs.

In another embodiment, the L1 averaging duration is configurable, wherein this L1 averaging duration is defined as the time domain unit for performing RSSI measurement averaging, and the unit for RSSI measurement result reporting.

In one example, the L1 averaging duration is configurable and associated to a configuration of RMTC, e.g., as part of a configuration of RMTC or has a one-to-one mapping relationship to a configuration of RMTC. For example, the L1 averaging duration can be determined as one OFDM symbol, and combined with the configured SCS to determine the exact time duration of the L1 averaging duration.

In one example, for each RMTC, the L1 averaging duration can be configurable from a set of predefined values, e.g., wherein each value corresponds to a use case. For example, the L1 averaging duration can be configurable at least from two values, wherein a first value is at least a duration of one OFDM symbol, and a second value is smaller than one OFDM symbol. In this example, when the first value is configured, network can use a granularity of OFDM symbol to discover potential transmissions of NR-U signals/channels; when the second value is configured, network can use a granularity smaller than an OFDM symbol to discover potential transmissions of Wi-Fi signals/channels, wherein the transmissions of Wi-Fi signals/channels can take place at any timing (i.e., granularity smaller than an OFDM symbol in NR-U).

In one embodiment, at least one RMTC can be configured to a UE, e.g. as part of measurement object (MO) in RRC parameter, wherein each RMTC includes at least a period, an offset comparing to the start of the period, and a measurement duration (illustration is shown in FIG. 26).

In one example, the period in a RMTC can be configured from {40, 80, 160, 320, 640} ms.

In another example, the offset in a RMTC can be configured as any subframe within the period. For example, the offset in a RMTC can be configured as an integer between 0 and P_RMTC-1, in the unit of subframe/ms, wherein P_RMTC is the period in a RMTC in the unit of ms.

In yet another example, the offset in a RMTC can be configured as any slot within the period. For example, the offset in a RMTC can be configured as an integer from 0 to P_RMTC*R_SCS-1 in the unit of slot, wherein P_RMTC is the period in a RMTC in the unit of ms, and R_SCS is the ratio between the predefined/configured SCS associated to the RMTC and 15 kHz.

In yet another example, the offset in a RMTC can be configured as any timing in the unit of L1 averaging duration, wherein the L1 averaging duration can be either configured or predefined. For example, the offset in a RMTC can be configured as an integer from 0 to P_RMTC/D unit-1 in the unit of L1 averaging duration, wherein P_RMTC is the period in a RMTC in the unit of ms, and D unit is the L1 averaging duration expressed in ms.

In yet another example, the measurement duration in a RMTC can be configured as integer values in term of the unit as the L1 averaging duration. For one example, if the L1 averaging duration is determined/configured depending on a numerology (e.g., one numerology from 15 kHz SCS with normal CP, 30 kHz with normal CP, 60 kHz with normal CP, 60 kHz SCS with extended CP, 120 kHz with normal CP), the measurement duration in a RMTC is also depending on the numerology, e.g., for L1 averaging duration as one OFDM symbol, the measurement duration can be configured from {1, 14, 28, 42, 70} if the numerology is 15 kHz with normal CP length, from {1, 14, 28, 42, 56, 70, 140} if the numerology is 30 kHz with normal CP length, from {1, 14, 28, 42, 56, 70, 84, 280} if the numerology is 60 kHz with normal CP length, from {1, 12, 24, 36, 48, 60, 72, 240} if the numerology is 60 kHz with extended CP length.

In one example, if the L1 averaging duration is determined/configured independent on a numerology, the measurement duration in a RMTC can refer to absolute time durations, e.g., for L1 averaging duration as a fixed time duration of D unit in ms, the measurement duration can be configured from {1, 1/D unit, 2/D unit, 3/D unit, 5/D unit}, regardless of the numerology.

In one example, the measurement duration in a RMTC can be configured as absolute time durations. For example, the measurement duration can be configured from {L1 averaging duration, 1 ms, 2 ms, 3 ms, 5 ms}.

In one embodiment, there can be multiple RMTCs configured for a cell, wherein each of the RMTC is associated with a configuration of frequency domain resources for RSSI measurement. At least one of the following embodiments (and/or examples) and/or combination of the following embodiments can be supported regarding the configuration of frequency domain resources for RSSI measurement.

In one example, a configuration of frequency domain resources for RSSI measurement corresponds to a subband with bandwidth of 20 MHz. For example, this embodiment applies to the scenario that a cell is configured with wide bandwidth, wherein the bandwidth is an integer multiple of nominal bandwidth with 20 MHz, then each subband with bandwidth of 20 MHz can be associated with a RMTC, and RSSI measurement can be performed over each subband within the cell.

In another example, a configuration of frequency domain resources for RSSI measurement corresponds to a BWP configured for a cell. For example, this embodiment applies to the scenario that a cell is configured with one or multiple BWPs, wherein each BWP can be associated with a RMTC, and RSSI measurement can be performed over each BWP within the cell.

In yet another example, a configuration of frequency domain resources for RSSI measurement can be flexible in terms of the starting location and ending location of the configured frequency domain resources for RSSI measurement. In one example, the starting location and ending location can be with full flexibility, e.g., any RB can be the starting location or ending location within the BWP configured for a cell. In another example, the at least one configured frequency domain resources do not overlap. In yet another example, the configuration of frequency domain resources can be aligned with the frequency domain resources scheduled in UL grant.

In one embodiment, a RMTC is UE-specific, and there can be at least one RMTC configured for a cell, wherein each RMTC is associated to a UE-specific configuration of frequency domain resources for RSSI measurement. At least one of the following embodiments and/or combination of the following embodiments can be supported regarding the configuration of frequency domain resources for RSSI measurement.

In one example, a UE-specific configuration of frequency domain resources for RSSI measurement corresponds to a subband with bandwidth of 20 MHz. For example, this embodiment applies to the scenario that a cell is configured with wide bandwidth, wherein the bandwidth is an integer multiple of nominal bandwidth with 20 MHz, then each subband with bandwidth of 20 MHz can be associated with a RMTC, and RSSI measurement can be performed over each subband within the cell.

In another example, a UE-specific configuration of frequency domain resources for RSSI measurement corresponds to a BWP configured for the UE. For example, this embodiment applies to the scenario that a cell is configured with one or multiple BWPs, wherein each BWP can be associated with a RMTC, and RSSI measurement can be performed over each BWP within the cell.

In yet another example, a UE-specific configuration of frequency domain resources for RSSI measurement can be flexible in terms of the starting location and ending location of the configured frequency domain resources for RSSI measurement. In one example, the starting location and ending location can be with full flexibility, e.g., any RB can be the starting location or ending location within the BWP configured for a cell. In another example, the at least one configured frequency domain resources do not overlap. In yet another example, the UE-specific configuration of frequency domain resources can be aligned with the frequency domain resources scheduled in UL grant.

In yet another embodiment, there can be one RMTC configured for a cell, wherein the RMTC is associated with one or multiple configurations of frequency domain resources for RSSI measurement. A UE can report the RSSI value for each of the configuration of frequency domain resources (e.g., configuration of time domain resources is common for the cell). At least one of the following embodiments and/or combination of the following embodiments can be supported regarding the configuration of frequency domain resources for RSSI measurement.

In one example, a configuration of frequency domain resources for RSSI measurement corresponds to a subband with bandwidth of 20 MHz. For example, this embodiment applies to the scenario that a cell is configured with wide bandwidth, wherein the bandwidth is an integer multiple of nominal bandwidth with 20 MHz, then each subband with bandwidth of 20 MHz can be associated with a RMTC, and RSSI measurement can be performed over each subband within the cell.

In another example, a configuration of frequency domain resources for RSSI measurement corresponds to a BWP configured for a cell. For example, this embodiment applies to the scenario that a cell is configured with one or multiple BWPs, wherein each BWP can be associated with a RMTC, and RSSI measurement can be performed over each BWP within the cell.

In one embodiment, a configuration of frequency domain resources for RSSI measurement can be flexible in terms of the starting location and ending location of the configured frequency domain resources for RSSI measurement. In one example, the starting location and ending location can be with full flexibility, e.g., any RB can be the starting location or ending location within the BWP configured for a cell. In another example, the at least one configured frequency domain resources do not overlap. In yet another example, the configuration of frequency domain resources can be aligned with the frequency domain resources scheduled in UL grant.

In one embodiment, when a UE identifies the starting and ending timing of a DL burst transmission from the UE's serving cell or UL burst transmission to the UE's serving cell (e.g., a UE identifies the DL/UL channel occupancy time (COT)), the UE can measure and/or report RSSI for the two cases separately: a first case is RSSI within a DL/UL COT, wherein the RSSI measurement is based on the time domain resource determined by RMTC and within the COT at the same time, and a second case is RSSI outside a DL/UL COT, wherein the RSSI measurement is based on the time domain resource determined by RMTC and outside the COT at the same time. An illustration of this embodiment is shown in FIG. 27.

Figure 27:
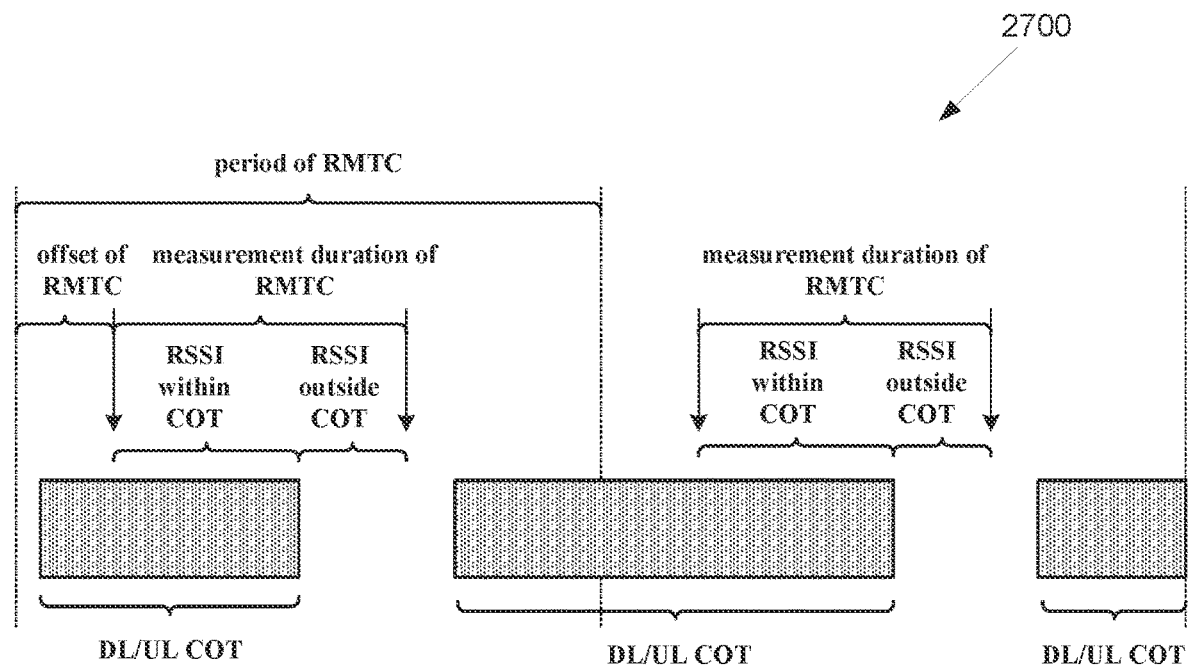
FIG. 27 illustrates an example RSSI measurement based on RMTC and COT according to embodiments of the present disclosure.

FIG. 27 illustrates an example RSSI measurement 2700 based on RMTC and COT according to embodiments of the present disclosure. The embodiment of the RSSI measurement 2700 illustrated in FIG. 27 is for illustration only. FIG. 27 does not limit the scope of the present disclosure to any particular implementation.

In one example, the RSSI measurement and/or report can be performed for DL and UL separately, in addition to the RSSI measurement and/or report for within the COT and outside the COT separately. For example, the RSSI measurement and/or report can be performed for 3 cases: a first case is RSSI within a DL COT; a second case is RSSI within an UL COT; and a third case is RSSI outside a DL/UL COT.

In another embodiment, a UE can measure and/or report RSSI for the two cases separately: a first case is RSSI for serving cell DL/UL transmission, wherein the RSSI measurement is based on the time domain resource determined by RMTC and for serving cell DL/UL transmission at the same time, and a second case is RSSI not for serving cell DL/UL transmission, wherein the RSSI measurement is based on the time domain resource determined by RMTC and not for serving cell DL/UL transmission at the same time. An illustration of this embodiment is shown in FIG. 28.

Figure 28:
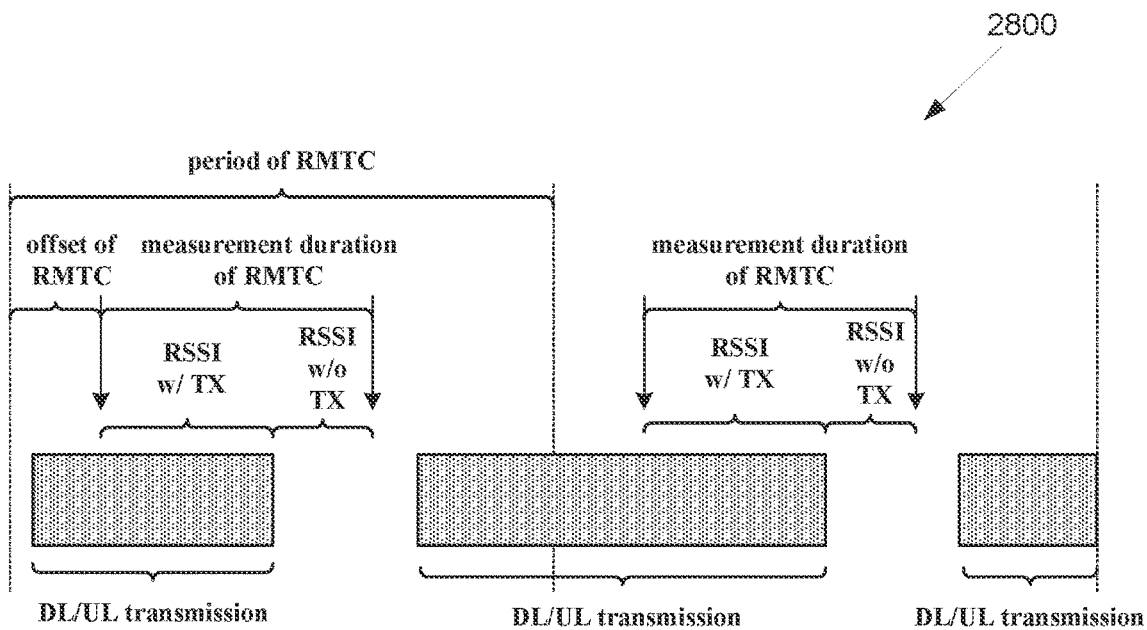
FIG. 28 illustrates an example RSSI measurement based on RMTC and DL/UL transmission according to embodiments of the present disclosure.

FIG. 28 illustrates an example RSSI measurement based 2800 on RMTC and DL/UL transmission according to embodiments of the present disclosure. The embodiment of the RSSI measurement based 2800 illustrated in FIG. 28 is for illustration only. FIG. 28 does not limit the scope of the present disclosure to any particular implementation.

In one example, the RSSI measurement and/or report can be performed for DL and UL separately, in addition to the RSSI measurement and/or report with or without transmission. For example, the RSSI measurement and/or report can be performed for 3 cases: a first case is RSSI for DL transmission; a second case is RSSI for UL transmission; and a third case is RSSI without DL/UL transmission.

In another embodiment, a UE can measure and/or report RSSI for the two cases separately: a first case is RSSI for resources configured as DL in SFI, wherein the RSSI measurement is based on the time domain resource determined by RMTC and configured as DL in SFI at the same time, and a second case is RSSI for resources configured as UL in SFI, wherein the RSSI measurement is based on the time domain resource determined by RMTC and configured as UL in SFI at the same time. An illustration of this embodiment is shown in FIG. 29.

Figure 29:
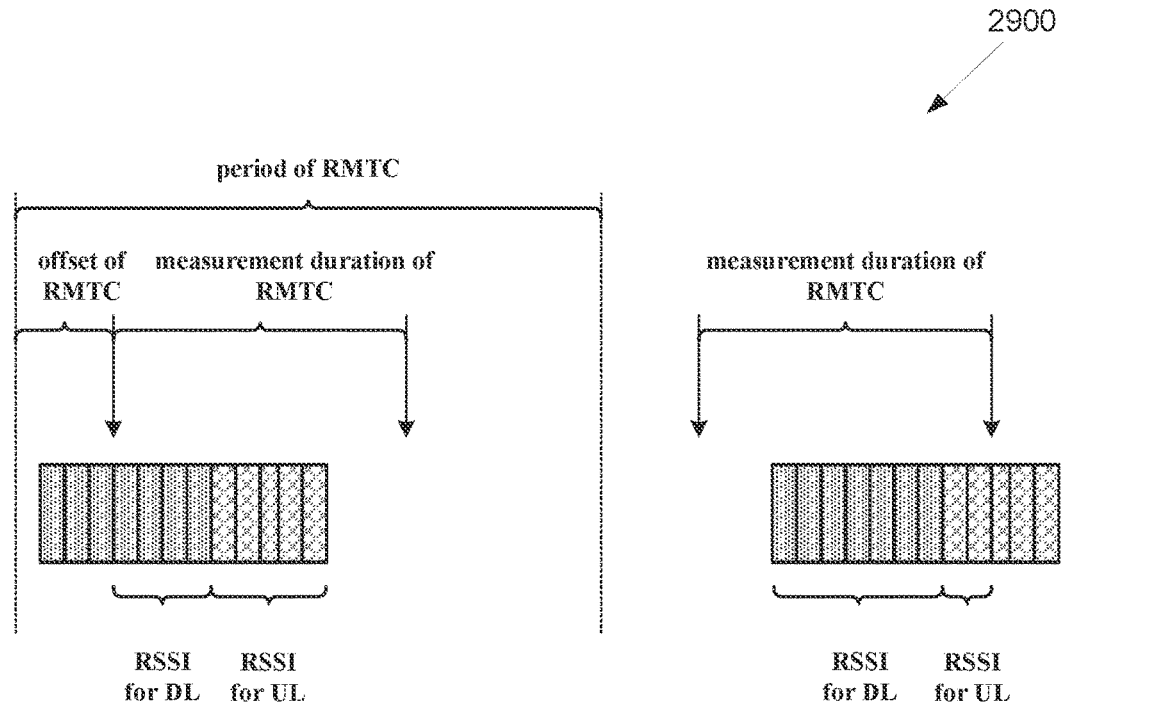
FIG. 29 illustrates an example RSSI measurement based on RMTC and SFI according to embodiments of the present disclosure.

FIG. 29 illustrates an example RSSI measurement 2900 based on RMTC and SFI according to embodiments of the present disclosure. The embodiment of the RSSI measurement 2900 illustrated in FIG. 29 is for illustration only. FIG. 29 does not limit the scope of the present disclosure to any particular implementation.

In one example, a separate RSSI measurement and/or report can be performed for resources configured as flexible in SFI, in addition to the RSSI measurement and/or report for resources configured as DL and UL in SFI. For example, the RSSI measurement and/or report can be performed for 3 cases: a first case is RSSI for resources configured as DL in SFI; a second case is RSSI for resources configured as UL in SFI; and a third case is RSSI for resources configured as flexible in SFI.

In another example, a separate RSSI measurement and/or report can be performed for resources not configured in SFI, in addition to the RSSI measurement and/or report for resources configured as DL and UL in SFI. For one example, the RSSI measurement and/or report can be performed for 3 cases: a first case is RSSI for resources configured as DL in SFI; a second case is RSSI for resources configured as UL in SFI; and a third case is RSSI for resources not configured in SFI. For another example, the RSSI measurement and/or report can be performed for 4 cases: a first case is RSSI for resources configured as DL in SFI; a second case is RSSI for resources configured as UL in SFI; a third case is RSSI for resources configured as flexible in SFI; and a fourth case is RSSI for resources not configured in SFI.

In yet another example, a RSSI measurement and/or report performed for resources not configured in SFI is treated the same as RSSI measurement and/or report performed for resources configured as flexible in SFI. For example, the RSSI measurement and/or report can be performed for 3 cases: a first case is RSSI for resources configured as DL in SFI; a second case is RSSI for resources configured as UL in SFI; and a third case is RSSI for resources not configured in SFI or configured as flexible in SFI.

In one embodiment, when there is not RMTC configured to a UE, the UE can choose random time domain resources for RSSI measurement and/or reporting.

In one example, when a single RMTC is supported, and it can be associated with at least one configuration of frequency domain resources for RSSI measurement, if the single RMTC is not configured to the UE, the UE can choose random time domain resources to be combined with the at least one associated configuration of frequency domain resources to perform RSSI measurement.

In another example, when a single RMTC is supported, and RSSI measurement based on this single RMTC is performed and reported for multiple cases, e.g., DL/UL and/or within/outside COT, if this single RMTC is not configured to a UE, the UE can choose random time domain resources for each of the multiple cases correspondingly for RSSI measurement and/or reporting.

In another embodiment, when there are multiple RMTCs for a cell supported to be configured to a UE, and some of the RMTCs are not configured to the UE, the UE can choose random time domain resources for RSSI measurement and/or reporting corresponding to the RMTC not configured, according to the restriction of that RMTC or other configuration associated to that RMTC.

In one example, when multiple RMTCs for a cell configured, wherein each of the RMTC is associated with one configuration of frequency domain resources for RSSI measurement and/or reporting, if some of the RMTCs is not configured to the UE, the UE can choose random time domain resources for that RMTC and combine with the associated configuration of frequency domain resources to perform RSSI measurement.

In one embodiment, for each configured RMTC, the RSSI can be measured and/or reported for different RATs.

In one example, a UE is capable to distinguish a received signal/channel being transmitted from a serving RAT (e.g., NR-U) or coexisted other RAT(s) (e.g., WiFi and/or LTE-LAA) on the same spectrum by using signal detection and/or channel decoding from the corresponding RAT, and for the UE performing RSSI measurement at the same time, the UE can measure and/or report RSSI separately for the serving RAT and coexisted other RAT(s).

In one example, RSSI measurement and/or reporting can be performed for 2 cases: serving RAT (e.g., NR-U) and all the other coexisted RATs (e.g., WiFi and/or LTE-LAA).

In another example, RSSI measurement and/or reporting can be performed for multiple cases, wherein each case is associated to a RAT on a given spectrum. In one instance, there can be an indication for the RSSI reporting that which RAT(s) is this RSSI measurement and/or reporting associated with.

In another embodiment, a UE is capable to distinguish different RATs on a given spectrum based on the result of RSSI measurement, e.g., from the transmission starting and ending location pattern, then the UE can choose to report RSSI separately for each of the identified RAT(s). In one instance, there can be an indication for the RSSI reporting that which RAT(s) is this RSSI measurement and/or reporting associated with.

In yet another embodiment, if a UE is configured with multiple RMTCs, wherein each of the RMTC is targeting for RSSI measurement for particular RAT(s) supported on a given spectrum, then the UE can measure and/or report the RSSI correspondingly.

In one embodiment, there can be more than one channel occupancy thresholds configured and associated to a RMTC.

In one example, each of the channel occupancy thresholds is determined corresponding to an energy detection threshold. For example, one of the channel occupancy thresholds can be determined corresponding to −62 dBm energy detection threshold. For another example, one of the channel occupancy thresholds can be determined corresponding to −72 dBm energy detection threshold. For yet another example, one of the channel occupancy thresholds can be determined corresponding to −82 dBm energy detection threshold.

In another example, there can be a single channel occupancy threshold configured, and when it is applied to RSSI measurement and/or reporting with respect to different cases, a value of the threshold can be interpreted differently. For example, when the channel occupancy threshold is applied to RSSI measurement and/or reporting with respect to NR-U system, the value of threshold is interpreted as 10 dB lower than when the channel occupancy threshold is applied to RSSI measurement and/or reporting with respect to Wi-Fi system. For example, the channel occupancy threshold can be determined corresponding to −62 dBm energy detection threshold for Wi-Fi system, and can be determined corresponding to −72 dBm energy detection threshold for NR-U system.

In one embodiment, there can be a misalignment between the determined time domain resource for performing RSSI measurement and the L1 averaging duration. For example, this can happen if the time domain resource for performing RSSI measurement is not using the same numerology as L1 averaging duration. For another example, this can happen if the time domain resource for performing RSSI measurement is not using the same unit as L1 averaging duration. For another example, this can happen when the time domain resource for performing RSSI measurement is determined based on RMTC as well as other time domain information which may not have the same unit as RMTC. An illustration of misalignment is shown in FIG. 30.

Figure 30:
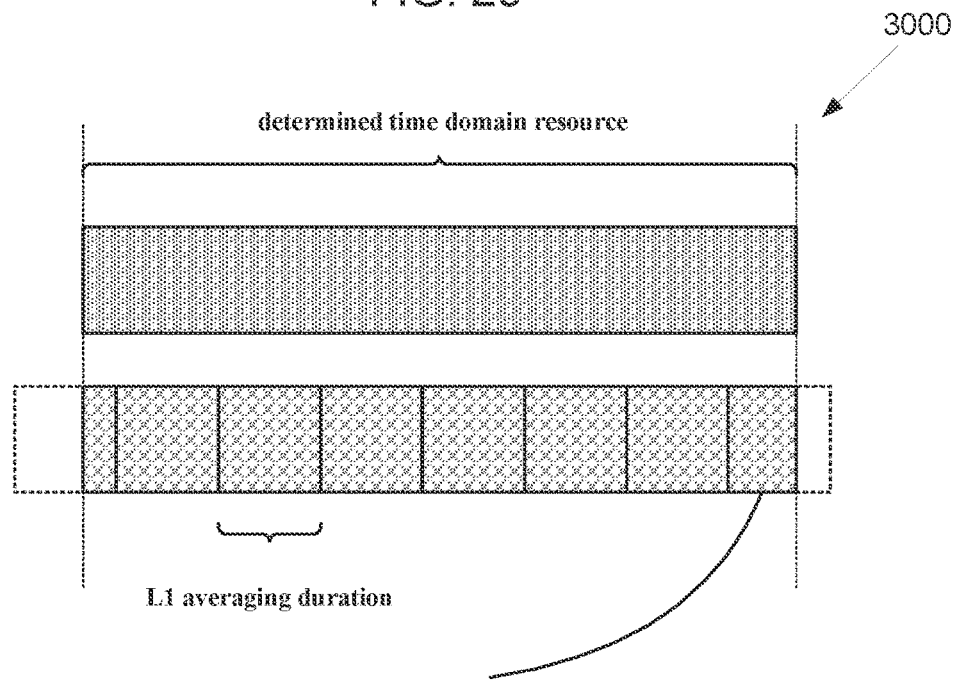
FIG. 30 illustrates an example misalignment in RSSI measurement according to embodiments of the present disclosure.

FIG. 30 illustrates an example misalignment in RSSI measurement 3000 according to embodiments of the present disclosure. The embodiment of the misalignment in RSSI measurement 3000 illustrated in FIG. 30 is for illustration only. FIG. 30 does not limit the scope of the present disclosure to any particular implementation.

In one example, the determined time domain resources not occupying a full L1 averaging duration is not counted for RSSI measurement.

In another example, the determined time domain resources not occupying a full L1 averaging duration is up to UE's implementation whether it is counted for RSSI measurement or not.

In yet another example, the determined time domain resources not occupying a full L1 averaging duration is counted for RSSI measurement, and the UE may perform RSSI measurement and/or reporting based on the full L1 averaging duration that overlaps with the determined time domain resources.

Figure 31:
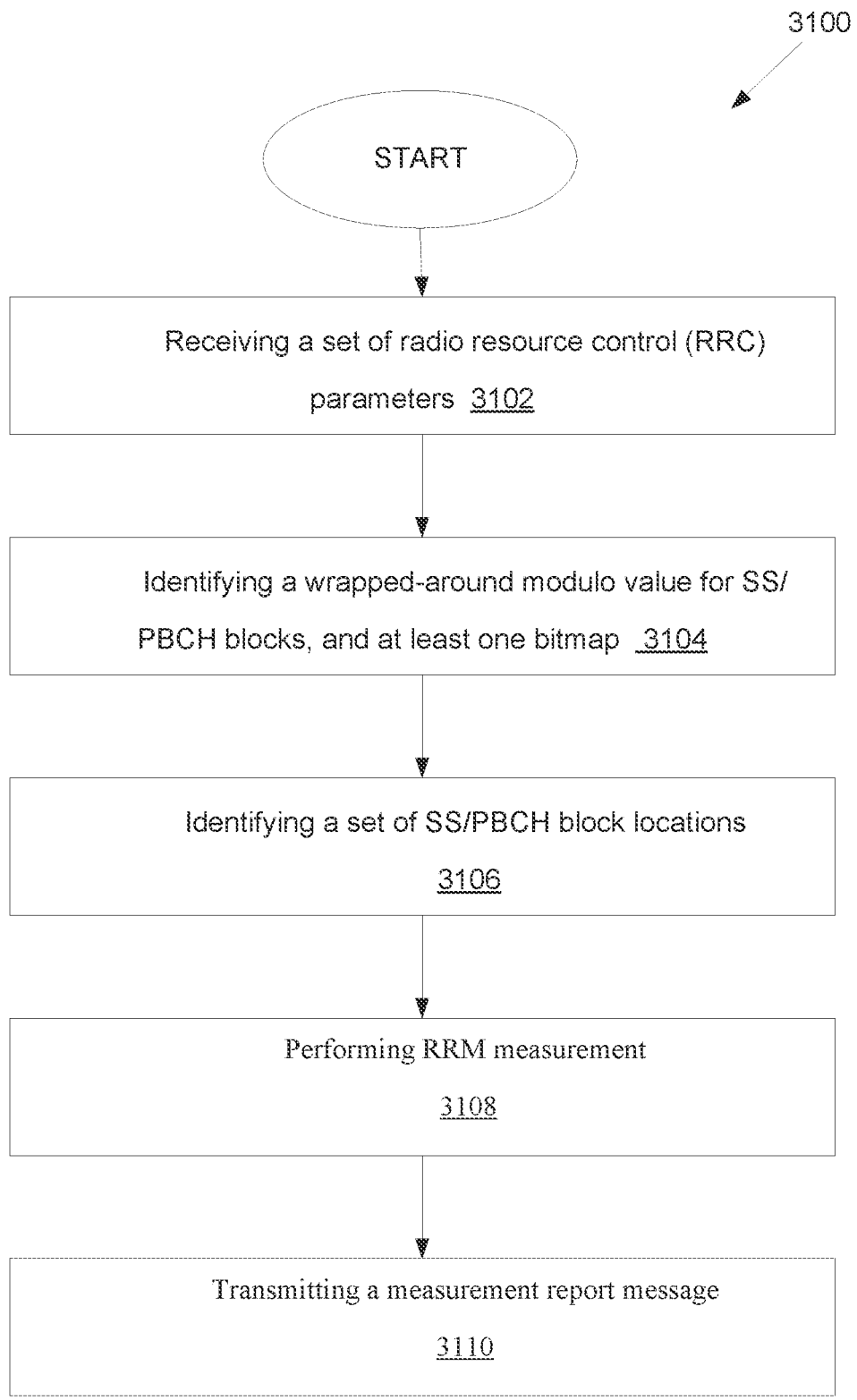
FIG. 31 illustrates a flow chart of a method for RRM measurement according to embodiments of the present disclosure.

FIG. 31 illustrates a flow chart of a method 3100 for RRM measurement according to embodiments of the present disclosure, as may be performed by a user equipment (UE) (e.g., UE 111-116 as illustrated in FIG. 1). The embodiment of the method 3100 illustrated in FIG. 31 is for illustration only. FIG. 31 does not limit the scope of the present disclosure to any particular implementation.

As illustrated in FIG. 31, the method 3100 begins at step 3102.

Next, in step 3102, the UE receives, from a base station (BS), a set of radio resource control (RRC) parameters comprising at least one measurement object (MO).

Next, in step 3104, the UE identifies, based on the at least one MO, at least one modulo value for synchronization signals and physical broadcast channel (SS/PBCH) blocks, and at least one bitmap indicating indices of the SS/PBCH blocks.

In one embodiment, each of the at least one modulo value is derived from {1, 2, 4, 8}.

Next, in step 3106, the UE identifies a set of SS/PBCH block locations based on the at least one modulo value and the at least one bitmap.

In on embodiment, a SS/PBCH block location of the set of SS/PBCH block locations is identified, if an index of the SS/PBCH block location after performing a modulo operation based on the identified modulo value is the same as one of the indices of SS/PBCH blocks indicated by the at least one bitmap.

Subsequently, in step 3108, the UE performs radio resource management (RRM) measurement based on the identified set of SS/PBCH block locations.

In one embodiment, the UE, during performing the RRM measurement based on the determined at least one SMTC, further identifies a secondary synchronization signal (SSS) in the at least one SS/PBCH block and at least one demodulation reference signal (DMRS) that is quasi-co-located (QCLed) with the SSS, and calculates at least one of reference signal received power (RSRP) or reference signal received quality (RSRQ) based on the identified SSS and DMRS.

Finally, in step 3110, the UE transmits, to the BS via an uplink channel, a measurement report message including a result of the RRM measurement.

In one embodiment, the UE further comprises identifying at least one SS/PBCH block based measurement timing configuration (SMTC) associated with each of the at least one modulo value.

In one embodiment, the UE further comprises identifying, based on the at least one MO, at least one receive signal strength indicator measurement timing configuration (RMTC) comprising an averaging duration for receive signal strength indicator (RSSI) measurement, wherein each of the at least one RMTC is determined for a sub-band with a 20 MHz bandwidth for a cell belonging to the BS.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
   a transceiver configured to receive, from a base station (BS), a message including at least one measurement object (MO); and
   at least one processor configured to:
   identify, based on the at least one MO, at least one modulo value for synchronization signals and physical broadcast channel (SS/PBCH) blocks, and at least one bitmap indicating indices of the SS/PBCH blocks;
   identify a set of SS/PBCH block locations based on the at least one modulo value and the at least one bitmap; and perform radio resource management (RRM) measurement based on the identified set of SS/PBCH block locations,
wherein the transceiver is further configured to transmit, to the BS via an uplink channel, a measurement report message including a result of the RRM measurement.

2. The UE of claim 1, wherein the at least one processor is configured to:
identify the indices of the SS/PBCH blocks based on the at least one bitmap, and
identify an index of each SS/PBCH block location included in the set of SS/PBCH block locations according to a modulo operation performed using the indices of the SS/PBCH blocks and the identified at least one modulo value.

3. The UE of claim 2, wherein the index of each SS/PBCH block location after performing the modulo operation based on the identified at least one modulo value is the same as one of the indices of SS/PBCH blocks.

4. The UE of claim 1, wherein each of the at least one modulo value corresponds to 1, 2, 4, or 8.

5. The UE of claim 1, wherein the at least one processor is further configured to:
receive a received signal strength indicator measurement timing configuration (RMTC) including information on a subcarrier spacing and cyclic prefix for received signal strength indicator (RSSI) measurement; and
perform the RSSI measurement based on the RMTC.

6. The UE of claim 1, wherein the at least one processor is further configured to perform a received signal strength indicator (RSSI) measurement within a RSSI measurement duration determined based on a received signal strength indicator measurement timing configuration (RMTC) when a configured numerology associated to a configured RMTC is not aligned with a numerology determined based on the RMTC.

7. The UE of claim 1, wherein:
the at least one processor is further configured to perform a RSSI measurement over each subband within a cell, and
the each subband corresponds to a 20 MHz bandwidth.

8. The UE of claim 1, wherein the at least one MO is included in a set of radio resource control (RRC) parameters.

9. A method for operating a user equipment (UE) in a wireless communication system, the method comprising:
receiving, from a base station (BS), a message including at least one measurement object (MO);
identifying, based on the at least one MO, at least one modulo value for synchronization signals and physical broadcast channel (SS/PBCH) blocks, and at least one bitmap indicating indices of the SS/PBCH blocks;
identifying a set of SS/PBCH block locations based on the at least one modulo value and the at least one bitmap;
performing radio resource management (RRM) measurement based on the identified set of SS/PBCH block locations; and
transmitting, to the BS via an uplink channel, a measurement report message including a result of the RRM measurement.

10. The method of claim 9, further comprising:
identifying the indices of the SS/PBCH blocks based on the at least one bitmap; and
identifying an index of each SS/PBCH block location included in the set of SS/PBCH block locations according to a modulo operation performed using the indices of the SS/PBCH blocks and the identified at least one modulo value.

11. The method of claim 10, wherein the index of each SS/PBCH block location after performing the modulo operation based on the identified at least one modulo value is the same as one of the indices of SS/PBCH blocks.

12. The method of claim 9, wherein each of the at least one modulo value corresponds to 1, 2, 4, or 8.

13. The method of claim 9, further comprising:
receiving a received signal strength indicator measurement timing configuration (RMTC) including information on a subcarrier spacing and cyclic prefix for received signal strength indicator (RSSI) measurement; and
performing the RSSI measurement based on the RMTC.

14. The method of claim 9, further comprising performing a received signal strength indicator (RSSI) measurement within a RSSI measurement duration determined based on a received signal strength indicator measurement timing configuration (RMTC) when a configured numerology associated to a configured RMTC is not aligned with a numerology determined based on the RMTC.

15. The method of claim 9, further comprising:
performing a RSSI measurement over each subband within a cell, and
the each subband corresponds to a 20 MHz bandwidth.

16. The method of claim 9, wherein the at least one MO is included in a set of radio resource control (RRC) parameters.

* * * * *